United States Patent
Li et al.

(10) Patent No.: US 7,697,596 B2
(45) Date of Patent: Apr. 13, 2010

(54) CLUSTER PATH PROCESSOR TIME ALIGNMENT FOR SIGNAL SUPPRESSION/SEPARATION IN A WIRELESS DEVICE

(75) Inventors: Junqiang Li, Sunnyvale, CA (US); Nelson R. Sollenberger, Farmingdale, NJ (US); Li Fung Chang, Holmdel, NJ (US); Mark David Hahm, Hartland, WI (US); Hongwei Kong, Denville, NJ (US)

(73) Assignee: Broadcom Corporation, Irvine, CA (US)

( * ) Notice: Subject to any disclaimer, the term of this patent is extended or adjusted under 35 U.S.C. 154(b) by 581 days.

(21) Appl. No.: 11/731,317

(22) Filed: Mar. 29, 2007

(65) Prior Publication Data

US 2008/0075216 A1    Mar. 27, 2008

Related U.S. Application Data

(63) Continuation-in-part of application No. 11/593,911, filed on Nov. 7, 2006, and a continuation-in-part of application No. 11/524,583, filed on Sep. 21, 2006, and a continuation-in-part of application No. 11/524,584, filed on Sep. 21, 2006, and a continuation-in-part of application No. 11/524,580, filed on Sep. 21, 2006.

(60) Provisional application No. 60/881,034, filed on Jan. 18, 2007.

(51) Int. Cl.
*H04B 1/00* (2006.01)

(52) U.S. Cl. .................. 375/148; 375/142; 375/144; 375/347

(58) Field of Classification Search .......... 375/142, 375/148, 150, 347, 349
See application file for complete search history.

(56) References Cited

U.S. PATENT DOCUMENTS 6,901,106 B1 * 5/2005 Chen et al. .................. 375/150
2002/0196767 A1 * 12/2002 Sim ........................... 370/342

* cited by examiner

*Primary Examiner*—Emmanuel Bayard
(74) *Attorney, Agent, or Firm*—Garlick Harrison & Markison; Bruce E. Garlick

(57) ABSTRACT

A system for processing radio frequency (RF) signals includes a searcher and a plurality of Cluster Path Processor (CPPs). The searcher detects a maximum signal energy level and position of at least one of a plurality of individual distinct path signals in a signal cluster of a first information signal, wherein at least a portion of the plurality of individual distinct path signals is received within a duration of a corresponding delay spread. The sampling position is used as a starting sampling location by the plurality of CPPs, including a first information signal CPP and a second information signal CPP. Fine sampling positions of the plurality of CPPs are based upon channel energy estimates for the plurality of individual distinct path signals. CPP outputs are employed to produce channel estimates, which are themselves used in subsequent equalization operations. Sampling positions may change over time in order to satisfy alignment criteria.

39 Claims, 24 Drawing Sheets

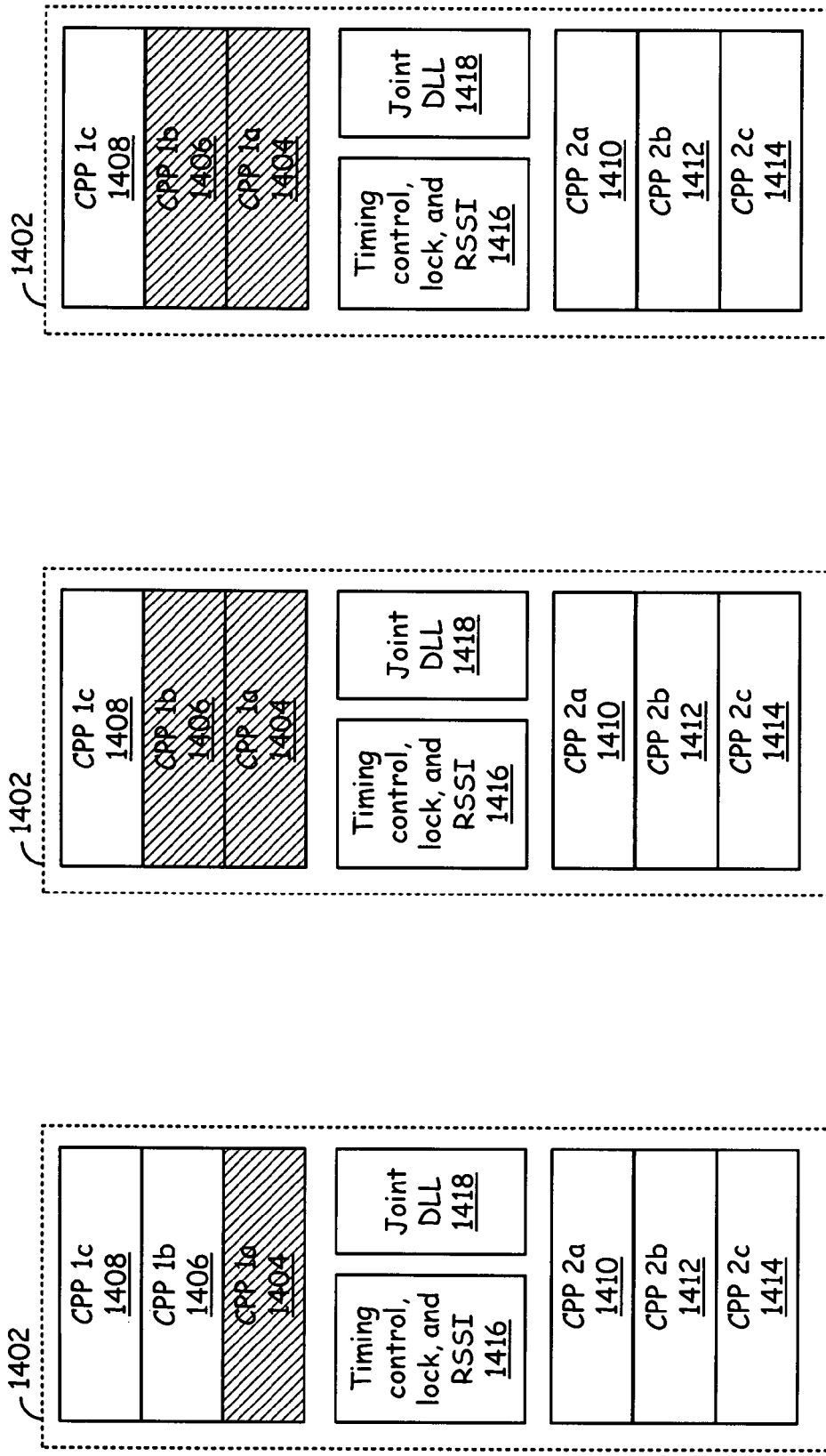

CLUSTER PATH PROCESSOR TIME ALIGNMENT FOR SIGNAL SUPPRESSION/SEPARATION IN A WIRELESS DEVICE

CROSS-REFERENCES TO RELATED APPLICATIONS

This application makes reference to co-pending U.S. Ser. No. 11/173,854, filed Jun. 30, 2005.

This application is a continuation-in-part of co-pending applications:

U.S. Utility application Ser. No. 11/524,583, filed Sep. 21, 2006, entitled "MAXIMUM ENERGY DELAY LOCKED LOOP FOR CLUSTER PATH PROCESSING IN A WIRELESS DEVICE";

U.S. Utility application Ser. No. 11/524,584 filed on Sep. 21, 2006, and entitled "FREQUENCY DOMAIN EQUALIZER FOR DUAL ANTENNA RADIO,";

U.S. Utility application Ser. No. 11/524,580 filed on Sep. 21, 2006, and entitled "FREQUENCY DOMAIN EQUALIZER WITH ONE DOMINATE INTERFERENCE CANCELLATION FOR DUAL ANTENNA RADIO,"; and U.S. Utility application Ser. No. 11/593,911 filed on Nov. 7, 2006, and entitled "EQUALIZER COEFFICIENT DETERMINATION IN THE FREQUENCY DOMAIN FOR MIMO/MISO RADIO", all of which are incorporated herein in their entirety by reference for all purposes.

This application also claims priority to U.S. Provisional Application Ser. No. 60/881,034, filed Jan. 18, 2007, and entitled "CLUSTER PATH PROCESSOR TIME ALIGNMENT FOR SIGNAL SUPPRESSION/SEPARATION IN A WIRELESS DEVICE," which is incorporated herein in its entirety for all purposes.

1. FIELD OF THE PRESENT INVENTION

The present invention relates to wireless communications and more particularly considers methodologies and systems for receiving and processing signals in a frequency selective multipath fading channel by a wireless device.

2. BACKGROUND OF THE PRESENT INVENTION

A wideband code division multiple access (W-CDMA) base transceiver station (BTS) may transmit a radio frequency (RF) signal, which may be reflected, and/or attenuated by various obstacles and surrounding objects while propagating though a transmission medium. Each of these reflections may comprise an individual distinct path, or path. As a result, a mobile receiver may receive a plurality of individual distinct versions of the transmitted signal, at a plurality of distinct time instants. Each of the received plurality of individual distinct versions of the transmitted signal may be associated with an individual distinct path and be referred to as an individual distinct path signal. A time instant associated with an individual distinct path signal, and a time instant associated with a subsequent individual distinct path signal may comprise a time offset. Various of the plurality of individual distinct path signals may be received at a received signal power level that may vary among the received plurality of individual distinct path signals. A time offset may vary among the received plurality of individual distinct path signals. For example, a time offset associated with an $n^{th}$ individual distinct path signal, and an $(n+1)^{th}$ individual distinct path signal, may differ from a time offset associated with an $m^{th}$ individual distinct path signal, and a $(m+1)^{th}$ individual distinct path signal, for $m \neq n$. A measure of a time offset may be referred to as temporal proximity.

The plurality of individual distinct path signals that may be received at the mobile receiver may be referred to as multipath signals, or a multipath. A medium through which a transmitted RF signal may be propagated is referred to as the RF channel, or a channel. Transmission impairments, or impairments, may be present in the channel that may introduce distortion, interference, and/or distortion as the transmitted RF signal propagates through the channel. The presence of transmission impairments may increase the difficulty of recovering a transmitted RF signal at a mobile receiver based on corresponding received multipath signals. The channel may be characterized by its RF bandwidth and whether the channel comprises a single path, or a multipath (frequency selective fading channel). A channel that comprises a single path may be referred to as a "frequency flat fading channel." A channel that comprises a multipath may be referred to as a "frequency selective fading channel."

During reception of a multipath, and subsequent recovery of the corresponding transmitted RF signal, a multiplicative complex factor, comprising gain and RF phase, may be applied to an individual distinct path signal. The numerical values associated with the gain and RF phase may vary as the mobile receiver is moved from one location to another. The multipath signals may be characterized according to their energy levels. Each signal-path has associate therewith a respective geometric distance, which causes respective copies of the transmitted RF signal to arrive spread over time. This time duration may comprise a plurality of time instants during which a plurality of individual distinct path signals that constitute a multipath may be received at a mobile receiver. This time duration may also be referred to as a "delay spread." During reception of a multipath at a mobile receiver, a profile for the measured signal path energy may increase and decrease during a relatively short time period. This time period may be referred to as a path life time. Consequently, the transmission medium, through which a transmitted RF signal propagates, may comprise time varying characteristics that influence the multipath that is received at the mobile receiver. The multipath may comprise a plurality of individual distinct path signals that may be received at a mobile receiver based on statistical properties.

A rake receiver may be utilized to recover an estimate of a transmitted RF signal carried in received multipath signals. The rake receiver may implement a process that comprises generating an estimate for each received individual distinct path signal in the multipath. This generated estimate may be referred to as a channel estimate. A channel estimate that is generated based on an individual distinct path signal may be referred to as a path estimate. The process may further comprise descrambling the received multipath through application of a Gold code (GC) and despreading the resultant signal through application of an Orthogonal Variable Spreading Factor (OVSF) code. The GC and the OVSF code may be applied to the received multipath at a time instant that is time synchronized to a reception, by the mobile receiver, of an individual distinct path signal. The descrambling and despreading operation may be referred to as correlating. Circuitry that performs the correlating may be referred to as a correlator.

The rake receiver may comprise a plurality of correlators, wherein an individual correlator may be time synchronized to a reception, by the mobile receiver, of an individual distinct path signal. The correlator may be referred to as performing time tracking on an individual distinct path signal. Such operation may also be referred to as signal (waveform, or signature) matching. Following correlation a path estimate may be generated. The path estimate may be utilized to recover an estimate for at least a portion of the corresponding transmitted RF signal. Subsequently, the rake receiver may perform an operation on the received plurality of path estimates that comprises a time compensation, and combining.

Within the rake receiver, circuitry, referred to as a "finger," may be assigned to process a received individual distinct path signal. The finger may perform the steps described above, during reception of the assigned received individual distinct path signal. A finger among a plurality of fingers in a rake receiver may be assigned to a corresponding one of a received plurality of individual distinct path signals that form component signals in a multipath. The output of the fingers may then be combined and further demodulated and decoded. The fingers may be implemented to receive and process as much of the received signal energy as practicable.

A considerable part of receiver design may involve managing the rake receiver fingers. A functional block known as a "searcher" may be adapted to locate new multipath signals and to allocate rake receiver fingers to the new multipath. The searcher may detect a path based on the amount of energy contained in a signal, identify that path if it carries user data, and subsequently monitor the detected path. Once the detected signal energy in a path is above a given threshold, a finger in the rake receiver may be assigned to the path and the signal energy level constantly monitored.

However, partitioning the received signal into several fingers, each of which may process and exploit energy in a single path, may have limitations. For example, a multipath may rarely be characterized by a distinct discrete time of arrival in connection with each received individual distinct path signal. As a result, the rake receiver may be inefficient at exploiting the power in received signals. In addition, utilizing this method may incur high processing overhead in managing the fingers. The total amount of time required to identify a path, assign a finger, and exploit the signal energy may account for 20-30% of the life span of a path. Once a finger is assigned to a path, detected energy on the path may be continuously monitored. However by the time the finger has been assigned, the path energy may be diminished, while energy may arrive at a different time. This may result in the rake receiver constantly searching for new paths and performing finger de-allocation/allocation cycles. A finger that is allocated to a path with diminishing power may represent misused resources in the mobile terminal, which may in turn lower performance of the mobile terminal.

Another limitation in the conventional rake receiver is known as finger merge or 'fat' finger. This is a phenomenon in which paths are in close temporal proximity of each other. If a time difference between received individual distinct path signals is below some threshold value, more than one finger, among a plurality of fingers in a rake receiver, may be assigned to a common individual distinct path signal. Also, as a result of the close proximity, a bias may be introduced into the processing of the received multipath, whereby the two or more fingers track a single received individual distinct path signal. This fat finger phenomenon may result in negative implications for system performance.

The assignment of more than one finger to a received individual distinct path signal may be a waste of system resources, as the additional finger or fingers may be better deployed receiving additional energy from another received individual distinct path signal in the multipath, or receiving energy from a signal transmitted from another BTS. In addition, the combined power of the various fingers may often be used to control various system parameters, for example, power control. Without accounting for finger merge, a system may overestimate the received power due the duplication of energy detected in the combiner, and thus overcompensate by lowering transmit power to a threshold level below that required for adequate communication. Moreover, combining the output of merged fingers with the output of non-merged fingers may weight both the signal and noise of the merged finger output too heavily in relation to the non-merged finger output, which may result in inefficient exploitation of the received power.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE PRESENT INVENTION

A method and/or system for managing, controlling and combining signals in a frequency selective multipath fading channel, substantially as shown in and/or described in connection with at least one of the figures, as set forth more completely in the claims. These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 15A-15G are block diagrams illustrating the CPP block of FIG. 14 in various operational modes according to embodiments of the present invention.

DETAILED DESCRIPTION OF THE PRESENT INVENTION

Certain embodiments of the present invention may be found in a method and system for processing multipath clusters. Various embodiments of the present invention describe a cluster path processor (CPP) that may process multipath signals wherein a temporal proximity between consecutive individual distinct path signals may be approximately equal across the multipath signals. The CPP may process multipath signals where channel estimation, and recovery of a corresponding transmitted RF signal is based on an estimate of an aggregate of at least a portion of the received individual distinct path signals contained in the multipath signals. The CPP may process a multipath based on at least a portion of a total signal energy level contained in the multipath that comprises an aggregate of signal energy from each of the constituent individual distinct path signals.

In various embodiments of the present invention, the performance of the CPP in tracking and recovering RF signals may be less sensitive to fluctuations in temporal proximity and signal energy level that may be evidenced in a received individual distinct path signal. This CPP may facilitate novel and efficient methods for implementing processes such as assigning, tracking, measuring and reporting information (for example, energy and temporal location) based on statistical means as observed across a received signal cluster. This may eliminate the need for applying the same tasks, as may be performed by a rake receiver, on each of the received individual distinct path signals contained in the signal cluster. Various embodiments of the present invention may include receiver designs that comprise a plurality of CPPs.

Figure 1:
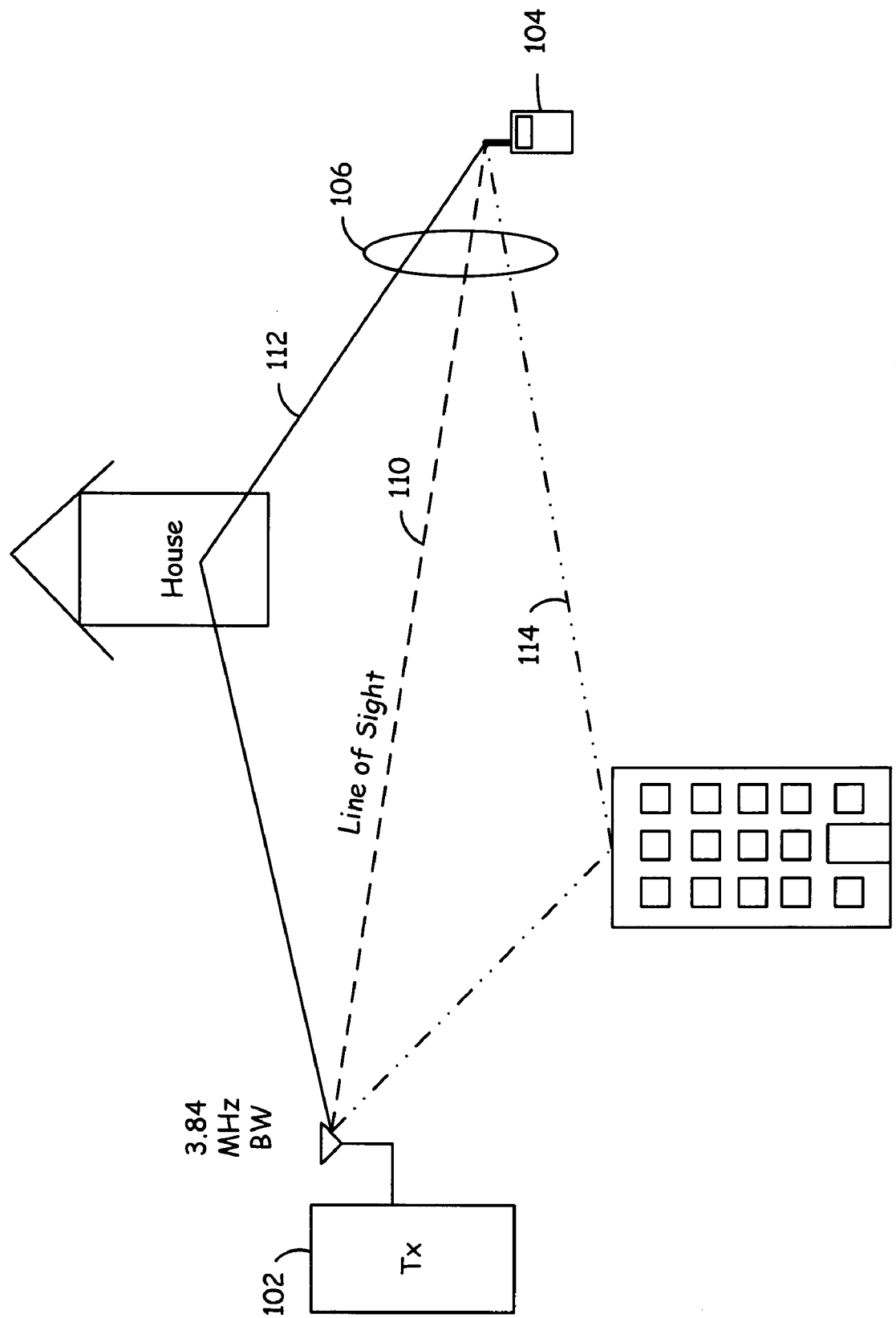
FIG. 1 is a diagram illustrating an exemplary multipath cluster that may be received by a mobile receiver, which may be utilized in connection with an embodiment of the present invention.

FIG. 1 is a diagram illustrating an exemplary multipath cluster that may be received by a mobile receiver, which may be utilized in connection with an embodiment of the present invention. With reference to FIG. 1 there is shown a transmitter 102, a mobile receiver 104, a multipath cluster 106, and a plurality of individual distinct path signals 110, 112, and 114. The plurality of individual distinct path signals 110, 112, and 114 may represent component signals in a multipath. The plurality of signals 110, 112 and 114, that may be received by the mobile receiver 104, may be referred to as a multipath cluster 106.

With reference to FIG. 1, a transmitted radio frequency (RF) signal may be emitted by the transmitter 102, and subsequently form a multipath of individual path signals 110, 112, and 114, at a plurality of angles of departure (AODs) in relation to the transmitter 102. One of the plurality of AODs may correspond to an individual distinct path that is utilized by an individual distinct path signal 110, 112, and 114. The plurality of individual distinct path signals 110, 112 and 114 may arrive at the mobile receiver 104 at a plurality of angles of arrival (AOAs) in relation to the mobile receiver 104. Within the transmission medium between the transmitter 102 and mobile receiver 104, a transmitted RF signal may experience a coherent and direct line of sight path, as indicated by signal 110. The transmitted RF signal may be also experience reflections within the intervening communications medium that produces a plurality of individual distinct path signals, each of which may arrive at the mobile receiver 104 at a different AOA as indicated by signals 112 and 114.

The individual distinct path signals 110, 112 and 114, that comprise the multipath cluster 106, may arrive at the mobile receiver 104 at a plurality of time instants within a delay spread. Arrival times for signals 110, 112, and 114 may vary depending upon the lengths of individual distinct paths taken by the corresponding signals 110, 112, and 114. Thus, a plurality of individual distinct path signals that utilize individual distinct paths comprising similar path lengths between the transmitter 102 and the mobile receiver 104 may arrive at the mobile receiver 104 at times that are detectably distinct. Individual distinct path signals that utilize similar path lengths may be in temporal proximity. Individual distinct path signals that do not utilize similar path lengths may not be in temporal proximity. In some conventional rake receiver designs, a plurality of fingers may be assigned to track a corresponding plurality of individual distinct path signals that are in temporal proximity, and may result in occurrence of the fat finger phenomenon.

In various embodiments of the present invention, a single CPP may be assigned to track a group of signals comprising at least a portion of a plurality of individual distinct path signals that are in temporal plurality based on a computed aggregate signal energy level for at least a portion of a received signal cluster 106, and thereby reduce the likelihood of producing an instance of the fat finger phenomenon.

An $n^{th}$ individual distinct path signal, in a signal cluster, may arrive, at the mobile receiver 104, at a time $T(n)$; $n=0$, $L-1$ where L is the number of distinct paths the CPP block 208 can track. A value of the time $T(n)$ may be measured relative to a time at the start of the corresponding delay spread that is associated with the receipt of the signal cluster. A plurality of individual distinct path signals that arrive at the mobile receiver 104 at a plurality of times T(n) may comprise the signal cluster, or cluster.

In some conventional rake receiver designs two distinct paths may be in temporal proximity of each one. If the value of their time difference is too small, for example, less than a value that corresponds to a reciprocal of a bandwidth that is associated with the channel, the fat finger phenomenon may occur in the rake receiver.

In one aspect of the present invention, a first moment time, $T_{fm}$, may be computed. The first moment time $T_{fm}$ may represent a center time for the reception of the multipath cluster 106 at the mobile receiver 104. The center time may comprise a weighted average time for reception of signal energy over a duration of a delay spread. A value for the delay spread may be determined based on characteristics of a channel. In various embodiments of the present invention, a value for the delay spread, $T_{ds}$, may be set in accordance with the characteristics of the channel. For example, if the first portion of a signal cluster 106 is received at the receiver at a time $t_{start}$, a last portion may be received at a time instant approximately described as $t_{start}+T_{ds}$. In an exemplary embodiment of the time offset, $t_{off}$, may be determined to be:

$$t_{off} \cong \frac{T_{ds}}{L-1} \qquad \text{equation [1]}$$

where L may comprise a value that represents a number of group fingers utilized in the CPP, for example, a value of 16.

A value for a time at which an $n^{th}$ individual distinct path signal is received, T(n), may be determined to be:

$$T(n) \cong t_{start}+(n-1)t_{off} \qquad \text{equation [2]}$$

In relation to the first moment time $T_{fm}$, $t_{start}$ may be expressed as:

$$t_{start} \cong T_{fm}-m \cdot t_{off} \qquad \text{equation [3]}$$

where the variable, m, may represent a number of time offsets subsequent to a start of a delay spread wherein the first moment time is located.

The value for T(n) may then be expressed in relation to the first moment time:

$$T(n)=T_{fm}+(n-m-1)t_{off} \qquad \text{equation [4]}$$

As indicated in equation [4], given a first moment time, an offset, and a number of offsets subsequent to a start time for a delay spread, a time may be assigned to a plurality of group fingers in a CPP, in accordance with an embodiment of the present invention.

Determination of a detected energy level contained in a received signal cluster 106 may be based upon a time varying impulse response of an RF channel, h, which characterizes a transmission medium between the transmitter (for example, 102 in FIG. 1) and the mobile receiver (for example, 104 in FIG. 1). A relationship between a signal transmitted by a transmitter 102, x, and a signal received by a receiver 104, y, may be modeled:

$$y = \sum_{i=0}^{L-1} h_k(i) \cdot x(t_k - i \cdot t_{off}) + n_k \qquad \text{equation [5]}$$

where i may be utilized to reference an individual distinct path signal within the received signal cluster, $h_k(i)$ may represent an $i^{th}$ individual distinct path signal within the received signal cluster, k may represent a time instant, $t_{off}$ may represent a time offset, $n_k$ may represent noise that may be added to the received signal cluster, and L may represent a number of individual distinct path signals that are resolvable within a multipath. The number of individual distinct path signals that are resolvable within a multipath may correspond to a number of group fingers in a CPP in various embodiments of the present invention.

The receiver 104 may compute an estimate, h, of the time varying impulse response of the RF channel, h, based on the received signal, y, if the transmitter 102 transmits a known signal, contained within the transmitted signal x. This signal, which is contained within the transmitted signal x, may, for example, be referred to as a "pilot" signal, and may be utilized to compute estimates of the channel gain and RF phase across a delay spread of the channel. The computed estimate of the time varying impulse response h, which may represent an estimate that characterizes the transmission medium, may be referred to as a "channel estimate." Based on the channel estimate, a detected energy level may be determined, based on the received signals in the cluster.

In various embodiments of the present invention, as a mobile receiver 104 changes its position relative to the transmitter 102, arrival times during which individual distinct path signals are received within a signal cluster may also change. Changes in the arrival times may be tracked based on a computed aggregate signal energy level for at least a portion of the received signal cluster 106. As a result of the tracking, a time correction may be applied to the first moment time $T_{fm}$. The correction to the first moment time may result in a corresponding correction to the times T(n) that may be associated with individual cluster element in the CPP, as indicated in equation [4].

The plurality of group fingers (also referred to as "cluster elements" herein) may be modeled as a grid comprising a plurality of temporal points, say L, which are a fixed $T_{BW}$ away from each other where $T_{BW}=1/BW$ is known as the chip time (spread-spectrum communication systems). The grid points represent L-hypotheses of L input streams which has one chip-time delay from its neighbor point. The correctness of each of the hypotheses is measured by the correlation value associated with the grid point. The correlation is performed between the input and a synthesized pilot signal (that maintains the timing hypothesis at each point by creating a delay version matching the hypothesis delay). The set of the correlators output represents the estimate to the channel response—h.

The span time instants, T(n), n=0, L−1 in the delay spread, wherein individual elements in the grid of group fingers may be offset in time by a time increment that is approximately equal to the time offset $t_{off}$. Thus, as the arrival time of the signal cluster 106 changes at the receiver 104, the grid may shift in time correspondingly. As stated above, the CPP cluster grid points maintain equal fixed time distance between all the grid points. This distance may be a chip time or less. The time tracking, therefore, of signals of a multipath is accomplished by accelerating or de-accelerating the reference signal. The delayed reference signal and its delayed copies continuously correlate with the incoming signal. The combined features of tracking a cluster of signals with a fixed grid alleviates numerous disadvantages that are shown in the conventional rake receiver. For example: eliminating the "fat finger", the finger assigning/de-assigning cycle and a simplified energy and time reporting scheme based on the cluster as a whole.

The value of the time offset, $t_{off}$, may be defined to ensure that it encompasses an amount of time required by the transmitter 102 to transmit a bit or symbol. In W-CDMA transmissions, an information signal, or "symbol", may be spread or scrambled prior to transmission by utilizing scrambling, or spreading codes such as, for example, Gold codes, or orthogonal variable spreading factor (OVSF) codes. The scrambling, or spreading code may transform the symbol into a series of signals known as "chips" which may be transmitted as a W-CDMA spread spectrum signal. The time offset, $t_{off}$, may be defined such that it encompasses the amount of time required to transmit the plurality of chips associated with a symbol. For example, if a transmitter 102 were to transmit chips at a "chip rate" of 3.84 Times.$10^6$ chips/second, with each symbol comprising 16 chips, a time, $\Delta T$ is defined to be equal to (16/(3.84 Times.$10^6$)) seconds, or approximately 4 microseconds.

In an exemplary embodiment of the present invention, a signal received by the receiver 104 includes a plurality of signal clusters. The plurality of signal clusters may originate from a single transmit antenna or from multiple transmit antennas. The plurality of transmit antennas may be located at a single BTS, or dispersed among a plurality of BTSs. The receiver 104 may be capable of receiving signals via a single antenna or a plurality of antennas. The receiver 104 may be adapted to track a time of arrival of multipath signals and may enable an efficient combining of individual distinct path signals within the multipath signals, into a single output represented as a pair of a complex signals comprising an in-phase component (I) and a quadrature phase component (Q). The receiver 104 may generate a received signal comprising a plurality of individual distinct path signals within a signal cluster, and may reduce overhead associated with managing and processing a plurality of individual distinct path signals in a multipath when compared to some conventional rake receivers.

Positioning of the group fingers of the CPP may be based on timing information produced by a Delay Locked Loop (DLL), which provides a timing reference with respect to the transmitted signal. By using the DLL, the alignment of the group fingers may be established on a sub-chip-time basis. Selection of the sub-chip-time alignment may be performed to achieve maximal channel estimate energy for a particular plurality of individual distinct path signals upon which the CPP operates. These operations will be described further herein with reference to FIGS. 8-10.

Figure 2:
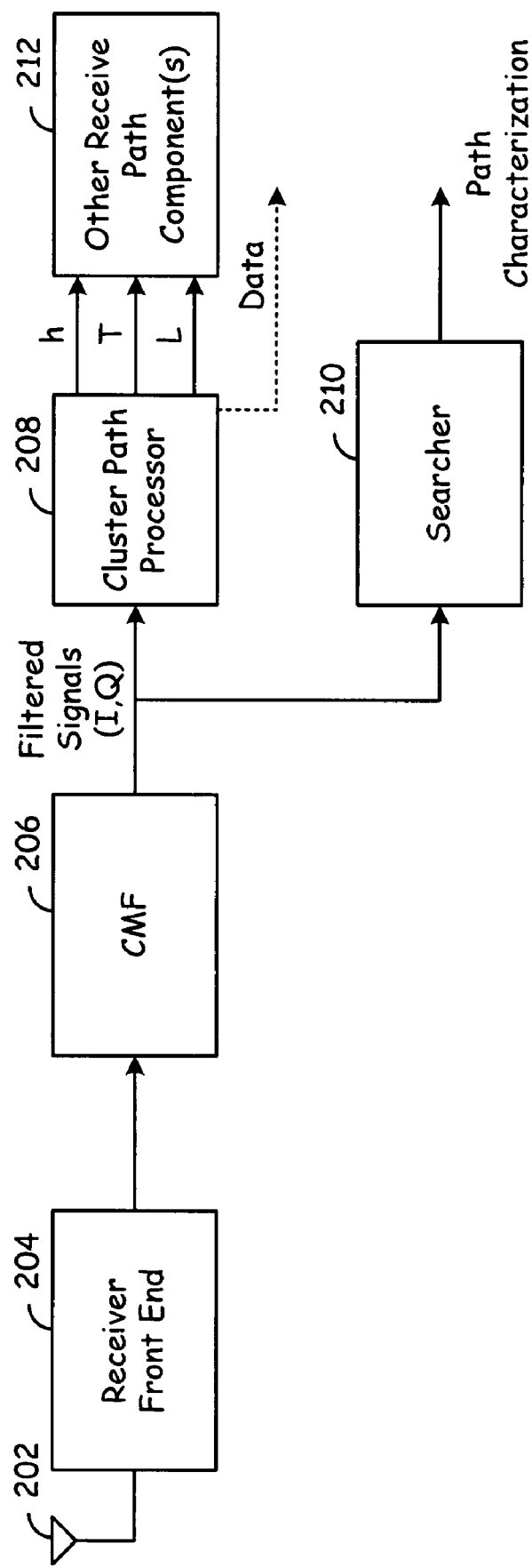
FIG. 2 is a block diagram illustrating an exemplary signal cluster preprocessor in a mobile receiver, in accordance with an embodiment of the present invention.

FIG. 2 is a block diagram illustrating an exemplary signal cluster preprocessor in a mobile receiver, in accordance with an embodiment of the present invention. Referring to FIG. 2, there is shown an antenna 202, a receiver front end block 204, a chip matched filter (CMF) block 206, a cluster path processor (CPP) block 208, and a searcher block 210.

The antenna 202 may comprise suitable logic, circuitry, and/or code that may be adapted to receive RF signals. The receiver front end block 204 may comprise suitable logic, circuitry, and/or code that may be adapted to receive RF signals as input and process the RF signals to a baseband frequency. The baseband signal may be sampled digitally at a predetermined rate sufficient for the bandwidth of the channel, and the sampled data may be the output of the receiver front end block 204. The CMF block 206 includes a pair of (I and Q) chip matched filters implemented by suitable logic, circuitry, and/or code that may be adapted to digitally filter the I and Q components of the signal received from the receiver front end block 204 utilizing a process that is matched to a corresponding process utilized by the transmitter. Specifically, the match filter is a square root raised cosine type. The received signal may also be band limited to a bandwidth of interest.

The CPP block 208 may comprise suitable logic, circuitry, and/or code that may be adapted to receive a digital signal and subsequently generate channel estimates, h, comprising an amplitude and phase representation of the complex components I and Q of each channel estimate component. The CPP block 208 may also generate a timing reference signal, T, based on the signal received from the CMF 206. An output signal from the block CPP block 208 may comprise channel estimates, and/or a timing reference signal. The CPP block 208 may also output a lock detect signal, L, that indicates whether the CPP block has locked upon incoming signal. The CPP block 208 provides these outputs to other receive path component(s) 212 of the mobile receiver. In other embodiments, the CPP block 208 extracts data from the incoming signal.

The searcher block 210 may comprise suitable logic, circuitry, and/or code that may be adapted to compute a first moment time $T_{fm}$, in a received signal cluster. The searcher block 210 may detect a signal energy level that is associated with a plurality of received individual distinct path signals. The searcher block 210 may identify an individual distinct path signal that comprises a maximum signal energy level within a received signal cluster, and compute a corresponding arrival time at which the signal may be received at the receiver 104. The arrival time of the individual distinct path signal that comprises the maximum signal energy may represent the first moment time $T_{fm}$. The searcher block 210 may compute a value, m, that represents a number of time offsets subsequent to a start of a delay spread wherein the first moment time is located. The searcher block 210 may also generate a plurality of Gold code parameters that are utilized in applying Gold codes to received individual distinct path signals 110, 112 and 114.

In operation, the antenna 202 may receive RF signals, which may be communicated to the receiver front end block 204. The receiver front end block 204 may process received RF signals by filtering, amplifying, and down-converting the RF signal to baseband frequency. The down-converted signal may be digitally sampled by an analog-to-digital converter at a pre-determined sampling rate. The digitally sampled signal may be the output of the receiver front end block 204, and this signal may be communicated to the CMF block 206. The CMF block 206 may perform digital band pass filtering on the baseband signal to limit the bandwidth of the signal received from the receiver front end 204. The band limited signal produced by the CMF block 206, comprising filtered signals I and Q, may be communicated to the searcher block 210 and the CPP block 208. The searcher block 210 may compute a first moment time, $T_{fm}$, based on the input filtered I and Q signals, a number of time offsets, m, and a plurality of Gold code parameters. The values computed by the searcher block 210 may be communicated to the CPP block 208. The CPP block 208 may utilize the first moment time, number of time offsets, and Gold code parameters, received from the searcher block 210, to process the input filtered I and Q signal to generate output signals, which may be the complex phase and amplitude components of channel estimates that are computed, based on individual distinct path signals received at the antenna 202. The CPP block 208 may also generate timing reference signals. The generated channel estimate and timing signals may be outputs from the CPP block 208 and may be utilized to combine the various individual distinct path signals that are components in a received signal cluster.

Figure 3A:
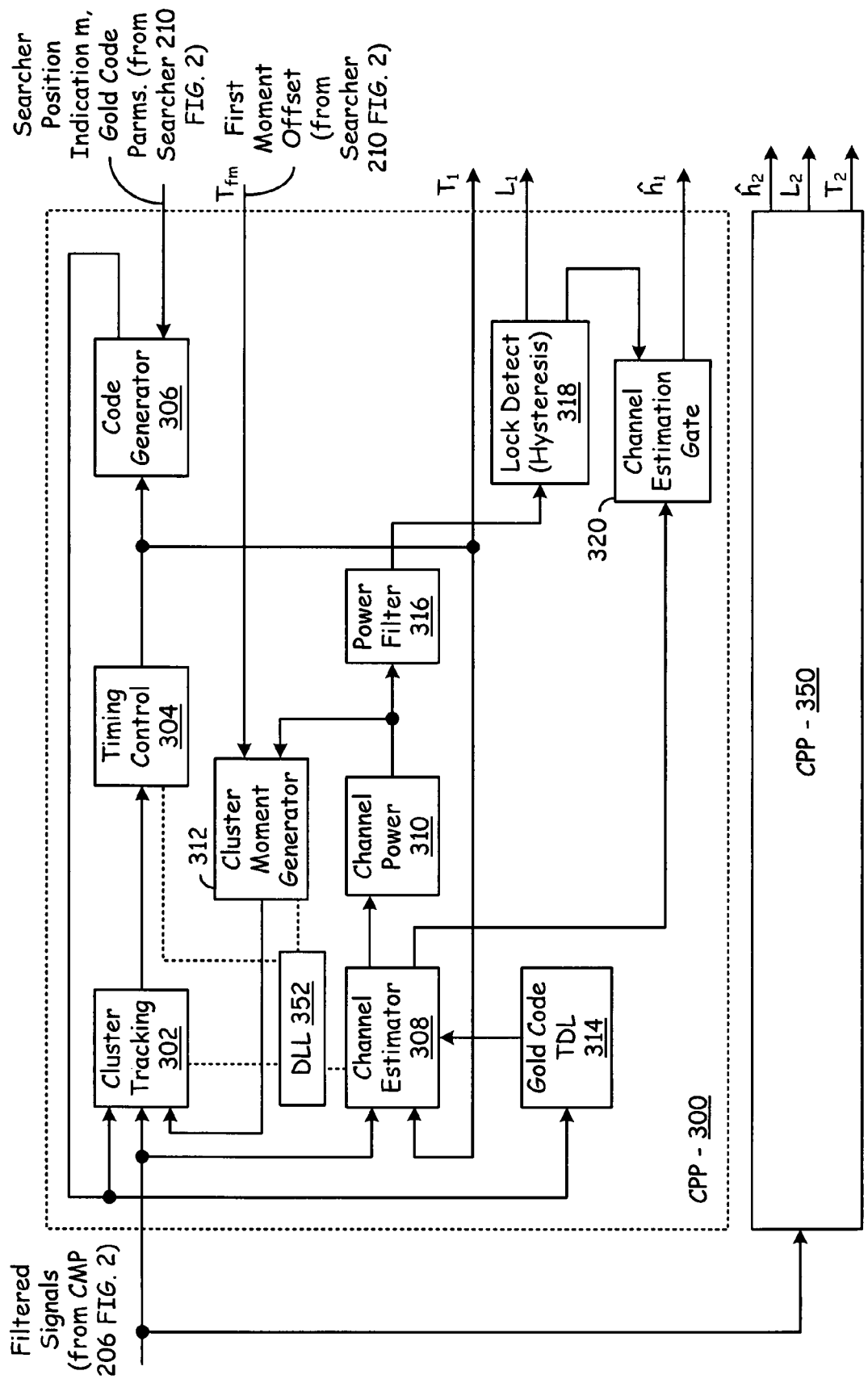
FIG. 3a is a block diagram of an exemplary cluster path processor (CPP), in accordance with an embodiment of the present invention.

FIG. 3a is a block diagram of an exemplary cluster path processor (CPP), in accordance with an embodiment of the present invention. Referring to FIG. 3a, there are shown the cluster path processors 300 and 350. The cluster path processor 300 may comprise a cluster tracker block 302, a timing control block 304, a local code generator block 306, a channel estimator block 308, a channel power block 310, a cluster moment generator block 312, and a Gold code TDL block 314. Input to the cluster path processor 300 may comprise the filtered signal from the CMF block 206 (FIG. 2), and first moment time, $T_{fm}$, first moment offset, m, and Gold code parameters from the searcher block 210. The CPP 300 may output complex channel estimates $h_1$, and a timing reference signal $T_1$, while the CPP 350 may output complex channel estimates $h_2$, and a timing correction signal $T_2$.

Regarding the CPP 300, the cluster tracker block 302 may comprise suitable logic, circuitry, and/or code that may be adapted to track the location in time, or temporal location, of a received signal cluster. The cluster tracker block 302 may receive, as input, the filtered signal from the CMF block 206, a signal from the code generator 306, and a signal from the cluster moment generator 312. The filtered signal from the CMF block 206 may comprise a plurality of chips in a W-CDMA spread spectrum signal. The cluster tracker block 302 may utilize a descrambling code contained in the signal from the code generator 306 to perform descrambling on the filtered signal from the CMF block 206. The descrambling code may be applied to the filtered signal at a time, which may be based on a timing signal contained in an input signal from the cluster moment generator 312. The cluster tracker block 302 may generate a timing adjustment signal based on the result of the application of the descrambling code, from the code generator 306, to the filtered signal, wherein the application may be time-aligned based on the timing signal from the cluster moment generator 312. The generated output from the cluster tracker block 302 may be communicated to the timing control block 304.

The timing control block 304 may comprise suitable logic, circuitry, and/or code that may be adapted to monitor an arrival time of a signal cluster, and to generate a timing correction signal. The timing control block 304 may receive input, comprising a timing adjustment signal, from the cluster tracking block 302. Based on the input, the timing control block 304 may generate as output, a timing reference signal that indicates the temporal location of a received multipath signal. The timing reference signal generated by the timing control block 304 may be communicated to the code generator block 306 and to the channel estimator block 308. In addition, the timing reference signal may be an output from the cluster path processor 300 as the signal $T_1$.

The code generator block 306 may comprise suitable logic, circuitry, and/or code that may be adapted to generate time-aligned Gold codes, and/or orthogonal variable spreading factor (OVSF) codes, for example, serially at a defined rate. The code generator block 306 may receive input from the timing control block 304 that may be utilized to control a timing sequence in which Gold codes and/or OVSF codes are generated. The codes generated by the code generator block 306 may be communicated to the cluster tracker 302, and to the Gold Code TDL 314.

The channel estimator block 308 may comprise suitable logic, circuitry, and/or code that may be adapted to compute complex channel estimates comprising a representation of the complex components I and Q of each channel estimate component. The channel estimator block 308 may receive as input the filtered signal from the CMF block 206, and the timing signal from timing control block 304. In addition, the channel estimator block 308 may receive input from the Gold Code TDL 314. The channel estimator block 308 may utilize the descrambling, or despreading (OVSF) code from the Gold Code TDL 314, and the timing reference signal from the timing control block 304, to perform descrambling, and/or despreading on the filtered signal from the CMF block 206. The channel estimator block 308 may utilize the timing signal from the timing control block 304 to time-align the application of the descrambling code from the Gold Code TDL to the filtered spread spectrum signal from the CMF block 206. The descrambling and despreading operation may be identical to the correlation—mentioned before—that provides a metric that measure the validity of the timing of the Gold Code (WCDMA reference signal) at each of the cluster grid points. The metric may be identical to the channel response-h and the Gold Code is the reference signal transmitted. As a result of the descrambling process, the channel estimator block may extract pilot symbols contained within the received signal cluster. The channel estimator block 308 may then compute complex channel estimates, $h_k(i)$, based on information contained in the pilot signals that are received across a duration comprising a delay spread.

In various embodiments of the present invention, the received pilot signals, comprising individual distinct path signals in a signal cluster, may be processed utilizing a grid comprising grid elements that generate a plurality of channel estimates, $h_k(i)$, as described in equation [5]. Stating more generally, the information (chip pattern) that is transmitted within pilot signals, x, may be known at the receiver 104, and since the corresponding values of the signals received at the receiver, y, may also be known at the receiver, the values of the channel estimates $h_k(i)$ may be computed by correlating x with y; provided x is uncorrelated with other signals in y. The complex channel estimate $h_1$, that is output from the CPP 300, may be represented as a vector that comprises at least a portion of a plurality of paths estimates $h_k(i)$ computed in accordance with equation [5]. An individual path estimate $h_k(i)$ may be computed for a corresponding grid element—i. In a grid that comprises L grid elements, at least a portion of a plurality of L channel estimates $h_k(i)$ (i=0, L−1) may be contained in the vector representation $h_1$. The complex channel estimate $h_2$, that is output from the CPP 350, may correspondingly be represented as a vector that comprises at least a portion of a plurality of channel estimates $h_k(i)$ computed in accordance with equation [5].

The channel power block 310 may comprise suitable logic, circuitry, and/or code that may be adapted to compute an aggregate radiated power level of the received signal cluster. The channel power block 310 may receive as input, channel estimates, $h_k(i)$, from the channel estimator block 308. The channel power block 310 may utilize the received channel estimate, $h_k(i)$, to compute a power level corresponding to each of the grid elements i. Thus, the channel power block 310 may compute a power level that corresponds to a received individual distinct path signal that is received at a time instant, T(n), wherein the received signal arrives at the receiver within a duration of a signal cluster. A time T(n) may be derived based on a received first moment time, $T_{fm}$, as described in equation [4]. For a given channel estimate that corresponds to an $i^{th}$ grid element, $h_k(i)$, a channel power level may be based on a squared magnitude of the channel estimate and is computed:

$$\text{Power Level}[h_k(i)] \cong \|h_k(i)\|^2 \qquad \text{equation [6]}$$

The power filter block 316, may comprise suitable logic, circuitry and/or code that computes a plurality of average values, avg{power level [ĥ$_k$(i)]}, for a corresponding plurality of values, power level [ĥĥ$_k$(i)], measured over a duration that is long compared to the duration of a delay spread. For example, the power filter block 316 may average power levels, power level [ĥĥ$_k$(i)], over duration of 10 milliseconds (ms).

Among the plurality of computed power levels, power level [ĥ$_k$(i)], the lock detect block 318, may apply a threshold function to the power levels that are computed by the average values generated by the power filter block 316. The threshold function may be utilized to generate a plurality of lock indicator signals, L$_k$ (i), which indicate whether average values, avg{power level [ĥ$_k$(i)]}, generated by the power filter block 316 are less than a determined approximate threshold power level. For example, given threshold power levels, P$_{thresh\_high}$ and P$_{thesh\_low}$, the lock indicator signals (e.g., L$_1$) that may be output by the lock detect block 318 may be computed:

$$l_k(i) \cong \begin{Bmatrix} 1 \text{ for } \|\hat{h}_k(i)\|^2 \geq P_{thresh\_high} \\ 0 \text{ for } \|\hat{h}_k(i)\|^2 \leq P_{thresh\_high} \end{Bmatrix} \quad \text{equation [7]}$$

if at least one of a preceding plurality of power levels, power level [ĥ$_j$(i)], has a value that is less than P$_{thesh\_low}$, and not one of the preceding plurality has a value that is greater than or equal to P$_{thesh\_high}$.

The plurality of lock indicator signals, I$_k$ (i), may be communicated, by the lock detect block 318, to the channel estimation gate block 320. The plurality of lock indicator signals, I$_k$ (i), may be also communicated as outputs from the CPP 300.

The channel estimation gate block 320 may comprise suitable logic, circuitry, and/or code to select, from a received plurality of channel estimates, ĥ$_k$ (i), at least a portion of the received plurality that comprise values that are determined to be valid based on a corresponding received plurality of lock indicator signals I$_k$ (i). The channel gate block 320 may generate a channel estimate vector, ĥ$_1$, comprising a plurality output channel estimates, output [h$_k$(i)], according to:

$$\text{Output } [\hat{h}_k(i)] \cong \begin{Bmatrix} \hat{h}_k(i) \text{ for } 1_k(i) = 1 \\ 0 \text{ for } 1_k(i) = 0 \end{Bmatrix} \quad \text{equation [8]}$$

where the channel estimate vector, h$_1$, comprises a plurality of values output[ĥ$_k$(i)], and k comprises a range of values from 0 to L−1 corresponding to each of the plurality of grid elements spanning a delay spread in the received signal cluster.

The cluster moment generator block 312 may comprise suitable logic, circuitry, and/or code that may be adapted to perform a first moment calculation based on a received plurality of computed power levels, power level[ĥ$_k$(i)] from the channel power block 310, and a first moment offset, m, from the searcher block 210. Based on this information, the cluster moment generator 312 may compute an aggregate power level for at least a portion of the received signal cluster that comprises individual distinct path signals measured at time instants T(n) for n<m, Pwr_E$_k$. The cluster moment generator 312 may compute a subsequent aggregate power level for at least a portion of the received signal cluster that comprises distinct path signals measured at time instants T(n) for n>m, Pwr_L$_k$. The aggregate power levels, Pwr_E$_k$ and Pwr_L$_k$, may be communicated to the cluster tracker block 302.

The Gold Code TDL block 314 may comprise suitable logic, circuitry, and/or code that may delay the application of descrambling and/or dispreading codes, for example, Gold codes and OVSF codes. The Gold Code TDL block 314 may receive as input, descrambling codes generated by the code generator block 306. The Gold Code TDL 314 may utilize a code tracking loop to regenerate the received scrambling codes for each of the time instants T(n) that span the delay spread associated with the received signal cluster. A corresponding grid of scrambling code elements 0, . . . , L−1 may be communicated to the channel estimator block 308.

In operation, filtered W-CDMA spread spectrum signals from the CMF block 206 containing a plurality of pilot signals from multiple base transceiver stations, may be communicated to an input of a plurality of cluster processor blocks within 208. Since information communicated in the transmitted pilot signals sent from the multiple BTS is the same, each BTS may scramble the pilot signal utilizing a unique Gold code. The cluster tracker block 302 may also receive as inputs an output generated by the code generator block 306, and an output generated by the cluster moment generator block 312. The input to the cluster tracker 302 from the code generator block 306 may comprise a descrambling code that was generated based on timing information derived from a previously received individual distinct path signal. The output from the cluster moment generator block 312 may comprise an error signal that was computed in accordance with equation [9]. The cluster tracker block 302 may utilize the input from the code generator block 306 to descramble the filtered signal from the CMF block 206. The descrambling code received from the code generator block 306 may be applied to the filtered signal from the CMF block 206 at a time instant based on the error signal received from the cluster moment generator block 312.

The cluster tracker block 302 may generate an error signal, error$_k$, based on a difference between aggregate power levels received from the cluster moment generator block 312:

$$Error_k \cong \sum_{i=0}^{m-1} \|\hat{h}_k(i)\|^2 - \sum_{i=m+1}^{L-1} \|\hat{h}_k(i)\|^2 \quad \text{equation [9]}$$

where L may represent the number of grid elements that is contained within a delay spread for the received signal cluster. The first term on the right hand side of equation [9] may represent the aggregate power level, Pwr_E$_k$, that was computed by the cluster moment generator 312. The second term on the right hand side of equation [9] may represent the aggregate power level, Pwr_L$_k$, that was computed by the cluster moment generator 312.

In operation, a current computed error signal, error$_k$, computed for a current signal cluster at a current time instant, k, may differ in value in comparison to a corresponding subsequent computed error signal, error$_p$, computed for a subsequent signal cluster at a subsequent time instant, p.

The cluster tracker 302 may perform an averaging of a plurality of computed error signals, error$_k$, over a duration that is long compared to the duration of a delay spread, 10 ms, for example. An averaged error signal, avg(error$_k$), may represent a weighted average error signal based on a current computed error signal, error$_k$, and a plurality of preceding computed error signals, error$_q$, where q is not equal to k. The averaged error signal value may be thresholded, and the averaged error signal value may be utilized to generate a timing adjustment signal. If a magnitude of the averaged error signal value is less than a threshold value, $T_{adj}$, the timing adjustment signal may be set to a value of 0. For magnitudes of the averaged error signal value that are greater than $T_{adj}$ the timing adjustment signal may be set to a value in accordance with receiver timing resolution, and sign of accumulated error signal error$_k$.

The averaging of error signals, error$_k$, computed by the cluster tracker 302 may isolate changes in individual error signals, error$_k$, from temporary changes in the timing adjustment signal that is generated by the cluster tracker 302. In turn, this may enhance the stability of time tracking of received signal clusters in various embodiments of the present invention. To further enhance the stability of operation in various embodiments of the present invention, the magnitude of the averaged error signal value, avg(error$_k$), may be thresholded to avoid generation of timing correction signals for averaged error signal values that are too small, for example a summation value that will result in an adjustment far less that the change a Tc/16 adjustment would have caused. The timing adjustment signal may be communicated to the timing control block 304.

The timing control block 304 may utilize the timing adjustment signal from the cluster tracker block 302 to generate a set of timing reference signals $T_1$, which may represent, for example, be a locally generated code boundary or period. This timing reference signal may also be communicated to the code generator block 306, and to the channel estimator block 308. In addition, the timing reference signal may be an output from the cluster path processor 300 as the set of signals $T_1$.

A time corrected first moment time, $T'_{fm}$, may be generated by the timing control block 304 that represents a time correction of the first moment time, $T_{fm}$, that was received from the searcher block 210. The time corrected first moment time, $T'_{fm}$, may be expressed:

$$T^1{}_{fm} = T_{fm} - \text{Error} \qquad \text{equation [10]}$$

where the error term is based on the timing adjustment signal received from the cluster tracker 302.

If the received first moment time, $T_{fm}$, represents a time instant corresponding to a center time for signal energy in the received signal cluster, the error term may be approximately equal to 0. Thus, the time corrected first moment time, $T'_{fm}$, as computed based on equation [10], may be approximately equal to the first moment time, $T_{fm}$, that was received from the searcher block 210. The grid, in this case, may be in proper time alignment to track the received signal cluster and values of T(n) that correspond to time instants associated with each grid element may be computed in accordance with equation [4].

If the first moment time represents a time instant that occurs before the center time for signal energy in the received signal cluster, the error term, as computed in accordance with equation [9], may comprise a numerical value that is less than 0. In the case of a negative error term, the time corrected first moment time, $T'_{fm}$, as computed in accordance with equation [10], may comprise a value that is greater than the value of the first moment time, $T_{fm}$, that was received from the searcher block 210. The grid, in this case, may not be in proper time alignment to track the received signal cluster. Accordingly, values of T(n) that correspond to time instants associated with each grid element may be computed in accordance with equation [11]:

$$T(n) \cong T^1{}_{fm} + (n - m - 1) t_{off} \qquad \text{equation [11]}$$

If the first moment time represents a time instant that occurs after the center time for signal energy in the received signal cluster, the error term, as computed in accordance with equation [9], may comprise a numerical value that is greater than 0. In the case of a positive error term, the time corrected first moment time, $T'_{fm}$, as computed in accordance with equation [10], may comprise a value that is less than the value of the first moment time, $T_{fm}$, that was received from the searcher block 210. The grid, in this case, may not be in proper time alignment to track the received signal cluster and values of T(n) that correspond to time instants associated with each grid element may be computed in accordance with equation [11].

The timing control block 304 may perform averaging of a plurality of received timing adjustment signals. The averaging of the timing adjustment signals may isolate changes in the timing reference signals, $T_1$, from temporary changes in the timing adjustment signal that is received from the cluster tracker 302. In turn, this may enhance the stability of time tracking of received signal clusters in various embodiments of the present invention.

The code generator block 306 may receive the timing reference signals, $T_1$, from the timing control block 304. Based on the timing signal, $T_1$, the code generator 306 may serially generate descrambling Gold codes and/or despreading OVSF codes. The code generator block 306 may receive inputs from the searcher block 210 comprising a searcher position indication, and code identification. The searcher position identification may comprise information that indicates to the code generator 306 a start time, $t_{start}$, indicating a time instant for the arrival of the first individual distinct path signal in a received signal cluster. The code identification may comprise information that may be utilized by the code generator block 306 to determine a code sequence to generate. The code sequences, also referred to as codes, generated by the code generator block 306 may be communicated to the cluster tracker block 302 and to the Gold Code TDL block 314.

The Gold Code TDL block 314 may receive as an input the Gold codes output by the code generator block 306. The Gold Code TDL block 314 may delay these codes such that the application of the despreading code on a chip at the receiver may be in precise time-alignment with the application of the spreading code on the corresponding symbol at the transmitter. The time-aligned despreading codes may be output from the Gold Code TDL communicated to the channel estimator block 308.

The timing reference signals, $T_1$, from the timing control block 304 may comprise a timing reference that is utilized for subsequent processing in a mobile receiver, for example, processing based on maximum ratio combining (MRC), or despreading. The Gold Code TDL block 314 may further refine this estimate to generate a time-aligned version of the Gold code that may be accurate to within approximately 1 chip time unit of a true value of the first moment time, $T_{fm}$, for the received signal cluster.

In operation, a current computed power level [$h_k(i)$] associated with an individual distinct path signal in a current signal cluster at a current time instant, k, may differ in value in comparison to a corresponding subsequent computed power level [$\hat{h}_p(i)$] associated with an individual distinct path signal in a subsequent signal cluster at a subsequent time instant, p.

The averaging performed by the power filter block 316 may enable the CPP 300 to isolate changes in the values of output channel estimates, $h_1$, from temporary fluctuations in channel estimate values, $\hat{h}h_k(i)$, that are detected within the CPP 300. Consequently, various embodiments of the present invention may enable the implementation of rake receiver designs that achieve stable performance level over a plurality of received signal clusters.

The plurality of lock indicator signals, $I_k(i)$, generated by the lock detect block 318 may be utilized to determine if the corresponding channel estimate $\hat{h}h_k(i)$ comprises a value that is valid. If one of the plurality of lock indicator signals, $I_k(i)$, is equal to 1, the corresponding channel estimate value, $h_k(i)$, may comprise a valid value. If one of the plurality of lock indicator signals, $I_k(i)$, is equal to 0, the corresponding channel estimate value, $h_k(i)$, may not comprise a valid value. Values of $\hat{h}h_k(i)$ that are invalid may be discarded.

Similarly, the cluster path processor, 350, may receive as input the filtered data from the CMF block 206, and may generate as outputs channel estimates, $h_2$, and a timing correction signals, $T_2$. The cluster path processor 350 may be adapted to receiving individual distinct path signals which are transmitted by a separate antenna from the antenna utilized to transmit individual distinct path signals that are received by the processor 300.

In various embodiments of the present invention, the cluster path processor 300 may correct timing errors wherein a signal cluster is not received in accordance with a received first moment time by computing an error term, in accordance with equation [9]. The error term may be utilized to apply a time correction to the received first moment time, and to subsequently generate a time corrected first moment time. A grid, comprising a plurality of grid elements, each comprising a correlator, that process a received plurality of individual distinct path signals at time instants, $T(n)$ computed in accordance with equation [4], may be shifted in time to track the received signal cluster based on an error term computed in accordance with equation [9]. The time tracking for the received signal cluster may be achieved based on a single first moment time, or time corrected first moment time. In some conventional rake receivers, time tracking of a plurality of L individual distinct path signals may comprise a corresponding plurality of L independent time tracking decisions. In various embodiments of the present invention, time tracking of a plurality of L individual distinct path signals may comprise a single time tracking decision based on either a first moment time, or a time corrected first moment time. The first moment time, or the time corrected first moment time, may be computed based on an aggregate signal energy level as measured across a duration comprising the delay spread of a received signal cluster.

The CPP 300 may include a Delay Locked Loop (DLL) 352 that provides timing references for various of the elements of the CPP 300, e.g., cluster tracking block 302, timing control block 304, channel estimator 308, etc. Of course, the DLL 352 may provide timing references to other of the components of the CPP 300 also/alternatively. Generally, the DLL 352 is used to align a plurality of group fingers of the CPP 300. Such alignment may be on a course level to align the plurality of group fingers of the CPP 300 with respect to a plurality of individual distinct path signals in a signal cluster that is received within a duration comprising a delay spread. Further such alignment may be on a fine level as well, such as a sub-chip-level alignment when the plurality of group fingers are spaced on a chip-level basis. The manner in which these operations are accomplished is described further with reference to FIGS. 7-10.

Figure 3B:
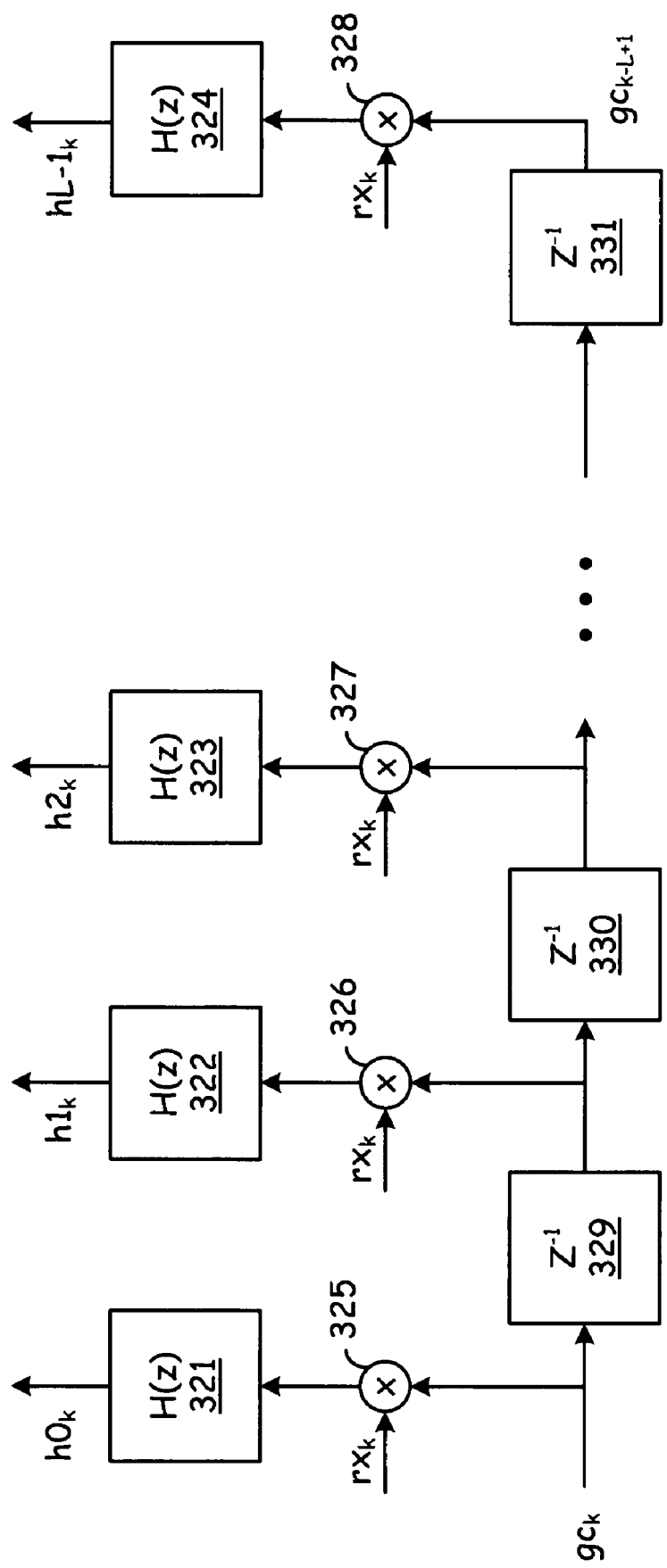
FIG. 3b is a block diagram of an exemplary channel estimation operation—in the CPP, in accordance with an embodiment of the present invention.

FIG. 3b is a block diagram of an exemplary channel estimation operation in the CPP, in accordance with an embodiment of the present invention. With reference to FIG. 3b there is shown a plurality of filter blocks 321,322,323, . . . ,324, a plurality of complex multiplication blocks 325, 326, 327, . . . , 328, and a plurality of delay blocks 329,330, . . . ,331. The delay blocks 329, 330, . . . ,331, may comprise suitable logic, circuitry and/or code that may be adapted to store a time delayed version of the scrambling and OVSF code. The complex multiplication blocks 325,326,327, . . . ,328, may comprise suitable logic, circuitry, and/or code to perform a convolution based on received input signals. The filter blocks 321,322,323, . . . ,324, may comprise suitable logic, circuitry, and/or code to compute a channel estimate based on a received input signal.

In operation, a locally generated code, $gc_k$, for example Gold codes may be generated in association with a grid comprising a corresponding plurality of L grid elements that span a delay spread, achieved by a plurality of delay blocks. At a time instant, a current code, and preceding L−1 previously generated codes are utilized by a corresponding complex multiplication blocks 325,326,327, . . . ,328. The convolver blocks 325,326,327, . . . ,328 may perform a convolution utilizing a corresponding current and/or time delayed code, and a received signal cluster $rx_k$. The received signal cluster may be received from a CMF block 206. The convolution performed by the complex multiplication blocks 325,326, 327, . . . ,328 may produce a plurality of descrambled and/or despread signals. The filter blocks 321,322,323, . . . , 324 may compute corresponding channel estimates, $\hat{h}h_k(i)$, across the grid utilizing a corresponding plurality of descrambled and/or despread signals.

Figure 3C:
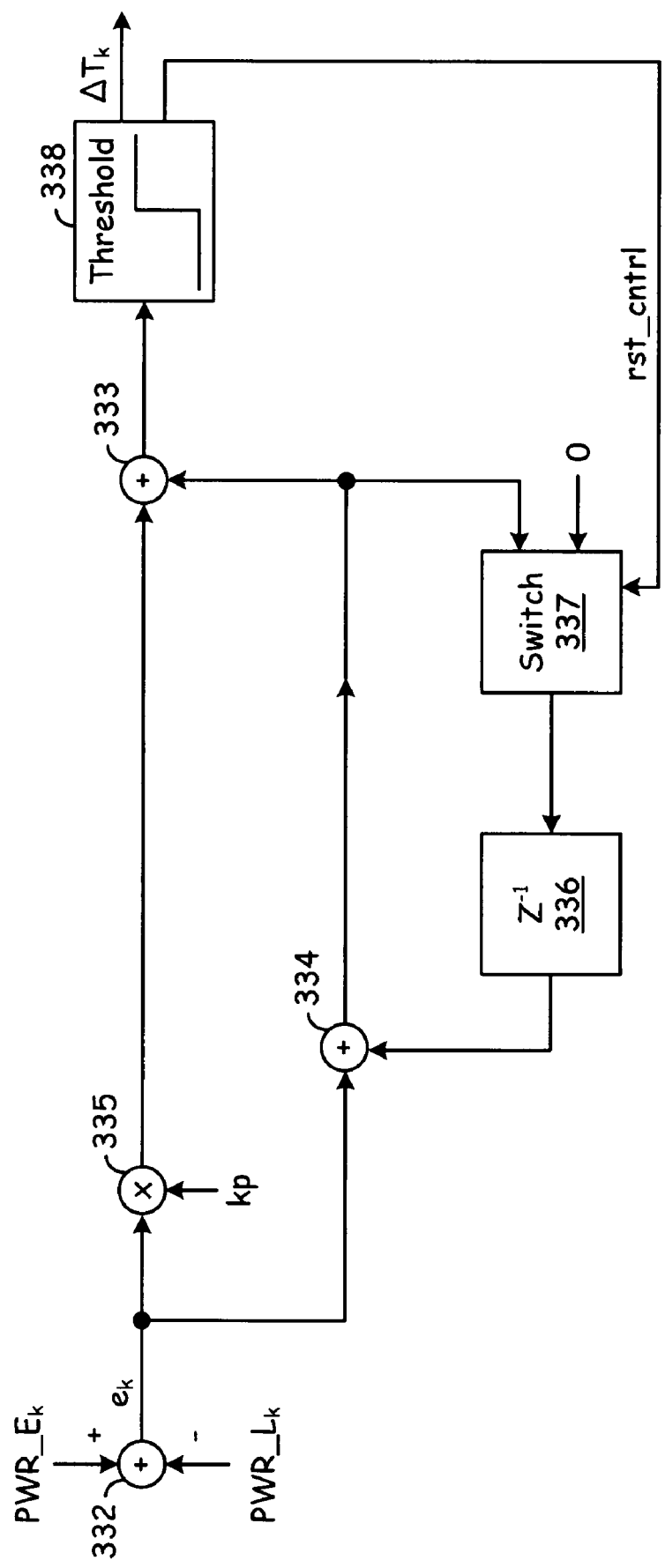
FIG. 3c is a block diagram of an exemplary cluster tracker operation, in accordance with an embodiment of the present invention.

FIG. 3c is a block diagram of an exemplary cluster tracker operation, in accordance with an embodiment of the present invention. With reference to FIG. 3c there is shown a plurality of summing blocks 332, 333, and 334, a multiplier block 335, a delay block 336, a switching block 337, and a threshold block 338. The summing blocks 332, 333, 334 may comprise suitable logic, circuitry, and/or code to generate an output signal based on a sum of received input signals. The multiplier block 335 may comprise suitable logic, circuitry, and/or code that may generate an output signal that comprises a version of an input signal that is scaled according to an input scale factor. The delay block 336 is as described for the plurality of delay blocks 329, 330, . . . , 331. The switching block 337 may comprise suitable logic, circuitry, and/or code that may generate an output signal that comprises a selected one of a plurality of input signals based on a selector input signal. The threshold block 338 may comprise suitable logic, circuitry, and/or code that may compare a value of an input signal to a threshold value. An output signal may be generated based on the comparison.

In operation the summing block 332 may receive computed aggregate power levels, $Pwr\_E_k$ and $Pwr\_L_k$. The summing block 332 may compute a sum that comprises an error value $e_k$. The error signal may be driven to zero by providing timing adjustments to the grid position to ensure that statistical average is approximately equal to 0. The mechanism utilized in this operation may comprise a closed loop, in which timing adjustments affect the corresponding channel and power estimates. The multiplier block 335 may scale the error value $e_k$, based on a scale factor kp, to generate a scaled error approximately equal to $kpe_k$. The summing block 334 may generate a second sum comprising the sum and a time delayed output from the switch 337. The output of the switch 337 may be approximately equal to either a previously generated second sum, or the value 0 based on a value of the rst_cntrl input. The summing block 333 may generate a third sum comprising the scaled sum and the second sum. The threshold block 338 may compare a magnitude of the value of the third sum with a threshold value. A time adjustment signal $\Delta T_k$ may be generated by the threshold block 338. The final output $\Delta T_k$ may be output to the timing control block 304 which may be integrated to generate a timing estimate. A timing correction may be positive, negative, or 0. The timing control operation may integrate the output. If the value of the third sum does not exceed the threshold value, $\Delta T_k$ may be equal to 0.

Figure 3D:
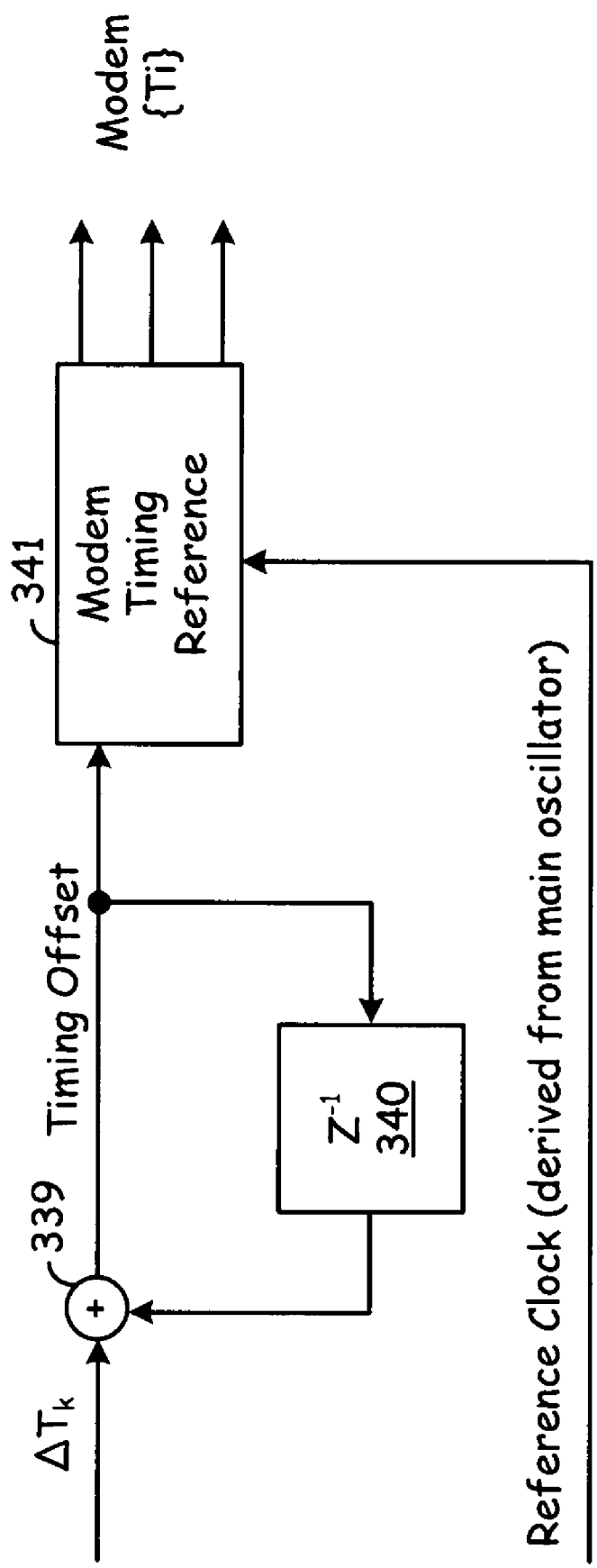
FIG. 3d is a block diagram of an exemplary timing control operation, in accordance with an embodiment of the present invention.

FIG. 3d is a block diagram of an exemplary timing control operation, in accordance with an embodiment of the present invention. With reference to FIG. 3d there is shown a summing block 339, a delay block 340, and a modem timing reference block 341. The summing block 339 is as described for the plurality of summing blocks 332,333,334. The delay block 336 is as described for the plurality of delay blocks 329,330, . . . ,331. The modem timing reference block 341 may comprise suitable circuitry, logic, and/or code to generate a timing reference signal.

In operation, the timing reference may be utilized in a mobile receiver. The timing control operation may comprise integrating a timing correction signal $\Delta T_k$ received from the cluster tracker operation, as described in FIG. 3c, based on the loop formed by the summing block 339 and the delay block 340. The modem timing reference block 341 may also utilize a reference clock that is derived from a main oscillator.

Figure 4:
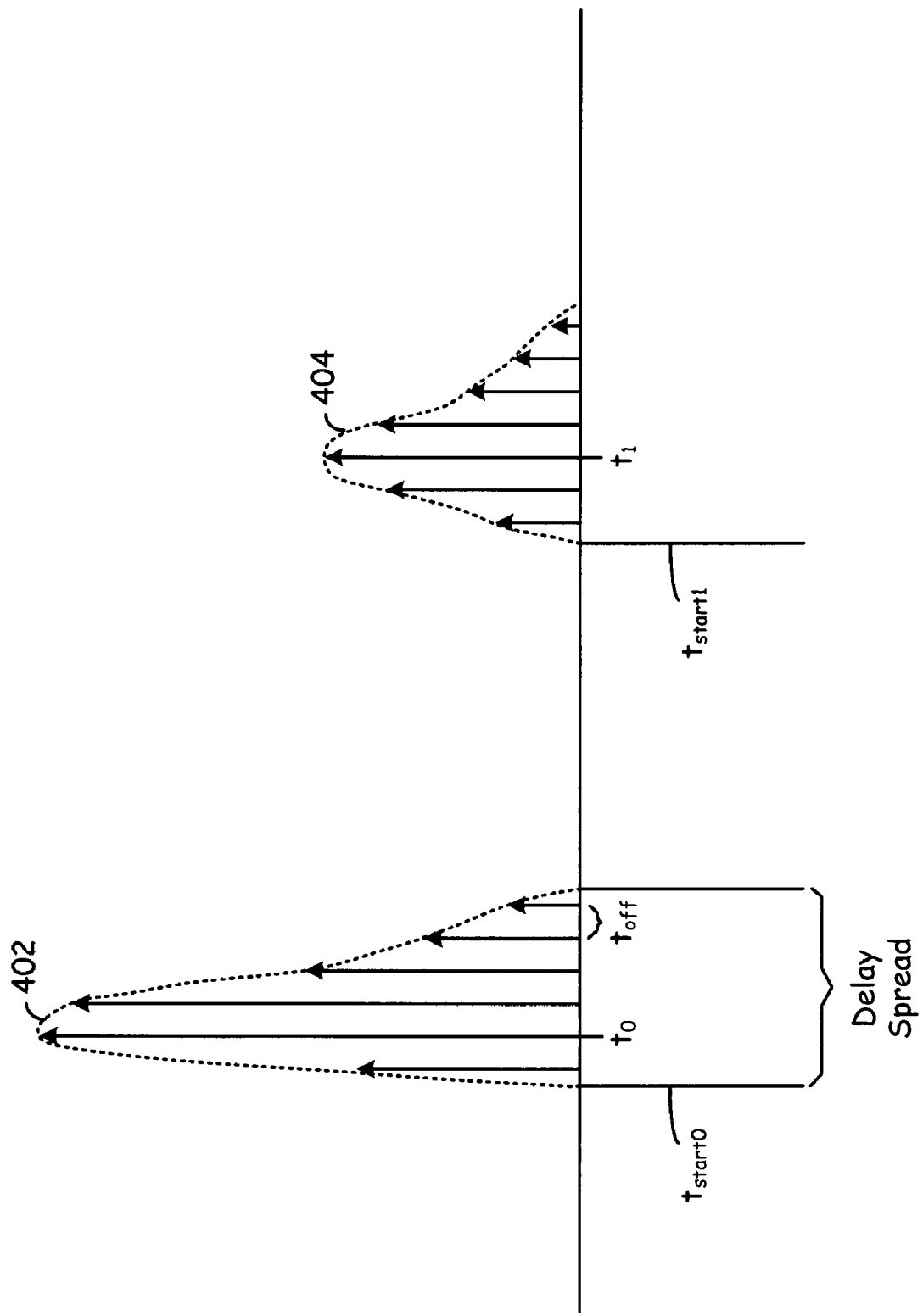
FIG. 4 is an exemplary diagram illustrating various aspects of signal clusters, in connection with an embodiment of the present invention.

FIG. 4 is an exemplary diagram illustrating various aspects of signal clusters, in connection with an embodiment of the present invention. Referring to FIG. 4, there is shown a timing diagram of two signal clusters 402, and 404, each comprising a plurality of individual distinct path signals. The signal cluster 402 may arrive at a mobile receiver at a time instant $t_{start0}$. The time $t_{start0}$ may correspond to a time of arrival for a first individual distinct path signal in the signal cluster 402. Within the signal cluster 402, a plurality of individual distinct path signals associated with the signal cluster 402, may arrive within a time duration, comprising a delay spread, subsequent to the time instant $t_{start0}$. The first moment time associated with the signal cluster 402 may correspond to a time instant $t_0$. A time offset between arrival of an $n^{th}$ individual distinct path signal, and an $(n+1)^{th}$ individual distinct path signal may correspond to a time offset $t_{off}$.

The signal cluster 404 may arrive at a mobile receiver at a time instant $t_{start1}$. The time $t_{start1}$ may correspond to a time of arrival for a first individual distinct path signal in the signal cluster 404. Within the signal cluster 404, a plurality of individual distinct path signals associated with the signal cluster 404, may arrive within a time duration, comprising a delay spread, subsequent to the time instant $t_{start1}$. The first moment time associated with the signal cluster 404 may correspond to a time instant $t_1$. A time offset between arrival of an $n^{th}$ individual distinct path signal, and an $(n+1)^{th}$ individual distinct path signal may correspond to a time offset $t_{off}$ as indicated for the signal cluster 402.

The signal clusters 402, 404 may have been transmitted by distinct transmitting antennas, which may have been located at distinct base transceiver stations 102, for example. When compared to signal 402, the signal 404 may have experienced a longer path to arrive at a receiving antenna 202 in a mobile receiver 104. The signal clusters 402, 404, may be individually processed by the cluster path processors, 300 and 350 respectively, in FIG. 3a, for example.

In an illustrative embodiment of the present invention, the cluster path processors 300 and 350 may be utilized when receiving multipath signals from a BTS that transmits signals from 2 antennas. This mode of operation may be referred to as space time transmit diversity (STTD), which may support receiving modes closed loop 1 (CL1), and closed loop 2 (CL2) as defined by the W-CDMA standard. Alternatively, in a mode of operation, which may be referred to as "macro" diversity, the cluster path processors 300 and 350 may receive multipath signals from separate BTS, each of which may transmit multipath signals from a single antenna.

Figure 5A:
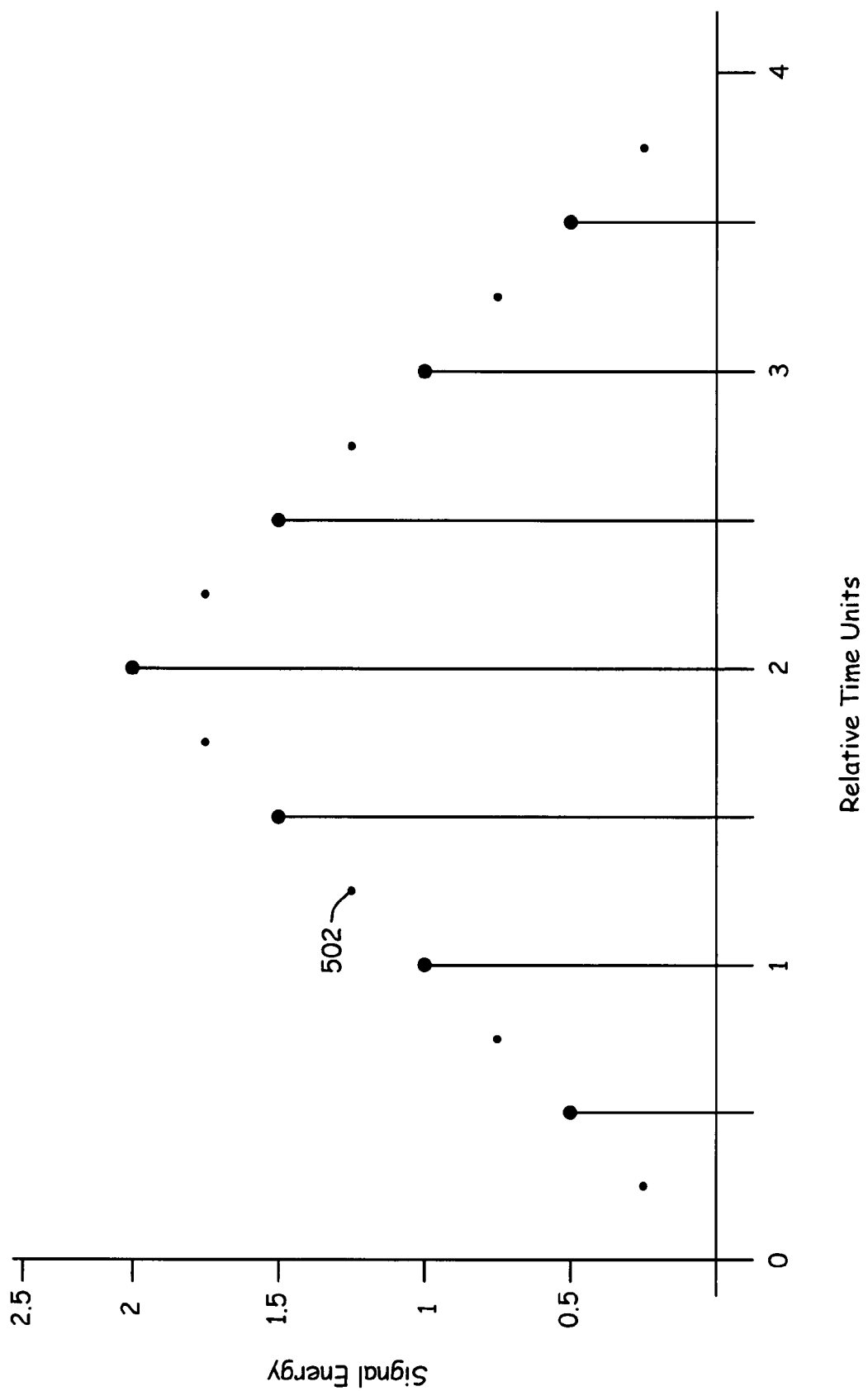
FIG. 5a is a graph that illustrates exemplary cluster moment calculations for a fully acquired signal cluster, in accordance with an embodiment of the present invention.

FIG. 5a is a graph that illustrates exemplary cluster moment calculations for a fully acquired signal cluster, in accordance with an embodiment of the present invention. With reference to FIG. 5a there is shown an exemplary received signal cluster 502. The profile of the signal cluster 502 shows signal energy, E(k), as a function of relative time where relative time may be measured in relation to an expected arrival time of a signal cluster at a mobile receiver. A BTS may transmit a plurality of signal clusters to a mobile receiver where the time between a start of transmission of an $n^{th}$ signal cluster, and a start of transmission of an $(n+1)^{th}$ signal cluster may be defined, in transmission time, as $\Delta$. Relative time may be measured within a $\Delta$ time interval. A delay spread associated with the signal cluster is shown to be approximately 4 relative time units. The time offset is shown to be approximately 0.5 relative time units. In the exemplary signal energy profile of FIG. 5a, the corresponding first moment time, $T_{fm}$, is approximately 2 relative time units. The corresponding first moment offset, m=4. The start time, $t_{start}$, associated with the received signal cluster may be 0 relative time units. The grid may comprise 9 grid elements, thus L=9 in this example. The time instants T(n) corresponding to each of the grid elements may be represented as follows:

$$T(n) \cong \frac{n-1}{2} \qquad \text{equation [12]}$$

where n may be a counting number comprising a range of values from 1 to 9 inclusive, for example. The value T(n) may represent a relative time, that is associated with the $n^{th}$ grid element, within the delay span of a received signal cluster.

As shown in FIG. 5a, the entire signal cluster 502 may lie within a temporal region of observation of the cluster path processor grid. The received signal cluster may, therefore, be considered as being "fully acquired." The characteristics of the received signal cluster may be:

$$E(k) \cong k \text{(for } 0 \leq k \leq 2\text{)} \qquad \text{equation [13a]}$$

$$E(k) \cong 4-k \text{(for } 2 \leq k \leq 4\text{)} \qquad \text{equation [13b]}$$

where k represents time instants, measured in relative time units, at which individual distinct path signals may be received where k may comprise an approximate range of values comprising (0, ½, 1, 1½, 2, 2½, 3, 3½, 4). E(k) may represent a received signal energy level measured at a time instant k.

The cluster moment generator 312 may compute corresponding aggregate power levels:

$$\text{Pwr\_E}_k \cong \sum_{k=0}^{1.5} k^2 \qquad \text{equation [14a]}$$

$$\cong 0.25 + 1 + 2.25$$

$$= 3.5$$

$$\text{Pwr\_L}_k \cong \sum_{k=2.5}^{4} (4-k)^2 \qquad \text{equation [14b]}$$

$$\cong 0.25 + 1 + 2.25$$

$$= 3.5$$

The cluster tracker may compute an error term:

$$\text{Error}_k \cong \sum_{k=0}^{1.5} k^2 - \sum_{k=2.5}^{4} (4-k)^2 \qquad \text{equation [15]}$$

$$\cong 3.5 - 3.5$$

$$= 0$$

In the example of FIG. 5a, the grid may be time aligned with the received signal cluster. Corresponding there may be no timing adjustment applied to the first moment time $T_{fm}$.

Figure 5B:
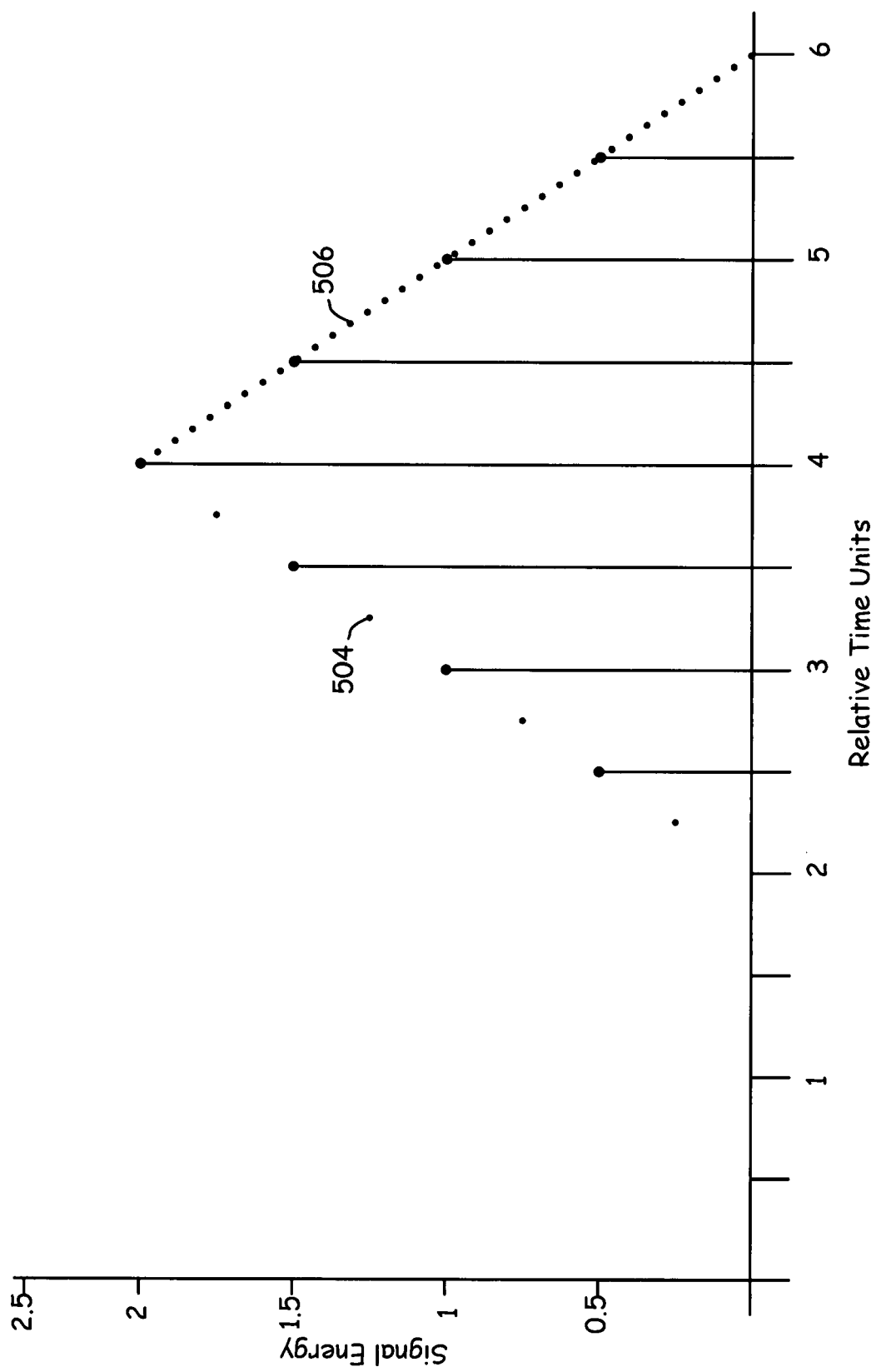
FIG. 5b is a graph that illustrates exemplary cluster moment calculations for a partially acquired signal cluster, in accordance with an embodiment of the present invention.

FIG. 5b is a graph that illustrates exemplary cluster moment calculations for a partially acquired signal cluster, in accordance with an embodiment of the present invention. With reference to FIG. 5b there is shown an acquired portion of a transmitted signal cluster 504, and a non-acquired portion of a transmitted signal cluster 506. The received signal cluster shown in FIG. 5a may have been received by a mobile terminal, but due to a change in the position of the mobile terminal relative to the transmitter, the profile of the acquired portion of signal cluster may have changed as shown in FIG. 5b. Because of the relative time shift in the arrival, at the mobile receiver, of the received signal cluster, the cluster path processor grid may capture only a portion of the signal energy, E(k), in the transmitted signal cluster, comprising 504 and 506. A non-acquired portion of the transmitted signal cluster, 506, may lie outside of the region of signal acquisition. Thus, in FIG. 5b the characteristics of the acquired signal cluster 504 may be:

$$E(k) \cong 0 \text{ (for } 0 \leq k \leq 2\text{)} \quad \text{equation [16a]}$$

$$E(k) \cong k-2 \text{ (for } 2 \leq k \leq 4\text{)} \quad \text{equation [16b]}$$

The cluster moment generator 312 may compute corresponding aggregate power levels:

$$Pwr\_E_k \cong 0 \quad \text{equation [17a]}$$

$$Pwr\_L_k \cong \sum_{k=2.5}^{4} (k-2)^2 \quad \text{equation [17b]}$$
$$\cong 0.25 + 1 + 2.25 + 4$$
$$= 7.5$$

The cluster tracker may compute an error term:

$$Error_k \cong 0 - \sum_{k=2.5}^{4} (k-2)^2 \quad \text{equation [18]}$$
$$\cong 0 - 7.5$$
$$= -7.5$$

In the example of FIG. 5b, the grid may not be time aligned with the received signal cluster. A timing adjustment may be applied correspondingly to the first moment time $T_{fm}$.

Figure 6:
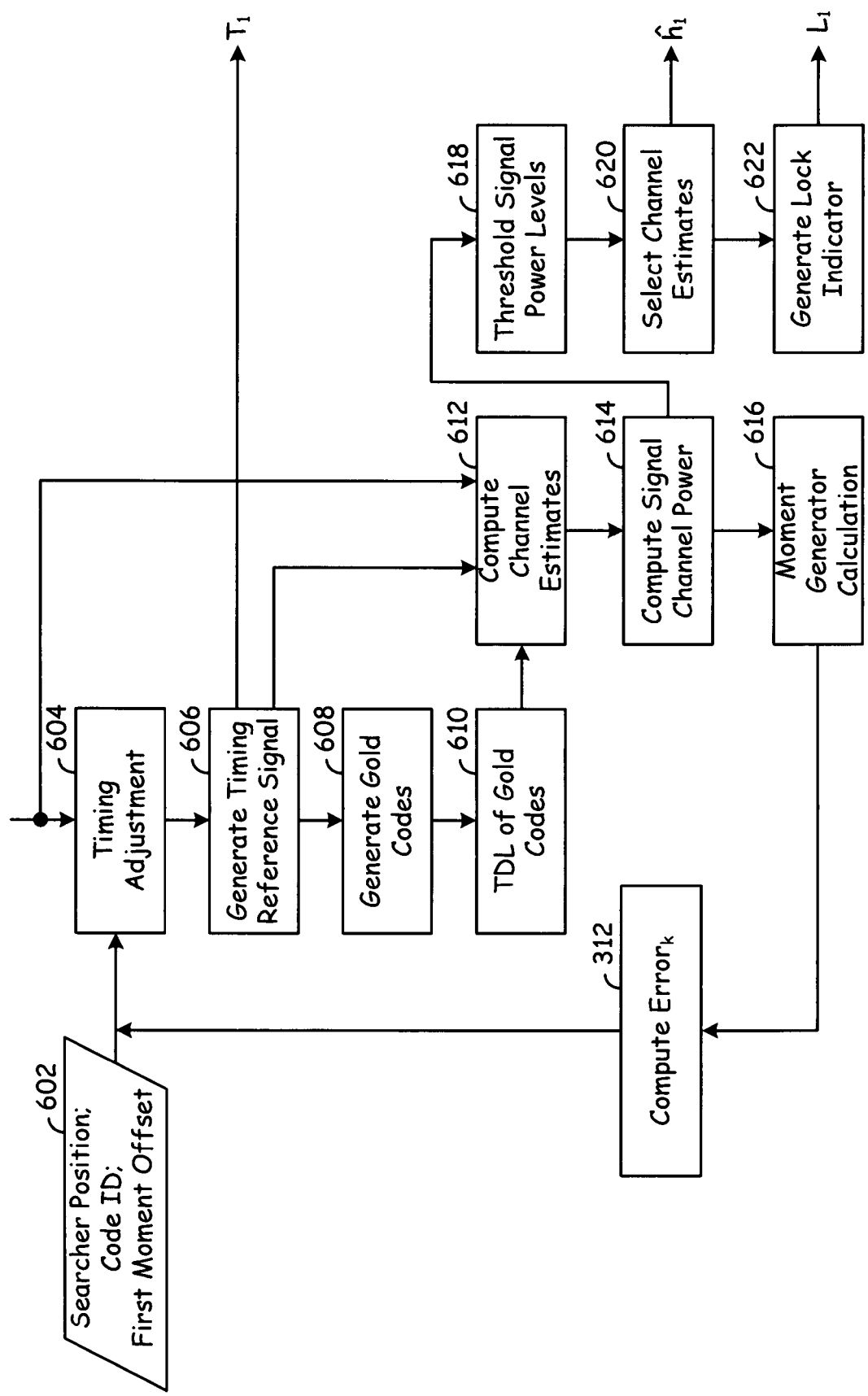
FIG. 6 is an exemplary flow diagram illustrating cluster path processing of a received signal cluster, in accordance with an embodiment of the present invention.

FIG. 6 is an exemplary flow diagram illustrating cluster path processing of a received signal cluster, in accordance with an embodiment of the present invention. With reference to FIG. 6 step 602 describes inputs utilized by the CPP 300 that include a searcher position, a code ID, and a first moment offset. In step 604 a timing adjustment may be computed based on a received filtered signal from the CMF block 206, a generated code, and computed signal cluster energy levels. In step 606 a timing reference signal may be generated based upon the timing adjustment signal generated in step 604. The timing reference signal may be output from the cluster path processor as output signal $T_1$. In step 608 a Gold code may be generated at a time instant in accordance with the timing reference signal generated in step 606. In step 610, the Gold code may be regenerated at distinct time instants within a duration of a delay spread. In step 612, channel estimates may be generated based on the received filtered signal from the CMF block 206, timing reference signal generated in step 606, and Gold codes generated in step 610. In step 614 channel estimates computed in step 612 may be utilized to compute signal channel power. In step 616 the channel power, computed in step 614, may be utilized to compute aggregate signal power levels, $Pwr\_E_k$ and $Pwr\_L_k$, for at least a portion of the received signal cluster. In step 624, an error term, $error_k$, may be computed based on the aggregate signal power levels computed in step 616.

In step 618, the channel power computations from step 614 may be thresholded. In step 620, channel estimates computed in step 612 may be selected based on the results of the thresholding of step 618. The selected channel estimates may be output from the cluster path processor as output signal $h_1$. In step 622 corresponding lock indicators may be generated that indicate the channel estimates selected in step 620. The lock indicators may be output from the cluster path processor as output signal $L_1$.

Figure 7:
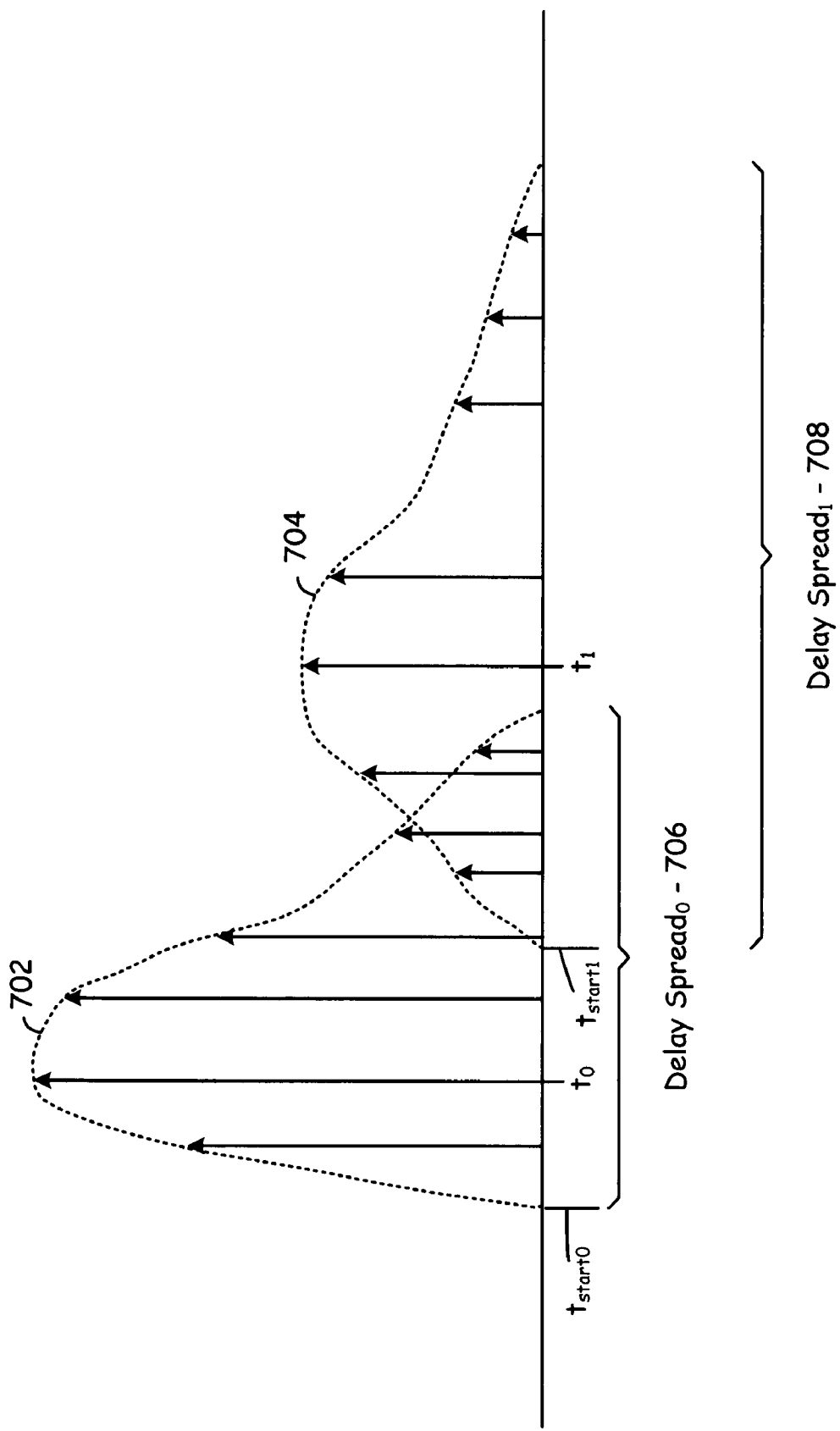
FIG. 7 is an exemplary diagram illustrating various aspects of signal clusters having overlapping delay spreads in connection with an embodiment of the present invention.

FIG. 7 is an exemplary diagram illustrating various aspects of signal clusters having overlapping delay spreads in connection with an embodiment of the present invention. Referring to FIG. 7, there is shown a timing diagram of two signal clusters 702, and 704, each comprising a plurality of individual distinct path signals. The signal cluster 702 may arrive at a mobile receiver at a time instant $t_{start0}$. The time $t_{start0}$ may correspond to a time of arrival for a first individual distinct path signal in the signal cluster 702. Within the signal cluster 702, a plurality of individual distinct path signals associated with the signal cluster 702, may arrive within a time duration, comprising a delay spread 706, subsequent to the time instant $t_{start0}$. The first moment time associated with the signal cluster 702 may correspond to a time instant $t_0$. A time offset between arrival of an $n^{th}$ individual distinct path signal, and an $(n+1)^{th}$ individual distinct path signal may correspond to a time offset $t_{off}$.

The signal cluster 704 may arrive at a mobile receiver at a time instant $t_{start1}$. The time $t_{start1}$ may correspond to a time of arrival for a first individual distinct path signal in the signal cluster 704. Within the signal cluster 704, a plurality of individual distinct path signals associated with the signal cluster 704, may arrive within a time duration, comprising a delay spread 708, subsequent to the time instant $t_{start1}$. The first moment time associated with the signal cluster 704 may correspond to a time instant $t_1$. A time offset between arrival of an $n^{th}$ individual distinct path signal, and an $(n+1)^{th}$ individual distinct path signal may correspond to a time offset $t_{off}$ as indicated for the signal cluster 702.

The signal clusters 702, 704 may have been transmitted by distinct transmitting antennas, which may have been located at distinct base transceiver stations 102, for example. When compared to signal 702, the signal 704 may have experienced a longer path to arrive at a receiving antenna 202 in a mobile receiver 104. The signal clusters 702, 704, may be individually processed by the cluster path processors, 300 and 350 respectively, in FIG. 3a, for example.

As contrasted to the example of FIG. 4, the signal clusters 702 and 704 overlap in time. This type of signal cluster overlap 702 and 704 may be present in a Pedestrian-B (PEDB) channel, for example. Because these signal clusters 702 and 704 overlap in a closely spaced multi-path environment, there exists interference among the multi-path components of the signal clusters 702 and 704. The early and later energy of one path may be captured from two adjacent paths, resulting in on-time sampling error and sampling jitter. Because the CPPs operate in an attempt to extract the most signal energy from the received signals that are distributed among multi-paths, a maximum energy criterion for equally chip spaced group fingers is employed according to the present invention to determine a fine sampling position that maximizes the Signal to Noise Ratio (SNR) of the combined channel estimates of the CPP combiner.

Figure 8:
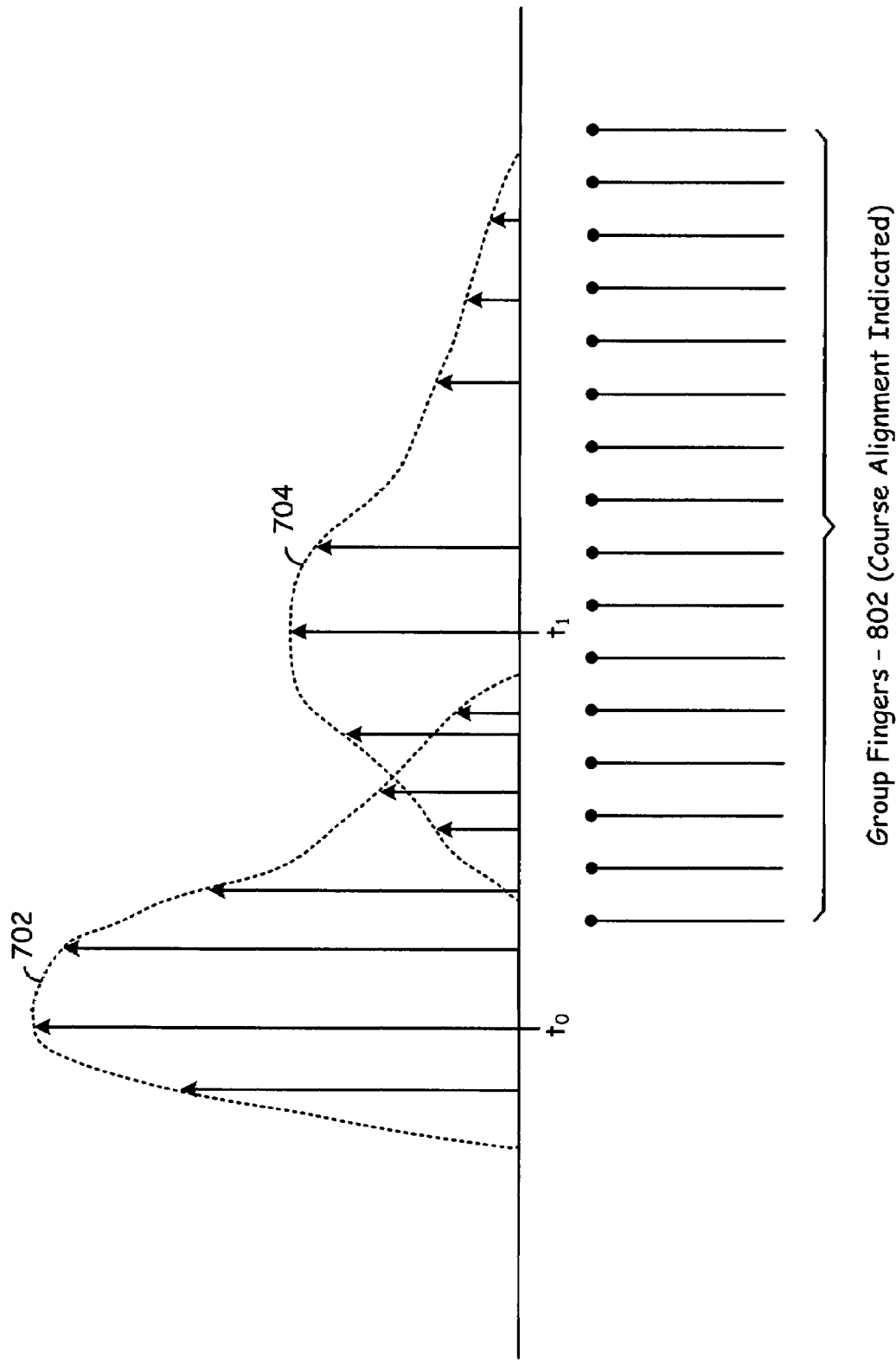
FIG. 8 is an exemplary diagram illustrating various aspects of the signal clusters of FIG. 7 showing the coarse alignment of group fingers of a CPP of an embodiment of the present invention.

FIG. 8 is an exemplary diagram illustrating various aspects of the signal clusters 702 and 704 of FIG. 7 showing the coarse alignment of group fingers of a CPP of an embodiment of the present invention. Generally, according to one embodiment, a searcher of the CPP detects a maximum signal energy level and position of at least one of a plurality of individual distinct path signals in a signal cluster. As was previously described, at least a portion of the plurality of individual distinct path signals is received within a duration of a corresponding delay spread.

The CPP includes a group finger array having a plurality of group fingers 802. According to one aspect of the present invention, the CPP is operable to determine a coarse sampling position of the group finger array 802 based upon the position of the at least one of a plurality of individual distinct path signals in the signal cluster. This coarse alignment is shown in FIG. 8. Note that the alignment of the plurality of group fingers 802 overlaps a portion of the signal cluster 702 and overlaps all of signal cluster 704. Of course in other examples the plurality of group fingers may more than fully (or partially) overlap the signal cluster 704.

Figure 9:
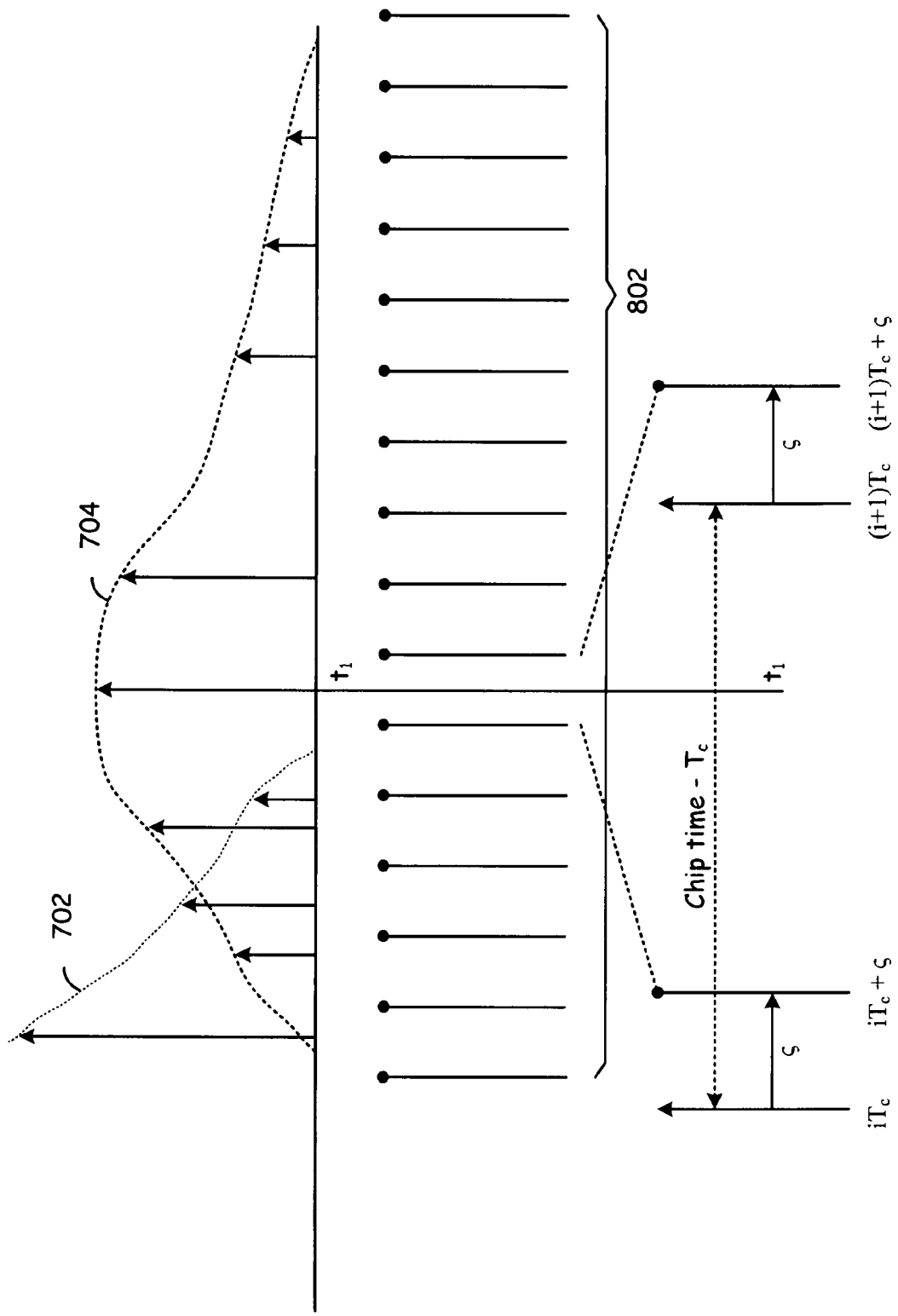
FIG. 9 is an exemplary diagram illustrating various aspects of the signal clusters of FIG. 7 showing the fine alignment of group fingers of a CPP of an embodiment of the present invention.

FIG. 9 is an exemplary diagram illustrating various aspects of the signal clusters 702 and 704 of FIG. 7 showing the fine alignment of group fingers of a CPP of an embodiment of the present invention. According to an embodiment of the present invention, for each of a plurality of fine sampling offsets, the CPPs determine a composite channel energy estimate for the plurality of individual distinct path signals. The CPP then selects a fine sampling offset based upon a corresponding maximum composite channel energy estimate. Further, the CPP determines a sampling position for the group finger array 802 based upon the coarse sampling position and the selected fine sampling offset. Then, the CPP or other receiver components receives at least a portion of the plurality of individual distinct path signals by the group finger array at a corresponding plurality of time instants based upon the determined sampling position.

According to one operation of the present invention, the CPP, in selecting the fine sampling offset based upon a corresponding maximum composite channel energy estimate characterizes the relationship between a composite channel energy estimate and fine sampling offset. The CPP then selects a fine sampling offset that corresponds to a zero differential of the relationship between composite channel energy estimate and fine sampling offset. In one particular implementation of this technique, in selecting the fine sampling offset based upon a corresponding maximum composite channel energy estimate, the CPP is operable to implement the equation:

$$\frac{d}{d\varsigma}P(\varsigma) \propto \sum_{i=locked} h_i^*(\varsigma)\frac{h_i(\varsigma+\Delta)-h_i(\varsigma-\Delta)}{2\Delta} = 0 \qquad \text{equation [19]}$$

when $\Delta \rightarrow 0$, where $P(\varsigma)$ represents the composite channel energy estimate and $h_i$ represents a channel estimate value. In doing so to determine the fine sampling offset, the CPP 300 may implement equation [20].

$$P_\Delta = \sum_{i \in locked} Re(R_{h_i}^*(\varsigma)(R_{h_i}(\varsigma+\Delta)-R_{h_i}(\varsigma-\Delta))) \qquad \text{equation [20]}$$

where $R_{h_i}$ is the correlation value of a pilot channel at the i-th group finger of the CPP 300. In Equation, only a linear operation is required. Thus, using equation [20], two pilot channel correlations are required to realize on-time channel estimation related to $R_{h_i}^*(\varsigma)$ and early-lag differences ($R_{h_i}(\varsigma+\Delta)-R_{h_i}(\varsigma-\Delta)$). Another criterion can be employed as equation [21]. In this case, a total of three pilot channel correlations are needed for each locked CPP group finger including an on-time channel estimation related to $R_{h_i}^*(\varsigma)$ and an early-lag difference.

$$P_\Delta = \sum_{i \in locked} (|R_{h_i}(\varsigma-\Delta)|^2 - |R_{h_i}(\varsigma-\Delta)|^2) \qquad \text{equation [21]}$$

According to one aspect of the description of FIG. 9, the plurality of individual distinct path signals in the signal cluster comprise spread spectrum signals and a temporal distance between group fingers of the group finger array of the CPP corresponds to a chip duration $T_c$ of the plurality of individual distinct path signals in the signal cluster. This temporal distance is shown in FIG. 9 as indicated. Further indicated in FIG. 9 is the fine adjustment value $\varsigma$ and its relationship to the chip duration $T_c$ separation between the group fingers of the CPP. In the example of FIGS. 8 and 9, the plurality of group fingers comprises 16 group fingers.

Figure 10:
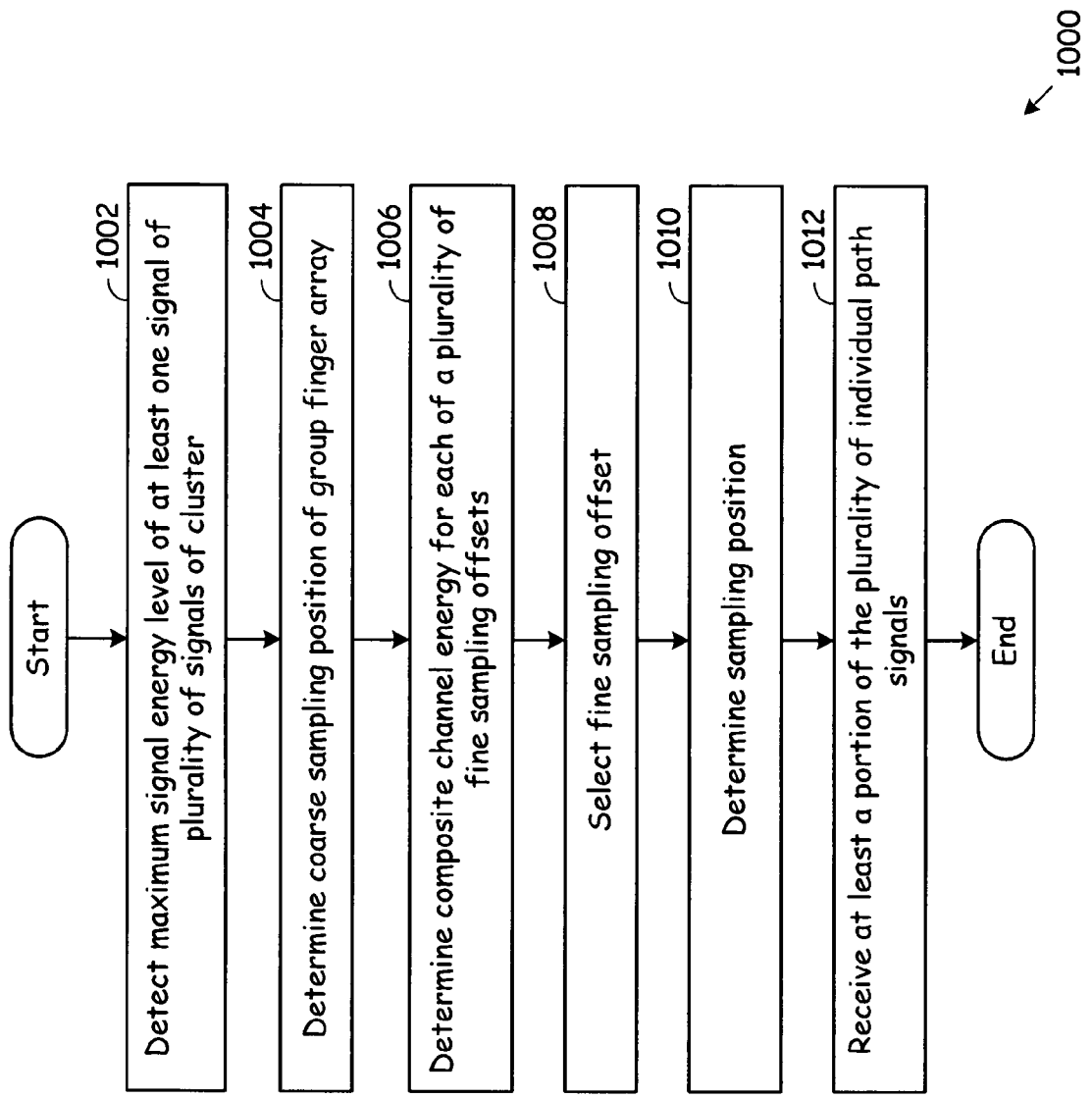
FIG. 10 is an exemplary flow diagram illustrating the fine alignment of group fingers in conjunction with cluster path processing of a received signal cluster, in accordance with an embodiment of the present invention.

FIG. 10 is an exemplary flow diagram illustrating the fine alignment of group fingers in conjunction with cluster path processing of a received signal cluster, in accordance with an embodiment of the present invention. Operation 1000 commences with detecting a maximum signal energy level of at least one of a plurality of individual distinct path signals in a signal cluster (Step 1002). According to the operation of Step 1002, at least a portion of the plurality of individual distinct path signals are received within a duration of a corresponding delay spread. Operation continues with determining a coarse sampling position of a group finger array based upon a position of the maximum signal energy level of the at least one of a plurality of individual distinct path signals in a signal cluster (Step 1004). The group finger array including a plurality of group fingers Operation continues with, for each of a plurality of fine sampling offsets, determining a composite channel energy estimate for the plurality of individual distinct path signals (Step 1006). The, operation includes selecting a fine sampling offset based upon a corresponding maximum composite channel energy estimate (Step 1008). Next, operation includes determining a sampling position for the group finger array based upon the coarse sampling position and the selected fine sampling offset (Step 1010). Operation concludes with receiving at least a portion of the plurality of individual distinct path signals at a corresponding plurality of time instants based upon the determined sampling position (Step 1012). From Step 1012, operation ends or, alternately, returns to Step 1002.

According to various aspects of the operations of FIG. 10, the plurality of individual distinct path signals in the signal cluster may be spread spectrum signals. In such case, a temporal distance between group fingers of the group finger array corresponds to a chip duration of the plurality of individual distinct path signals in the signal cluster. The plurality of group fingers includes 16 group fingers in some embodiments.

The coarse sampling position may be computed based upon a generated code and at least one computed aggregate power level of at least a portion of the plurality of individual distinct path signals. The method 1000 may include generating a code based on at least one of: a start time associated with the signal cluster, a code identification, and a timing reference signal. The method 1000 may also include computing a plurality of channel estimates based on at least one of: (1) the at least a portion of the plurality of individual distinct path signals; (2) a timing reference signal; and (3) at least one generated code. Further, the method 1000 may further include computing a plurality of power levels corresponding to the computed plurality of channel estimates.

The operation of Step 1008 of selecting a fine sampling offset based upon a corresponding maximum composite channel energy estimate may includes characterizing the relationship between a composite channel energy estimate and fine sampling offset and selecting a fine sampling offset that corresponds to a zero differential of the relationship between composite channel energy estimate and fine sampling offset. This operation may include implementing equation [19], described above.

Figure 11:
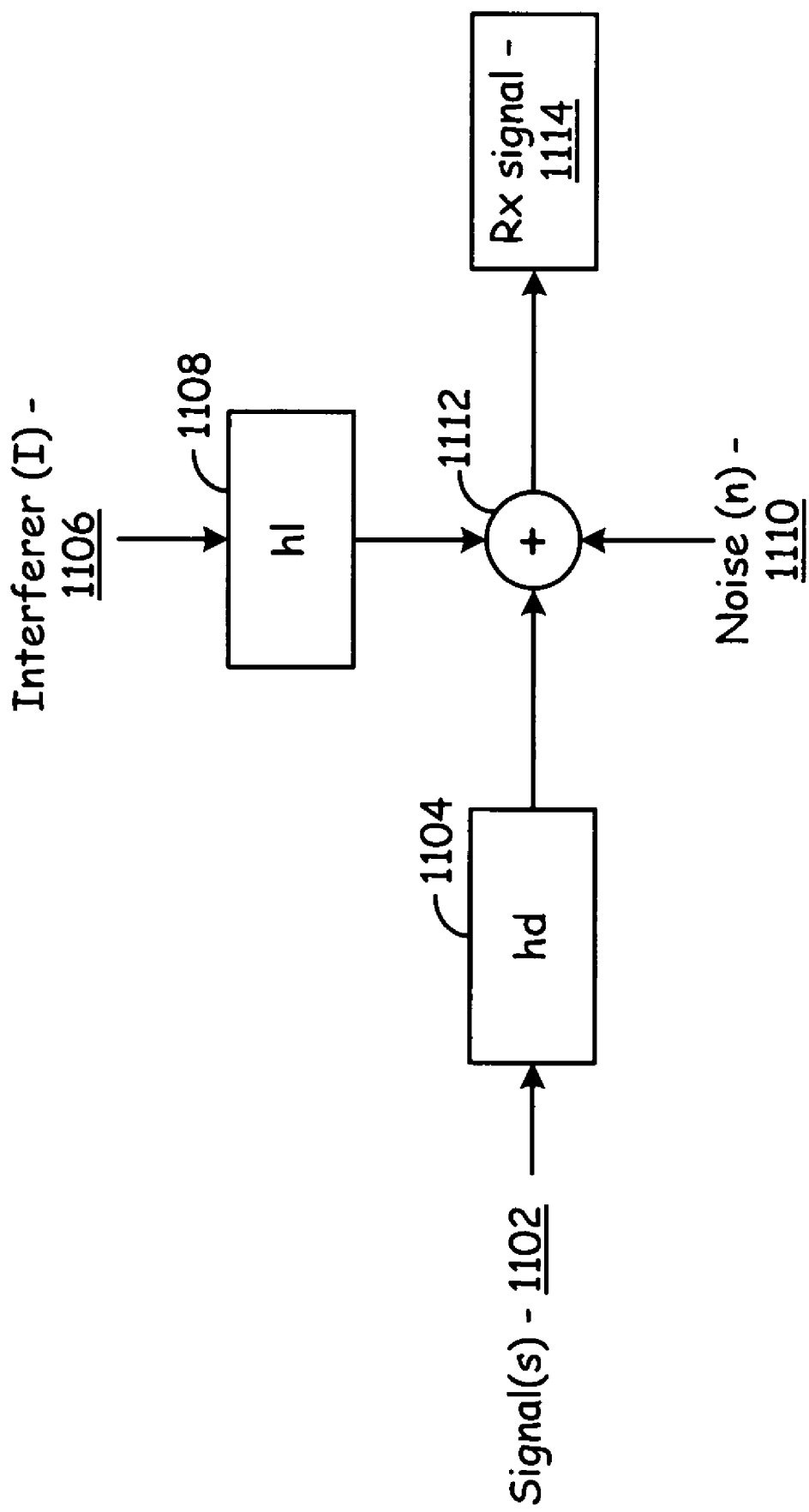
FIG. 11 is a block diagram illustrating a composite signal model upon which cluster path processing and related equalization operations according to embodiments of the present invention operate.

FIG. 11 is a block diagram illustrating a composite signal model upon which cluster path processing and related equalization operations according to embodiments of the present invention operate. According to the channel model of FIG. 11, a desired signal 1102 and a dominate interfering signal 1106 are operated upon by an RF transceiver. With the model of FIG. 11, the RF transceiver receives a composite RX signal 1114 that is the combination of the desired signal 1102 that has been operated upon by desired signal channel 1104, the interfering signal 1106 that has been operated upon by interfering signal channel 1108, and noise 1110, all of these additive (represented by adder 1112). According to the present invention, CPP operations are employed to operate upon the composite signal 1114. Further, CPP operations prepare channel estimates that are subsequently used to determine equalizer coefficients that are subsequently employed by an equalizer to cancel the component of the RX signal 1114 caused by the interfering signal 1106.

In a one dominated interferer case, the signal model at the k-subcarrier of the RX signal 1114 in the frequency domain is given by:

$$Y[k]=H_d[k]S+H_1[k]I+N \quad \text{equation [22]}$$

According to other embodiments of the present invention, the composite RX signal 1114 may include multiple desired signals and multiple interfering signals. In such case, multiple interfering signals, e.g., interfering signal 1, interfering signal 2, etc., are included with the composite RX signal 1114. Further, multiple desired signals, e.g., a first desired signal 1102, and additional desired signals are included with the composite RX signal 1114. The CPP operations of the present invention may include input from two antennas such that the CPPs operate upon two differing copies of the composite RX signal 1114. Structures and methodologies for operating a RF transceiver to remove some/all of the interfering signal will be described further herein with reference to FIGS. 12A-18

Figure 12A:
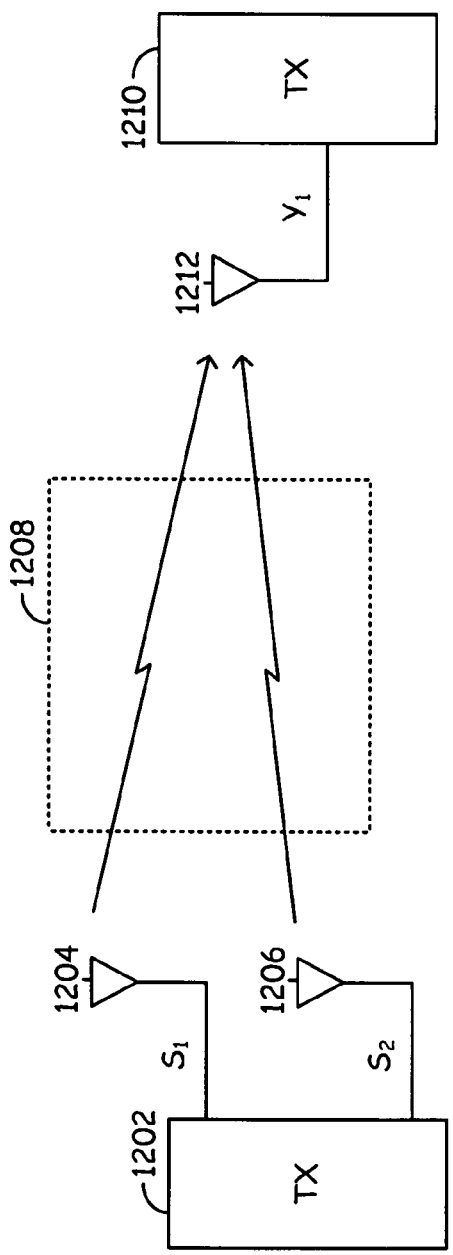
FIG. 12A is a block diagram illustrating a Multiple-Input-Single-Output (MISO) transmission system supported by cluster path processing and equalization operations according to at least one embodiment of the present invention.

FIG. 12A is a block diagram illustrating a Multiple-Input-Single-Output (MISO) transmission system supported by cluster path processing and equalization operations according to at least one embodiment of the present invention. A transmitter 1202 of the system includes multiple antennas 1204 and 1206, each of which transmits an information signal, e.g., desired signal. In the operation of FIG. 12A, the first information signal $S_1$ carries the same data as the second information signal $S_2$. These information signals $S_1$ and $S_2$ may be Space Time Transmit Diversity (STTD) signals, the formation and transmission of which is generally known and will not be described further other than as they relate to the present invention. The information signals $S_1$ and $S_2$ transmitted via antennas 1204 and 1206 are operated upon by channel 1208 and received together as a merged information signal via antenna 1212 by RF transceiver 1210. The RF transceiver 1210 operates upon this merged information signal, as will be described further with reference to FIGS. 13-18.

Figure 12B:
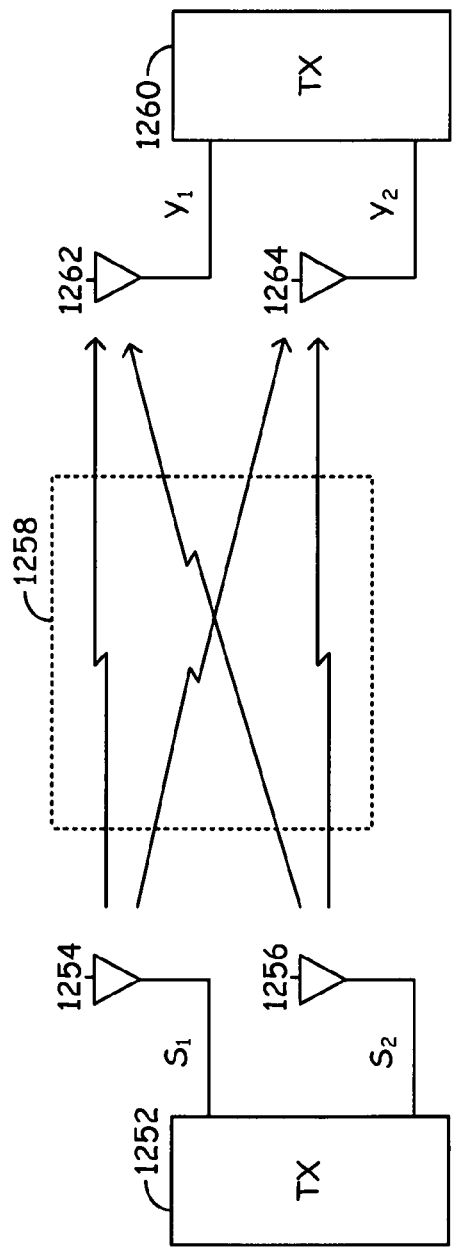
FIG. 12B is a block diagram illustrating a Multiple-Input-Multiple-Output (MIMO) transmission system supported by cluster path processing and equalization operations according to at least one embodiment of the present invention.

FIG. 12B is a block diagram illustrating a Multiple-Input-Multiple-Output (MIMO) transmission system supported by cluster path processing and equalization operations according to at least one embodiment of the present invention. A transmitter 1452 of the system includes multiple antennas 1454 and 1456, each of which transmits a respective information signal, e.g., desired signal. In the operation of FIG. 12B, the first information signal $S_1$ may carry the same data as the second information signal $S_2$. These information signals $S_1$ and $S_2$ may be Space Time Transmit Diversity (STTD) signals, the formation and transmission of which is generally known and will not be described further other than as they relate to the present invention. In another operation, these information signals $S_1$ and $S_2$ carry differing data, i.e., a first information signal $S_1$ carries differing data than does second information signal $S_2$. The information signals $S_1$ and $S_2$ transmitted via antennas 1454 and 1456 are operated upon by channel 1458 and received together as merged information signals by antennas 1462 and 1464 by RF transceiver 1460. Because of the operations of the channel 1458, each of the antennas receives a respective merged information signal that is a combination of the transmitted signals $S_1$ and $S_2$. The RF transceiver 1460 operates upon these merged information signals $S_1$ and $S_2$, as will be described further with reference to FIGS. 13-18.

Figure 13:
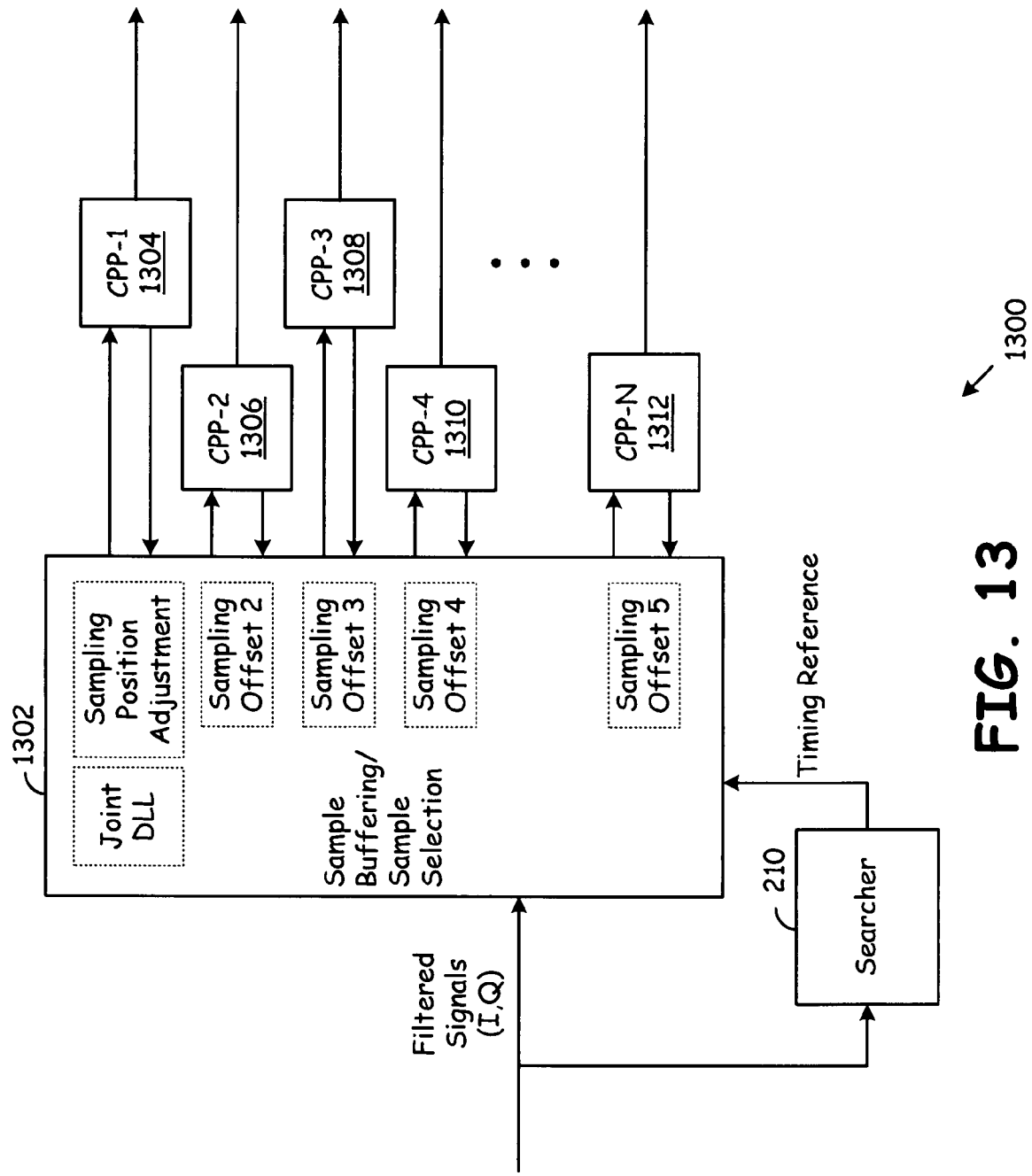
FIG. 13 is a block diagram illustrating CPP sampling according to one or more embodiments of the present invention.

FIG. 13 is a block diagram illustrating CPP sampling according to one or more embodiments of the present invention. The illustrated components of the RF transceiver (such as the one illustrated in FIG. 2) perform CPP operations according to the present invention. The functional blocks of FIG. 13 may be implemented in dedicated hardware, general purpose hardware, software, or a combination of dedicated hardware, general purpose hardware, and software. The sampling and CPP components 1300 illustrated in FIG. 13 include sample buffering/sample selection circuitry 1302 and a plurality of CPPs 1304, 1306, 1308, 1310, and 1312. The sample buffering/sample selection circuitry 1302 includes a joint Delay Locked Loop (DLL), sampling position adjustment circuitry, and sampling offset circuitry. Each of the components of the sampling offset circuitry may service a corresponding CPP. Alternately, single sampling offset circuitry may service each of the CPPs 1304-1312.

According to the structure of FIG. 13, the sample buffering/sample selection circuitry 1302 receives filtered signals (I and Q inputs) from the CMF 206 of FIG. 2, for example. The I and Q inputs received from the CMF 206 are over sampled with respect to a chip interval of the signal, e.g., 16× over sampling. The I and Q inputs are buffered into an over sampling input buffer so that they are available for subsequent sampling by the CPPs 1304-1312. Also received by the sample buffering/sample selection circuitry 1302 is a timing reference signal from searcher 210. In one example of operation of the illustrated embodiment of the present invention, the timing reference signal corresponds to a strongest path of a multi-path first information signal, the first information signal received within a duration of a corresponding delay spread. The first information signal may be included as a portion of a composite information signal that includes other information signals as well. In multiple examples described herein, the first information signal includes data intended for a serviced RF transceiver. Other information signals, e.g., second information signal, third information signal, fourth information signal, e.g., may also include data intended for the RF transceiver. Examples of multiple information signals were illustrated in, and described with reference to FIGS. 12A and 12B. Alternately, one or more of these other information signals may be interfering signals, such as were illustrated in, and described with reference to FIG. 11.

According to an operation of the present invention, the joint DLL of the sample buffering/sample selection circuitry 1302 is initially locked to the timing reference signal, which corresponds to a strongest path of the multi-path first information signal. In one particular operation of the components 1300 of FIG. 13, the joint DLL provides a sample timing reference signal for CPP-1 1304, with a sampling position of a particular finger of the CPP-1 304 corresponding to the timing reference signal. In one particular operation according to the present invention, a fourth finger of ten fingers of the first information signal group finger array samples the composite signal (as stored in the sample buffer) at a location indicated by the sample timing reference of the joint DLL (strongest multipath f). For example, referring again to FIG. 8, a particular group of the plurality of group fingers 802 is assigned to the joint DLL sample timing reference signal, which corresponds to a strongest multipath component of the first information signal 702 of the composite signal (signals 702 and 704).

Other of the CPPs 1306-1312 may correspond to the second, third, fourth, . . . , nth information signals also contained in the composite signal. However, main (strongest) paths of these other CPPs 1306 may not correspond in time to the main (strongest) path of the first information signal, e.g., they are offset in time. Thus according to one aspect of the present invention, the sampling position adjustment circuitry of the sample buffering/sample selection circuitry 1302 produces sampling offsets for the plurality of other CPPs 1306-1312. Each of these other CPPs 1306-1312 samples the composite information signal that is buffered at corresponding positions based upon the joint DLL sample timing reference signal and respective sampling offsets. These sampling offsets may be different for each of the plurality of other CPPs 1306-1312. However, in some operations, some of the sampling offsets may be the same as other of the sampling offsets. Further still, in some operations, the sampling offset for one (or more) of the other CPPs 1306-1312 will be zero. Examples of differing operating conditions relating to sampling offsets will be described further with reference to FIGS. 15A-15G. As was previously described, each of the CPPs may also produce a channel estimate that is later used for equalization coefficient determination operations. These operations will be described further with reference to FIG. 14.

Figure 14:
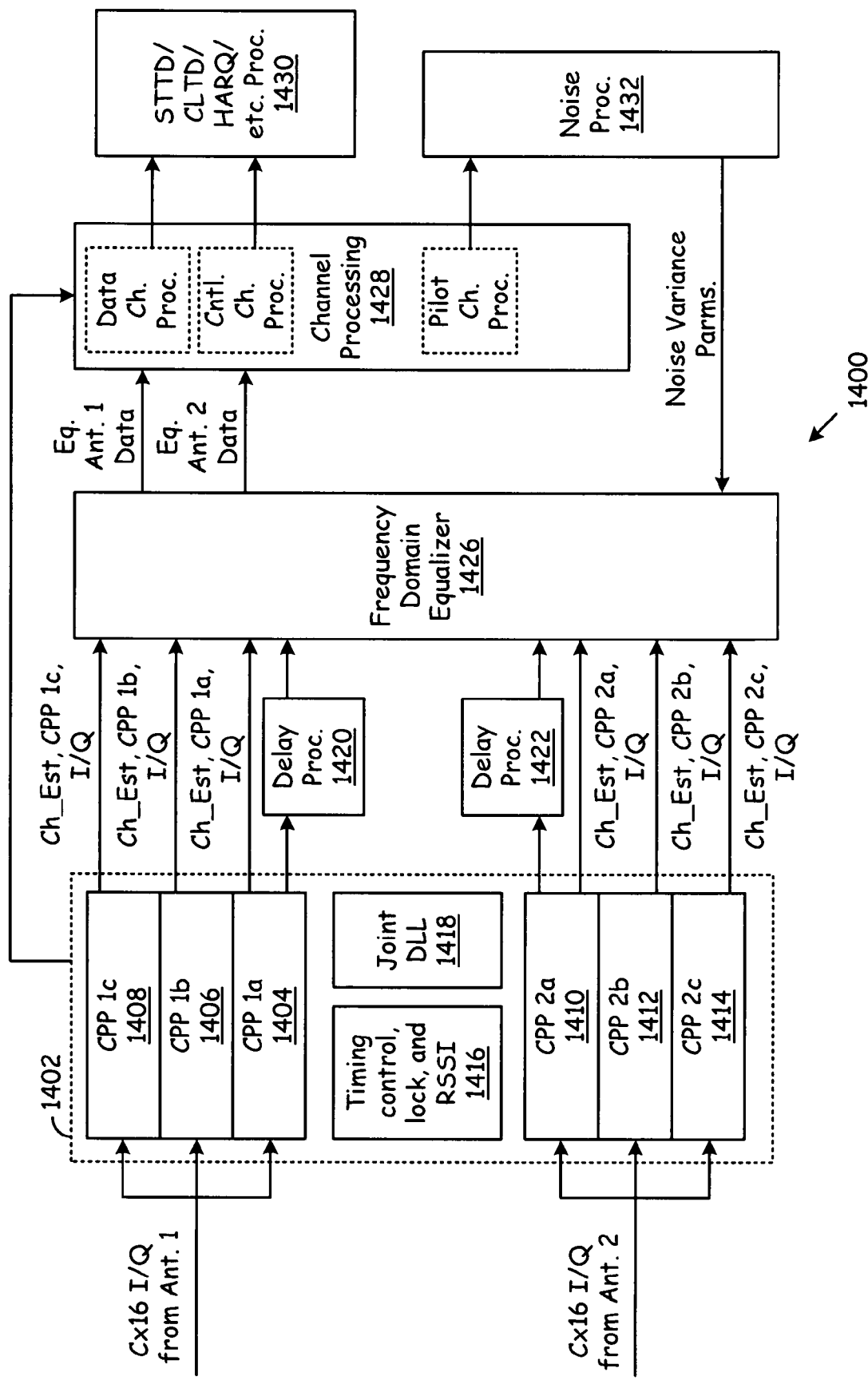
FIG. 14 is a block diagram illustrating CPP and equalization components of a baseband processing module according to an embodiment of the present invention.

FIG. 14 is a block diagram illustrating CPP and equalization components of a baseband processing module according to an embodiment of the present invention. With the particular embodiment 1400 of FIG. 14, a CPP block 1402 service two antennas. In particular, CPP 1a 1404, CPP 1b 1406, and CPP 1c 1408 operate upon I and Q inputs captured by a first antenna, while CPP 2a 1410, CPP 2b 1412, and CPP 2c 1414 operate upon I and Q inputs captured by a second antenna. The I and Q inputs from each of the antennas is over sampled, e.g., 16× the chip rate of the carried CDMA signals. A joint DLL 1418 and timing, control, lock and RSSI circuitry 1416 enable the CPPs 1406-1414 to sample the I and Q inputs at appropriate times in a manner similar to the manner previously described with reference to FIG. 13. Various operational modes of the CPPs 1404-1414 will be described further herein with reference to FIGS. 15A-15G. Generally, each of the CPPs 1404-1414 samples a composite input signal (both I and Q), locks to a desired information signal, and extracts as least a training sequence of its respective desired information signal. Then, each CPP 1404-1414, when enabled produces a channel estimate for its respective information signal. In other operations, each CPP may, but is not required to, produce an output that is used to extract data there from. Sampling positions of all or CPPs 1404-1414 are slaved to the joint DLL 1418. However, as was previously described with reference to FIG. 13, some of the CPPs 1406-1414 other than CPP 1404 may have a sampling offset with respect to the joint DLL 1418 (and resultantly with respect to the sampling position of CPP 1a 1404.

With particular reference to the channel estimation operations of the CPPs 1404-1414, each of the CPPs 1404-1414 produces a respective channel estimate for its respective information signal (desired signal or interfering signal). The time at which the CPPs 1404-1414 produce their channel estimates may vary over time and may not be time aligned due to the difference in time alignment of the information signals contained in the incoming composite information signal. Thus, for example, CPP 1a 1404 may produce a channel estimate for a first information signal at a first time while CPP 2b 1412 may produce a channel estimate for a third information signal at a third time that differs from the first time. The frequency domain equalizer 1426 (or another type of equalizer) receives the channel estimates from the plurality of CPPs 1404-1414 and produces equalizer coefficients based thereon. The delay processing blocks 1420 and 1422 may assist the frequency domain equalizer 1426 in reconciling in time the channel estimates. The frequency domain equalizer 1426 also receives noise variance parameters from noise processing block 1432, which are used to compute equalizer coefficients. The manner in which the frequency domain equalizer calculates its equalizer coefficients and in which it equalizes the incoming data received from the CPPs 1404-1414 is described further in copending patent applications:

U.S. Utility application Ser. No. 11/524,584 filed on Sep. 21, 2006, and entitled "FREQUENCY DOMAIN EQUALIZER FOR DUAL ANTENNA RADIO," (BP5477), and U.S. Utility application Ser. No. 11/524,580 filed on Sep. 21, 2006, and entitled "FREQUENCY DOMAIN EQUALIZER WITH ONE DOMINATE INTERFERENCE CANCELLATION FOR DUAL ANTENNA RADIO," (BP5595); and U.S. Utility application Ser. No. 11/593,911 filed on Nov. 7, 2006, and entitled "EQUALIZER COEFFICIENT DETERMINATION IN THE FREQUENCY DOMAIN FOR MIMO/MISO RADIO" (BP5617), all of which are incorporated herein in their entirety by reference for all purposes.

The frequency domain equalizer 1426 produces equalized data (from both antenna 1 and antenna 2 paths) to channel processing block 1428. Channel processing block 1428 operates on the incoming equalized data to extract data and control information. The channel processing block 1428 also operates on the pilot channel to produce information used by the noise processing block 1432. The channel processing block 1428 produces output for further processing to block 1430. Such further processing may include STTD processing, Closed Loop Transmit Diversity (CLTD) processing, or Hybrid Automatic Retransmission Request (HARQ) processing, for example.

FIGS. 15A-15G are block diagrams illustrating the CPP block of FIG. 14 in various operational modes according to embodiments of the present invention. Generally, as was described with reference to FIG. 14, the CPP block 1402 may operate upon two separate composite information signals. CPP 1a 1404, CPP 1b 1406, and CPP 1c 1408 operate upon a first composite information signal received via a first antenna path and CPP 2a 1410, CPP 2b 1412, and CPP 2c 1404 operate upon a second composite information signal received via a second antenna path. Each of these composite information signals may include one or more information signals intended for the serviced RF transceiver (desired signals). Further, one or more of these composite information signals may include one or more information signals not intended for the serviced RF transceiver (interfering signals). Generally, the CPPs 1404-1414 operate in conjunction with other RF transceiver components to receive the information signals intended for the RF transceiver and to reject the information signals not intended for the RF transceiver. Further, these CPPs 1404-1414 operate to produce channel estimates that are used for equalizer training operations/equalizer coefficient determination operations. Each of FIGS. 15A-15G illustrate the same structure but in differing operational modes.

Referring to FIG. 15A and its illustrated operational mode, the CPP block 1402 receives a composite information signal from antenna 1 path that includes only a single information signal, which is a first desired information signal (carrying data intended for the RF transceiver). The CPP block 1402 receives no input from antenna 2 path. In such configuration, only CPP 1a 1404 is enabled. This operational mode may be considered as Mode 1—no RX diversity, no TX diversity, and no interfering signals. The joint DLL 1418 is locked to the first desired information signal, such lock based upon the timing reference signal received from the searcher 210 and based upon continual adjustment of the alignment. Sampling operations of CPP 1a 1404 are determined by the joint DLL 1418. As will be further described herein, the joint DLL 1418 is set to the timing reference signal only upon receipt of such signal by the searcher, e.g., every slot time of the composite information signal. However, due to mobility of the RF transceiver or other operating conditions, the relative time alignment of the first desired information signal changes over time. Thus, the timing control, lock, and RSSI circuitry 1416, based upon interaction with the CPP 1a 1404 adjusts the joint DLL 1418 on a chip by chip or multi-chip-by-multi-chip basis so that the first desired information signal is more closely tracked.

Figure 15G:
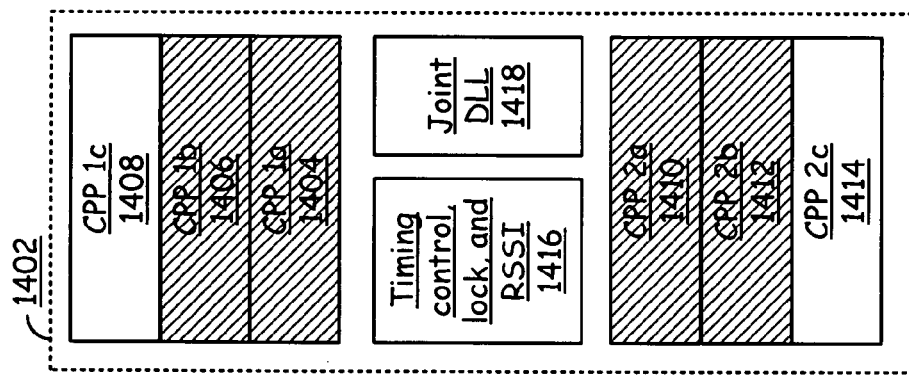
Figure 15F:
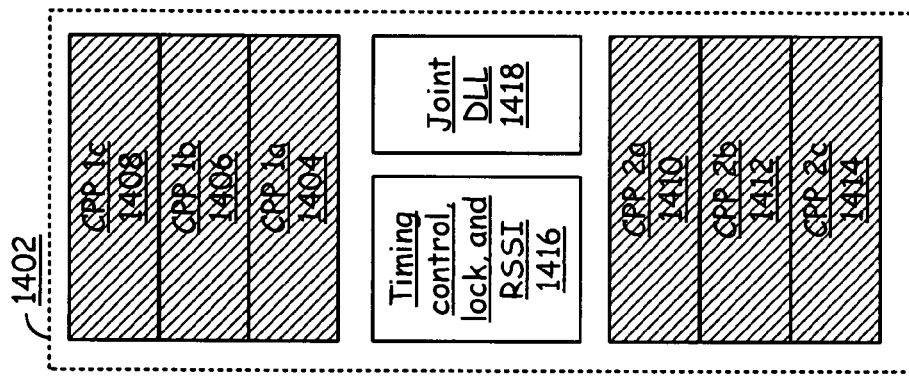
Figure 15E:
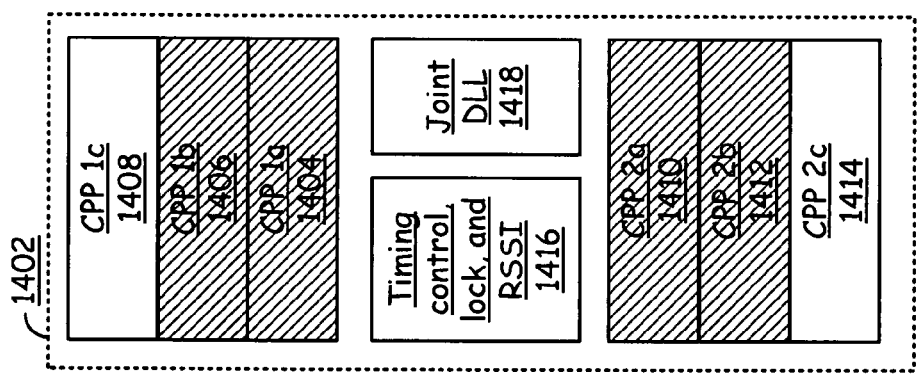
Figure 15D:
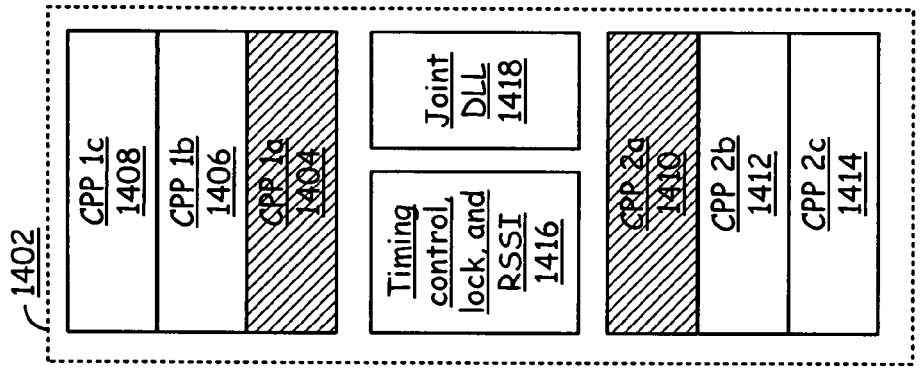
Figure 15H:
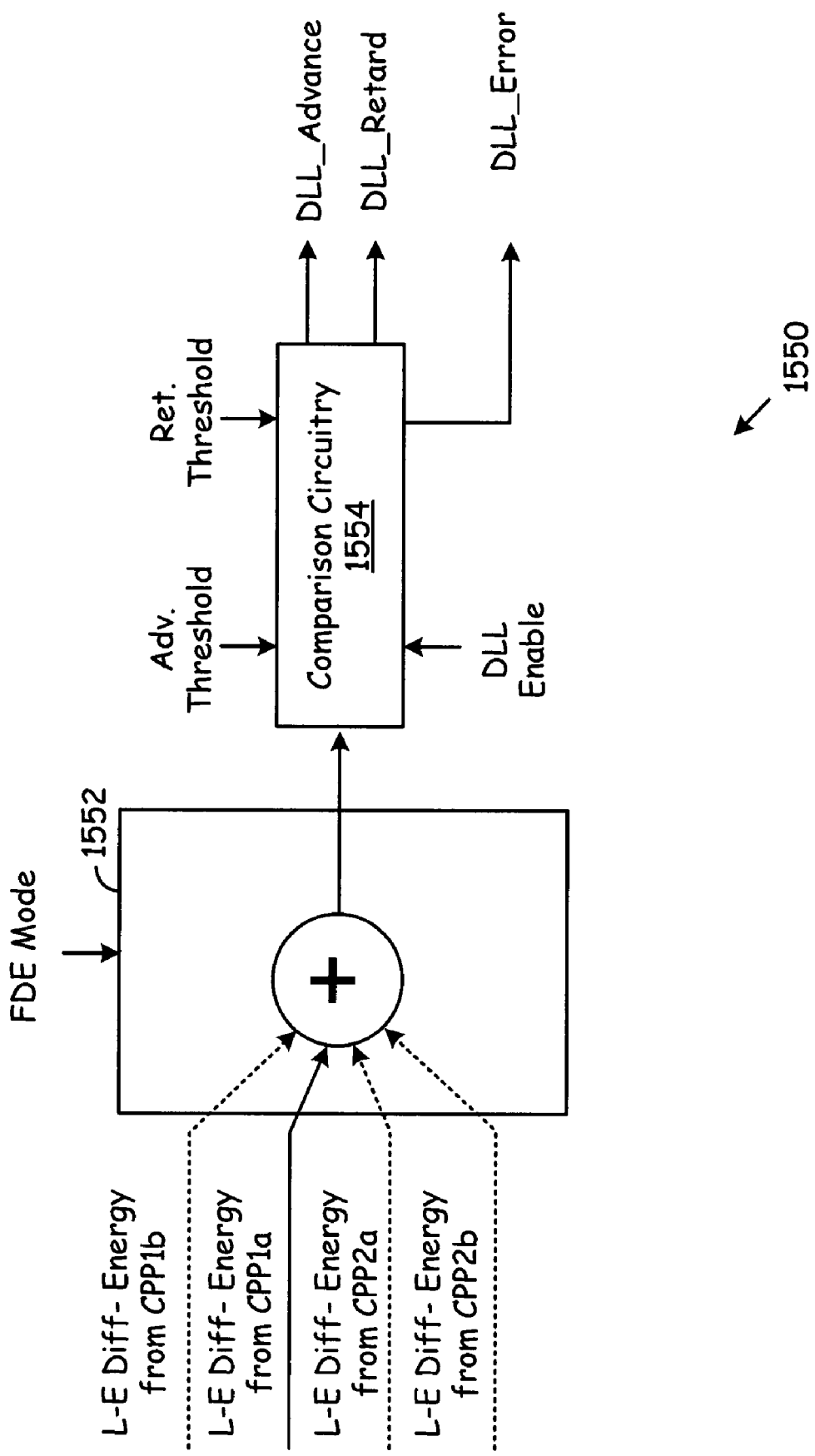
FIG. 15H is a block diagram illustrating a structure of DLL adjustment circuitry constructed according to one or more embodiments of the present invention.

FIG. 15H is a block diagram illustrating a structure of DLL adjustment circuitry constructed according to one or more embodiments of the present invention. The DLL adjustment circuitry 1550 includes an adder 1552 operable to receive inputs from each of CPP 1a 1404, CPP 1b 1406, CPP 2a 1410, and CPP 2b 1412 and forms all or a portion of the timing control, lock, and RSSI circuitry 1416 of FIG. 14. As was previously described, the joint DLL 1418 initially locks to a strongest path of a first desired information signal, based upon a timing reference signal received from the searcher 210. The first desired information signal timing may drift over time, e.g., from chip to chip or from multi-chip to multi-chip. This drift may be small, e.g., fractional chip, from chip to chip or from multi-chip to multi-chip. But, to ensure most effective operation of the CPP 1a 1404 and other CPPs, the sampling position(s) should be adjusted to that maximal time alignment is satisfied.

When only CPP 1a 1404 is operating upon a first desired information signal, only the time alignment of CPP 1a 1404 with respect to the first desired information signal is considered in advancing or retarding the joint DLL 1418. Thus, with the structure of FIG. 15H and the operational mode of FIG. 15A, only Late-Early Differential Energy (L-E Diff-Energy) that is received by CPP 1a 1404 is considered by the adder 1552 (based upon an FDE operational mode input signal received by the adder 1552). In further examples that will be described herein with reference to one or more of FIGS. 15B-15G, other inputs to the adder 1552 are enabled. Based upon the FDE mode input to the adder 1552 determines which of the four inputs are employed to produce an input to comparison circuitry 1554. The comparison circuitry 1554 receives the input from the adder 152, an advance threshold, a retard threshold, and a DLL enable signal to determine whether to direct the joint DLL 1418 to advance (DLL_Advance enabled) or retard (DLL_Retard enabled).

Referring now to FIG. 15B and its illustrated operational mode, the CPP block 1402 receives a composite information signal from antenna 1 path that includes a single desired information signal (carrying data intended for the RF transceiver) and a single interfering information signal. The CPP block 1402 receives no input from antenna 2. This operational mode may be considered as Mode 2—no RX diversity, no TX diversity, and a single interfering information signal. In such configuration, CPP 1a 1404 is enabled to service the single desired information signal and CPP 1b 1406 is enabled to service the single interfering information signal. The joint DLL 1418 is locked to the first desired information signal, such lock based upon the timing reference signal received from the searcher 210 and based upon continual adjustment of the alignment. With operational Mode 2, the timing control, lock, and RSSI circuitry 1416, based upon interaction with the CPP 1a 1404 adjusts the joint DLL 1418 on a chip by chip or multi-chip-by-multi-chip basis so that the first desired information signal is more closely tracked based upon only the L-E Diff-Energy received from CPP 1a 1404. With the configuration of FIG. 15B, CPP 1b 1406 may have a sampling offset with respect to CPP 1a 1404 that is other than zero.

Referring now to FIG. 15C and its illustrated operational mode, the CPP block 1402 receives a composite information signal from antenna 1 path that includes a multiple copies of a single desired information signal, i.e., single antenna receipt, multiple antenna transmit diversity. The CPP block 1402 receives no input from antenna 2. This operational mode may be considered as Mode 3—no RX diversity, TX diversity, and no interfering information signals. In such configuration, CPP 1a 1404 is enabled to service a first diversity copy of the single desired information signal and CPP 1b 1406 is enabled to service a second diversity copy of the single interfering information signal. The joint DLL 1418 is locked initially to one or both diversity copies of the first desired information signal, such lock based upon the timing reference signal received from the searcher 210 and based upon continual adjustment of the alignment. With operational Mode 3, the timing control, lock, and RSSI circuitry 1416, based upon input received from both CPP 1a 1404 and CPP 1b 1406 adjusts the joint DLL 1418 on a chip by chip or multi-chip-by-multi-chip basis so that both diversity copies of the single desired information signal is more closely tracked. With the configuration of FIG. 15C, CPP 1b 1406 may have a sampling offset with respect to CPP 1a 1404 that is other than zero.

Referring now to FIG. 15D and its illustrated operational mode, the CPP block 1402 receives a first composite information signal from antenna 1 path that includes a single desired information signal with no interfering information signal(s) and a second composite information signal from antenna 2 path that includes a single desired information signal and no interfering information signal(s), i.e., RX diversity, no TX diversity. Information received via either path includes same/similar data. This operational mode may be considered as Mode 4—RX diversity, no TX diversity, and no interfering signals. In such configuration, CPP 1a 1404 is enabled to service the first composite information signal and CPP 2a 1410 is enabled to service the second composite information signal. The joint DLL 1418 is locked initially to one or both diversity copies of the first information (first desired) signal, such lock based upon the timing reference signal received from the searcher 210 and based upon continual adjustment of the alignment. In one embodiment, the joint DLL 1418 is always initially locked to the desired information signal corresponding to CPP 1a 1404. With operational Mode 4, the timing control, lock, and RSSI circuitry 1416, based upon input received from both CPP 1a 1404 and CPP 2a 1410 adjusts the joint DLL 1418 on a chip by chip or multi-chip-by-multi-chip basis so that both diversity copies of the single desired signal is more closely tracked. With the configuration of FIG. 15D, CPP 1b 1406 does not have a sampling offset with respect to CPP 1a 1404 (or the joint DLL 1418).

Referring now to FIG. 15E and its illustrated operational mode, the CPP block 1402 receives a first composite information signal from antenna 1 path that includes a single desired information signal and a single interfering information signal and a second composite information signal from antenna 2 path that includes a single desired information signal and a single interfering information signal, i.e., RX diversity, no TX diversity. Information received via either path carried by respective copies of the first desired information signal includes same/similar data. This operational mode may be considered as Mode 5—RX diversity, no TX diversity, and a single interfering signal. In such configuration, CPPs 1a 1404 and 1b 1406 are enabled to service the first composite information signal and CPPs 2a 1410 and 2b 1412 are enabled to service the second composite information signal. In particular, CPP 1a 1404 is enabled to service the single desired information signal of the first composite information signal, CPP 1b 1406 is enabled to service the single interfering signal of the first composite information signal, CPP 2a 1410 is enabled to service the single desired information signal of the second composite information signal, and CPP 2b 1412 is enabled to service the single interfering signal of the second composite information signal. The joint DLL 1418 is locked initially to one or both diversity copies of the first information (first desired) signal, such lock based upon the timing reference signal received from the searcher 210 and based upon continual adjustment of the alignment. In one embodiment, the joint DLL 1418 is always initially locked to the desired information signal corresponding to CPP 1a 1404. With operational Mode 5, the timing control, lock, and RSSI circuitry 1416, based upon input received from both CPP 1a 1404 and CPP 2a 1410 adjusts the joint DLL 1418 on a chip by chip or multi-chip-by-multi-chip basis so that both diversity copies of the single desired signal is more closely tracked. With the configuration of FIG. 15E, CPP 1b 1406 does not have a sampling offset with respect to CPP 1a 1404. Further, with the configuration of FIG. 15E, CPPs 1b 1406 and 2b 1412 may have sampling offsets with respect to CPP 1a 1404 that are other than zero.

Referring now to FIG. 15F and its illustrated operational mode, the CPP block 1402 receives a first composite information signal from antenna 1 path that includes a single desired information signal and two interfering information signals and a second composite information signal from antenna 2 path that includes a single desired information signal and two interfering information signals, i.e., RX diversity, no TX diversity, and two interfering signals. Information received via either path carried by respective copies of the first desired information signal includes same/similar data. This operational mode may be considered as Mode 6—RX diversity, no TX diversity, and two interfering signals. In such configuration, CPPs 1a 1404, 1b 1406, and 1c 1408 are enabled to service the first composite information signal and CPPs 2a 1410, 2b 1412, and 2C are enabled to service the second composite information signal. In particular, CPP 1a 1404 is enabled to service the single desired information signal of the first composite information signal, CPP 1b 1406 is enabled to service the first interfering signal of the first composite information signal, CPP 1c 1408 is enabled to service the second interfering signal of the first composite information signal, CPP 2a 1410 is enabled to service the single desired information signal of the second composite information signal, CPP 2b 1412 is enabled to service the first interfering signal of the second composite information signal, and CPP 2c 1414 is enabled to service the second interfering signal of the second composite information signal. The joint DLL 1418 is locked initially to one or both diversity copies of the first information (first desired) signal, such lock based upon the timing reference signal received from the searcher 210 and based upon continual adjustment of the alignment. In one embodiment, the joint DLL 1418 is always initially locked to the desired information signal corresponding to CPP 1a 1404. With operational Mode 6, the timing control, lock, and RSSI circuitry 1416, based upon input received from both CPP 1a 1404 and CPP 2a 1410 adjusts the joint DLL 1418 on a chip by chip or multi-chip-by-multi-chip basis so that both diversity copies of the single desired signal is more closely tracked.

Referring now to FIG. 15G and its illustrated operational mode, the CPP block 1402 receives a first composite information signal from antenna 1 path that includes a two desired information signals and no interfering information signals and a second composite information signal from antenna 2 path that includes two desired information signals and no interfering information signals, i.e., RX diversity, TX diversity, and no interfering signals. Of course, because of TX diversity of the desired signals, the desired signals may carry same/similar information, e.g., STTD mode, or differing information, e.g., MIMO operations. This operational mode may be considered as Mode 7—RX diversity, TX diversity, and no interfering signals. In such configuration, CPPs 1a 1404 and 1b 1406 are enabled to service the first composite information signal and CPPs 2a 1410 and 2b 1412 are enabled to service the second composite information signal. In particular, CPP 1a 1404 is enabled to service the first desired information signal of the first composite information signal, CPP 1b 1406 is enabled to service the second desired signal of the first composite information signal, CPP 2a 1410 is enabled to service the first desired information signal of the second composite information signal, and CPP 2b 1412 is enabled to service the second desired interfering signal of the second composite information signal. The joint DLL 1418 is locked initially to the first information (first desired) signal corresponding to CPP 1a 1404, such lock based upon the timing reference signal received from the searcher 210 and based upon continual adjustment of the alignment. With operational Mode 7, the timing control, lock, and RSSI circuitry 1416, based upon input received from both CPP 1a 1404, CPP 1b 1406, CPP 2a 1410, and CPP 2b 1412 adjusts the joint DLL 1418 on a chip by chip or multi-chip-by-multi-chip basis so that both diversity copies of the single desired signal is more closely tracked.

Figure 16:
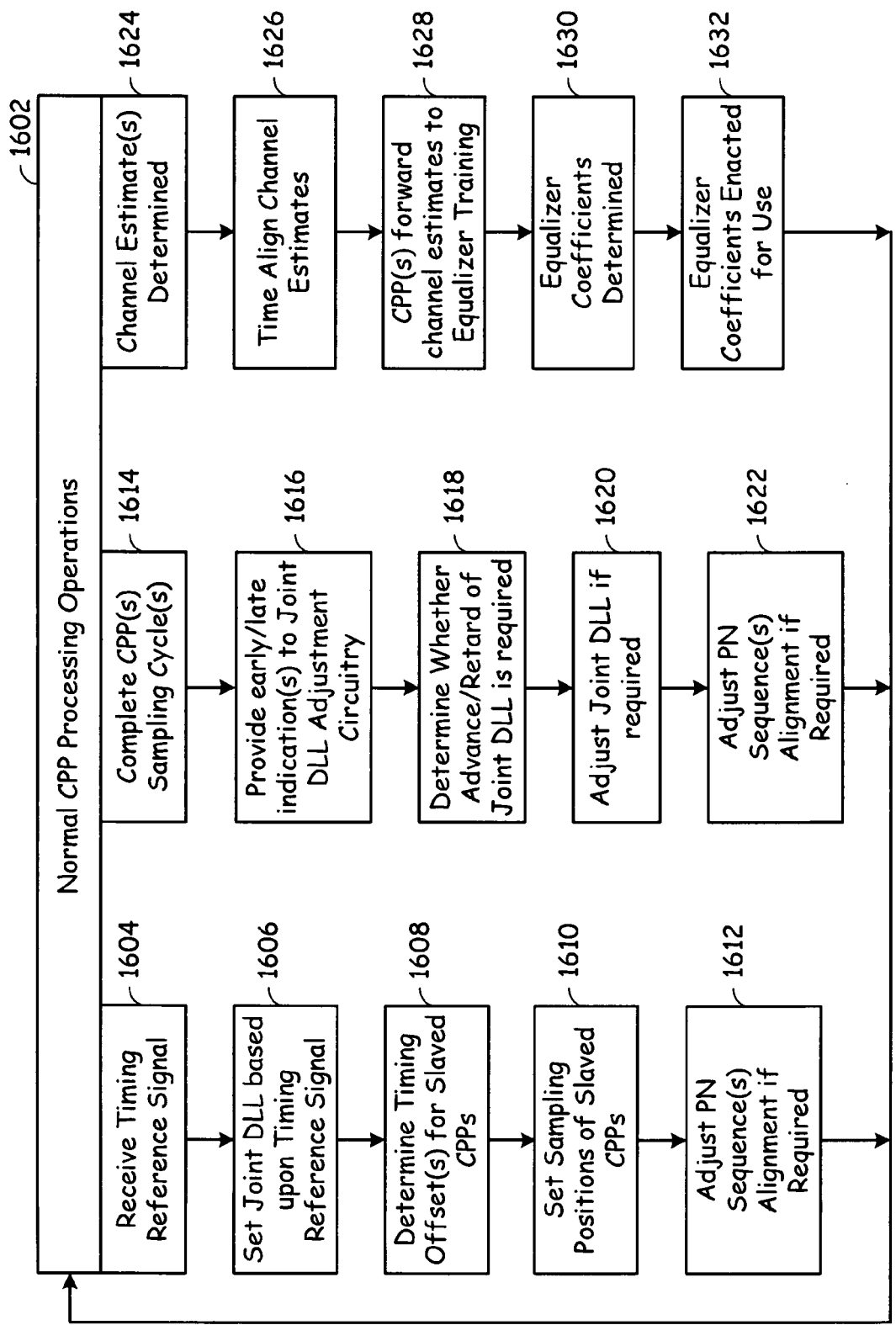
FIG. 16 is a flow chart illustrating cluster path processing operations according to one or more embodiments of the present invention.

FIG. 16 is a flow chart illustrating cluster path processing operations according to one or more embodiments of the present invention. During normal operations (step 1602), when enabled, a CPP samples a composite signal, operates upon the signal, produces output data, and produces a channel estimate of an information signal to which it is assigned, e.g., desired signal, interfering signal. A CPP block 1402 may include multiple CPPs, each of which is operable to perform these functions. The additional operations illustrated in and described with reference FIG. 16 are performed according to various aspects of the present invention and relate to sampling alignment, PN sequence alignment, channel estimate output.

For a first information signal group finger array (CPP) that is operable to receive a plurality of individual distinct signal paths of a first information signal cluster that is received within a duration of a corresponding delay spread, at a first time, operation includes receiving a timing reference signal corresponding to the first information signal and locking a delay locked loop based upon the timing reference signal (Step 1604). In response thereto, operation continues, at the first time, establishing a delay locked loop sampling position (setting the joint DLL) of the first information signal group finger array based upon the timing reference signal (Step 1606). Further, for one or more CPPs that are slaved to the joint DLL sampling timing, operation includes determining timing offsets (Step 1608). For example, with the joint DLL provides sampling position information for a first CPP that operates upon a first desired information signal, timing offsets may be set for CPPs that operate upon a first interfering signal, a second interfering signal, etc. Further for other CPPs that operate upon other desired information signals and that are slaved to the joint DLL, other respective timing offsets are determined. In some operations, such as RX diversity operations, two CPPs may have the same sampling position, e.g., when they operate upon different received copies of a single desired information signal. Then, operation includes setting the sampling positions for each of the CPPs whose sampling timing is slaved to the joint DLL (Step 1610). Further, based upon the joint DLL alignment and the timing offsets, PN sequence(s) alignment is set so that corresponding received information signals are correctly correlated to respective PN sequence(s) (Step 1612). From step 1612, operation returns to step 1602. Generally, the timing reference signal may be received from a searcher 210 once per slot cycle, once per multiple slot cycles, or at another frequency.

Operation according to the present invention at second and subsequent times, based upon early and late signal correlation values with the first information signal, operation may include adjusting the delay locked loop sampling position of the first information signal group finger array. In doing so, when the subject CPP completes its sampling cycle operations (Step 1614), for example after receipt of a preamble sequence of an information signal upon which it operates, the CPP provides an early/late indication to DLL adjustment circuitry (Step 1616) as was described with reference to FIGS. 15A-15H. The DLL adjustment circuitry 1550 then determines whether to advance the DLL, retard the DLL, or make no adjustment (Step 1618) based upon its received inputs. As was described with reference to FIGS. 15A-15H, the input signals considered by the DLL adjustment circuitry 1550 vary depending upon an operational mode of the CPP block 1402. After adjustment, the CPPs that are affected by the adjustment to the joint DLL may adjust their PN sequence alignment(s) if required (Step 1622). Such adjustment would be required if the adjustment of the joint DLL caused sampling of a respective information signal to extend to a differing chip time. Further, while not shown in steps 1604-1622, adjustment of the sampling offset may be performed in conjunction with these operations. From Step 1622, operation returns to Step 1602.

According to another operation of the CPP block 1402, the first information signal group finger array (first CPP) may produce a first channel estimate for the first information signal. Alternately, or in addition thereto, the second information signal group finger array (second CPP) may produce a second channel estimate for the second information signal. Both of these operations are represented as Step 1624. In either case, a first channel output time of the first channel output by the first information signal group finger array (first CPP) may differ from a second channel output time of the second channel output by the second information signal group finger array (second CPP). Thus, operation includes time aligning channel estimates that will be later used for equalizer coefficient determination (Step 1626). The CPP(s) then forward the channel estimates to equalizer training circuitry (of the FDE in some embodiments) (Step 1628). Note that the equalizer training circuitry may time align received channel estimates. In such case, the operations of Step 1628 would occur before the operations of Step 1626. Operation continues with the equalizer training circuitry determining equalizer coefficients based upon the channel estimates received from the CPPs (Step 1630). The channel estimates are then used to equalize incoming composite signals to extract desired information (Step 1632). From Step 1632, operation returns to Step 1602.

Figure 17:
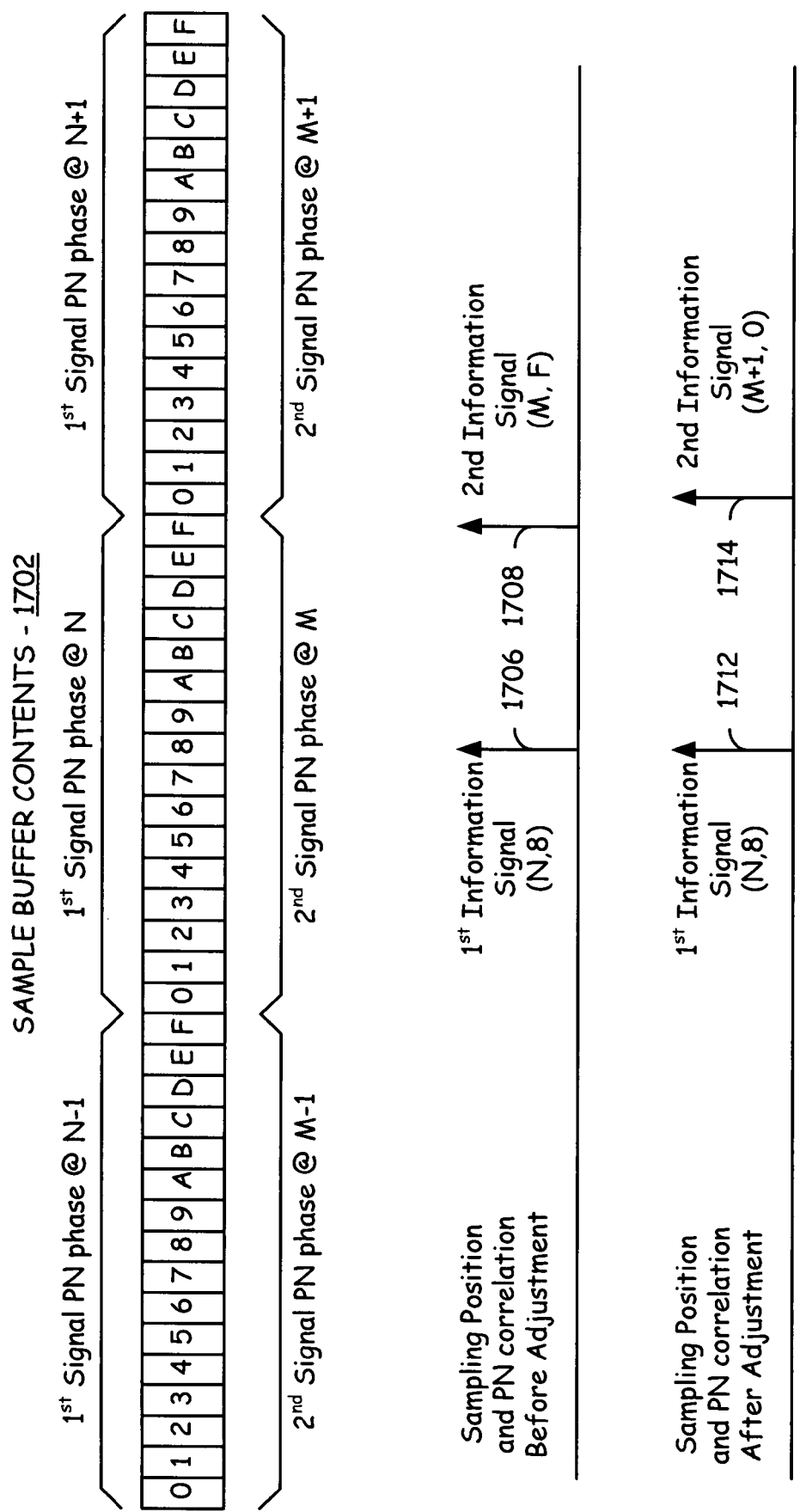
FIG. 17 is a drawing illustrating a relationship between sample buffer contents, sampling location, and Pseudo Noise correlation phase according to one example of aspects of the present invention.

FIG. 17 is a drawing illustrating a relationship between sample buffer contents, sampling location, and Pseudo Noise correlation phase according to one example of aspects of the present invention. The sample buffer 1702 samples on a fractional PN chip basis, e.g., 16 samples per PN chip. Generally, the sampling positions are shown with reference to the sample buffer contents 1702. Further, PN phases of first information signal and second information signal are shown with respect to the sample buffer contents. However, this indexing is made for illustrative purposes only to assist the reader and is, of course, a conveniently selected indexing scheme. For each PN chip duration of the first information signal, the sample buffer may be sampled at 16 positions by a corresponding CPP. As was previously described, the joint DLL identifies a sampling position for a first CPP. With the examples of FIGS. 17 and 18, the first information signal corresponds to a first CPP and the second information signal corresponds to a second CPP. Note the differing sample positions of the first and second information signals. The sampling positions of these information signals are offset because the first and second information signals are not time aligned. The reader should refer to the examples provided in FIGS. 15A-15H to understand in what operational modes sampling positions differ and in what operational modes sampling positions are the same.

With the example of FIG. 17, at a first time (before adjustment), the first information signal is sampled at position 1706 and the second information signal is sampled at position 1708. Note that a sampling time offset exists between these two sampling positions. The sampling position before adjustment for the first information signal 1706 is at position 8 and corresponds to PN phase N. Further, the sampling position before adjustment for the second information signal 1708 is at position F and corresponds to PN phase M. After adjustment of the joint DLL based upon input(s) from at least one CPP (Steps 1614-1620) of FIG. 16, the sampling position of the first information signal 1712 remains at position 8 and corresponds to PN phase N (of the first information signal). However, due to a change in sampling offset (or other change), the sampling position of the second information signal moves to position 0 of adjacent PN phase M+1. Thus, according to the operation of the present invention, the correlation position of the PN sequence for the second information signal must shift due to this shift in sampling position.

Figure 18:
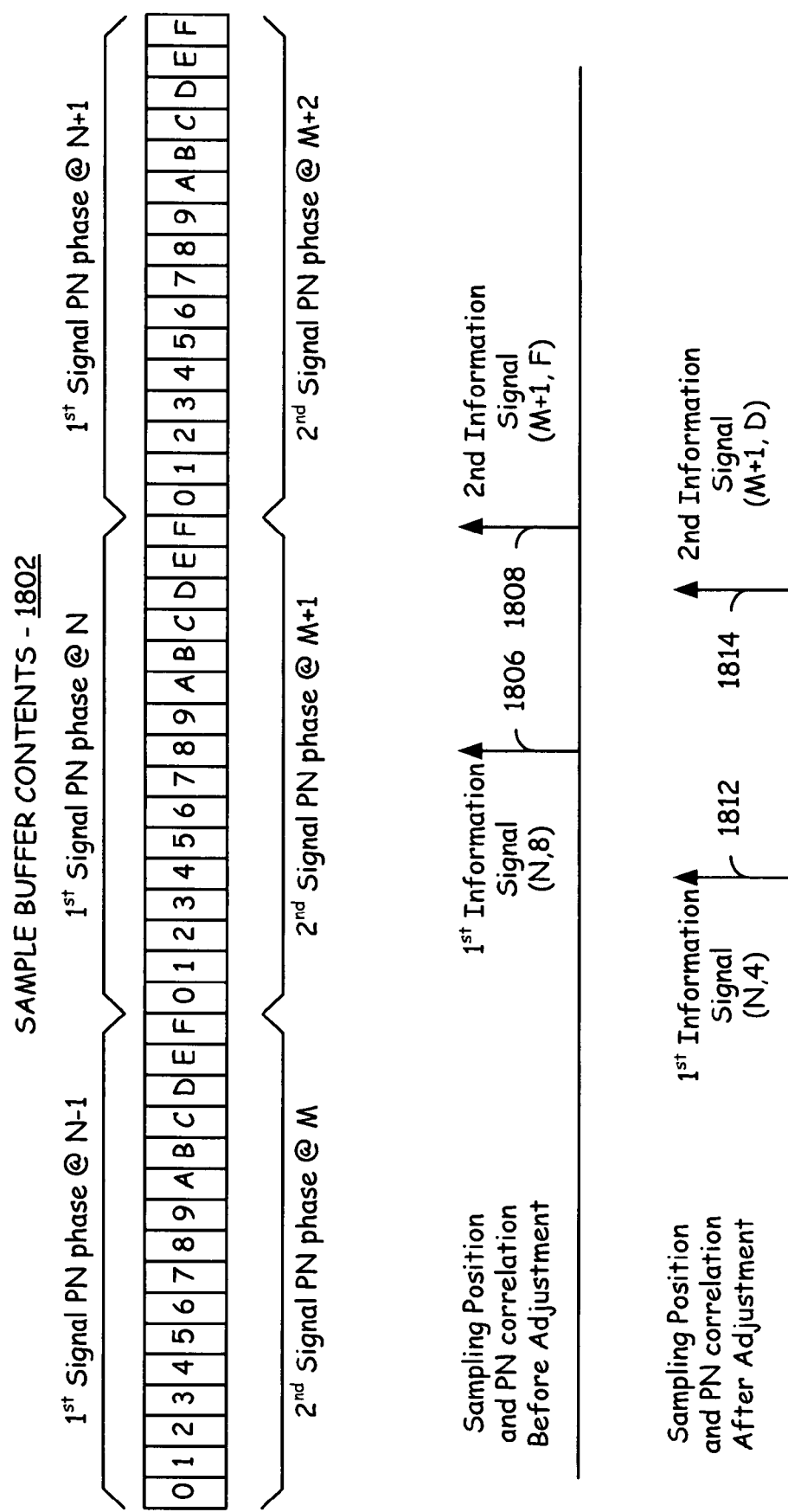
FIG. 18 is a drawing illustrating a relationship between sample buffer contents, sampling location, and Pseudo Noise correlation phase according to another example of aspects of the present invention.

FIG. 18 is a drawing illustrating a relationship between sample buffer contents, sampling location, and Pseudo Noise correlation phase according to another example of aspects of the present invention. As was the case with FIG. 17, the sample buffer 1802 samples on a fractional PN chip basis, e.g., 16 samples per PN chip. Generally, the sampling positions are shown with reference to the sample buffer contents 1802. Further, PN phase of first information signal and second information signal are shown with respect to the sample buffer contents. However, this indexing is made for illustrative purposes only to assist the reader and is, of course, a conveniently selected indexing scheme. For each PN chip duration of the first information signal, the sample buffer may be sampled at 16 positions by a corresponding CPP. As was previously described, the joint DLL identifies a sampling position for a first CPP. With the example of FIG. 18, at a first time (before adjustment), the first information signal is sampled at position 1806 and the second information signal is sampled at position 1808. Note that a sampling time offset exists between these two sampling positions. The sampling position before adjustment for the first information signal 1806 is at position 8 and corresponds to PN phase N. Further, the sampling position before adjustment for the second information signal 1708 is at position F and corresponds to PN phase M+1. After adjustment of the joint DLL based upon input(s) from at least one CPP (Steps 1614-1620) of FIG. 16, the sampling position of the first information signal 1812 moves to position 4 and still corresponds to PN phase N (of the first information signal). Due to the joint DLL adjustment, a change in sampling offset (or other change), the sampling position of the second information signal moves to position D of PN phase M+1. Thus, according to the operation of the present invention, the correlation position of the PN sequence for the second information signal remains the same after this sampling position adjustment.

The following operations and equations may be employed with the structures and operations of FIGS. 1-18 when considering that the first information signal is a desired signal and the second information signal is an interfering signal. By considering that the scanner 210 provides the time delay of desired and interference around NTc and MTc, a signal model in the time domain can be given as $$y(t) = h_d(t - \tau_d) \otimes s(t) + h_i(t - \tau_i) \otimes i(t) + n(t) \quad \text{equation (23)}$$
$$= h_d(t - p1) \otimes s(t - NTc) + h_i(t - p2) \otimes i(t - MTc) + n(t)$$

By assuming $$t - p1 = T_s \, \tau = NTc + p1; \tau_i = MTc + p2$$

Equation (23) can be rewritten as:

$$y(t) = h_d(t - \tau_d) \otimes s(t) + h_i(t - \tau_i) \otimes i(t) + n(t)$$
$$= h_d(Ts) \otimes s(Ts + p1 - NTc) + h_i(Ts + p1 - p2) \otimes i(Ts + p1 - MTc) + n(Ts + p1)$$

If the scanner 210 update rate is fast enough and the scrambling code phase shift of the interfering signal is within 1-2 chips, no additional operations are required for shifting the PN sequence of the interfering signal. In this case, the main path of an interfering signal CPP/channel estimator is shifted by 1-2 chips to compensate for this difference in PN sequences of the desired signal and the interfering signal. However, the main path of the interfering signal can shift more than 2-3 chips during a scanner 210 update period while the desired and interfering signals can shift in different direction. In such case, the scrambling code phase of the interfering signal must be tracked in a same/similar manner that the desired signal is tracked. In such case, a coarse tracking may be employed to track the desired and interfering signals. In this mode, the early and lag power at the corresponding CPP/channel estimators is derived from the adjacent three paths next to the main path of the CPP/channel estimators. By balancing the early and lag powers of the fingers, the PN phase can be tracked and the main path of the signal can be forced to a central finger of the CPP/channel estimator. The following equations may be employed to implement this technique.

With technique, frequency domain equalizer coefficients may be given as:

$$W = \begin{bmatrix} W_1 \\ W_2 \end{bmatrix} = \quad \text{equation (24)}$$

$$\begin{bmatrix} \dfrac{\left(|H_{d2}|^2 + |H_{I2}|^2 + \dfrac{\sigma_{N2}^2}{S}\right)}{det} & \dfrac{-(H_{d1}H_{d2}^* + H_{I1}H_{I2}^*)}{det} \\ \dfrac{-(H_{d2}H_{d1}^* + H_{I2}H_{I1}^*)}{det} & \dfrac{\left(|H_{d1}|^2 + |H_{I1}|^2 + \dfrac{\sigma_{N1}^2}{S}\right)}{det} \end{bmatrix} \begin{bmatrix} H_{d1} \\ H_{d2} \end{bmatrix}$$

In such case, the frequency domain equalizer coefficients at each sub-carrier are given as:

$$W_1 = \alpha \left(|H_{I2}|^2 H_{d1} + \dfrac{\sigma_{N2}^2}{S} H_{d1} - H_{I1} H_{I2}^* H_{d2}\right) \quad \text{equation (25)}$$

$$W_2 = \alpha \left(|H_{I1}|^2 H_{d2} + \dfrac{\sigma_{N1}^2}{S} H_{d2} - H_{I2} H_{I1}^* H_{d1}\right) \quad \text{equation (26)}$$

The received data in the frequency domain is given as:

$$Y_1 = \tilde{H}_{d1}S + \tilde{H}_{I1}I + N_1; \; Y_2 = \tilde{H}_{d2}S + \tilde{H}_{I2}I + N_2 \quad \text{equation (27)}$$

where the $\tilde{H}$ represents the real channel response. Since the DLL sampler 1502 can track the desired signal time very well, it is reasonable to assume $H_{di} = \tilde{H}_{di}$ (i=1, 2). However, because the interfering signal channel coarse tracking cannot track the real channel time very well, it is possible that the real channel is offset by several chips compared to the ideal channel. As we know Fourier transform satisfies $$H(f)e^{j2\pi f\tau} \longleftrightarrow h(t-\tau) \quad \text{equation (28)}$$

That means if there is a several PN chip offset between the ideal channel and the CPP/channel estimator estimated channel, say n chips, then the estimated channel response at each sub-carrier is given as $$H_k = \tilde{H}_k e^{j\frac{2\pi k n}{N}} \quad N = 32 \quad \text{equation (29)}$$

We assume that the time offset between ideal channel and CPP/channel estimator estimated channel in a two receiver antenna system are different. For example, there may be an n and m PN chip offset at the antennas, respectively, so we have:

$$H_{l1}(k) = \tilde{H}_{l1}(k)e^{j\frac{2\pi kn}{N}} \quad H_{l2}(k) = \tilde{H}_{l2}(k)e^{j\frac{2\pi km}{N}} \quad \text{equation (30)}$$

The equalized data at each antenna is given by:

$$W_1^* Y_1 = \alpha\left(|H_{l2}|^2 H_{d1} + \frac{\sigma_{N2}^2}{S}H_{d1} - H_{l1}H_{l2}^* H_{d2}\right)^* \quad \text{equation (31)}$$

$$(\tilde{H}_{d1}X + \tilde{H}_{l1}I + N_1)$$

$$= \alpha\left(|H_{l2}|^2|H_{d1}|^2 X + \frac{\sigma_{N2}^2}{S}\tilde{H}_{d1}X - (H_{l1}H_{l2}^*H_{d2})^*\right.$$

$$\tilde{H}_{d1}X + |H_{l2}|^2 H_{d1}^* \tilde{H}_{l1}I + \frac{\sigma_{N2}^2}{S}H_{d1}^*\tilde{H}_{l1}I -$$

$$\left.(H_{l1}H_{l2}^*H_{d2})^* \tilde{H}_{l1}I + W_1^*N_1\right)(3\text{-}3)$$

$$W_2^* Y_2 = \alpha\left(|H_{l1}|^2 H_{d2} + \frac{\sigma_{N1}^2}{S}H_{d2} - H_{l2}H_{l1}^* H_{d1}\right)^* \quad \text{equation (32)}$$

$$(\tilde{H}_{d2}X + \tilde{H}_{l2}I + N_2)$$

$$= \alpha(|H_{l1}|^2|H_{d2}|^2 X + \frac{\sigma_{N1}^2}{S}\tilde{H}_{d2}X - (H_{l2}H_{l1}^*H_{d1})^*$$

$$\tilde{H}_{d2}X + |H_{l1}|^2 H_{d2}^* \tilde{H}_{l2}I + \frac{\sigma_{N1}^2}{S}H_{d2}^*\tilde{H}_{l2}I -$$

$$(H_{l2}H_{l1}^*H_{d1})^* \tilde{H}_{l2}I + W_2^*N_2)(3\text{-}4)$$

By using Equation (30) in Equation (31) and Equation (32), in order to cancel the interference and satisfy:

$$W_1^* Y_1 W_2^* Y_2 = \alpha(|H_{l2}|^2|H_{d1}|^2 X + |H_{l1}|^2|H_{d2}|^2 X - 2Re(H_{d2}^* H_{l2} H_{l1}^* H_{d1})X +$$

$$\frac{\sigma_{N2}^2}{S}H_{d1}X + \frac{\sigma_{N2}^2}{S}H_{d1}^*H_{l1}I + W_2^*N_2 + \frac{\sigma_{N1}^2}{S}H_{d2}X +$$

$$\frac{\sigma_{N1}^2}{S}H_{d2}^*H_{l2}I + W_1^*N_1),$$

the time offset between the ideal channel and the CPP/channel estimator estimated channel must be the same between two receiver antennas (i.e., n=m). Thus, the Coarse PN Track must be jointly operated on both two antennas. In other words, the ideal channel and CPP/channel estimator estimated channel can be offset by PN chips and keep the same interference suppression capability on the condition that the both time offsets between ideal channel and the CPP/channel estimator estimated channels in the two diversity paths are the same and the CPP windows cover the multipath of the first and second information signals.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the present invention, as limited only by the scope of the appended claims.

The invention claimed is:

1. A method for operating a Radio Frequency (RF) receiver to process a composite information signal having a first information signal and a second information signal, the method comprising:

for a first information signal group finger array that is operable to receive a plurality of individual distinct signal paths of a first information signal cluster that is received within a duration of a corresponding delay spread:
  at a first time, receiving a timing reference signal corresponding to the first information signal and locking a delay locked loop based upon the timing reference signal;
  at the first time, establishing a delay locked loop sampling position of the first information signal group finger array based upon the timing reference signal; and
  at second and subsequent times, based upon early and late signal correlation values with the first information signal, adjusting the delay locked loop sampling position of the first information signal group finger array; and for a second information signal group finger array that is operable to receive a plurality of individual distinct signal paths of a second information signal cluster that is received within a duration of a corresponding delay spread:
  at the first time, determining a sampling position offset of the second information signal with respect to the first information signal;
  at the first time and subsequent times, aligning the second information signal group finger array based upon the delay locked loop sampling position and the sampling position offset.

2. The method of claim 1, wherein:
the first information signal includes data intended for the RF receiver;
the second information signal is an interfering signal; and
the sampling position offset is non-zero.

3. The method of claim 1, further comprising:
determining a first information signal pseudo noise (PN) correlation position for PN correlation with the first information signal by the first group finger array; and
determining a second information signal PN correlation position for use in PN correlation with the second information signal by the second group finger array with respect to the sampling position of the first information signal group finger array and the relative frame offset between the first information signal and the second information signal.

4. The method of claim 1, wherein in establishing a delay locked loop sampling position of the first information signal group finger array based upon the timing reference signal, a selected finger of the first information signal group finger array is aligned with a strongest path of the first information signal.

5. The method of claim 1, further comprising:
the first information signal group finger array producing a first channel estimate for the first information signal;
the second information signal group finger array producing a second channel estimate for the second information signal; and
a first channel estimate output time of the first channel estimate by the first information signal group finger array is also used as a second channel estimate output time of the second channel estimate by the second information signal group finger array.

6. The method of claim 5, further comprising processing the composite information signal by:
determining equalizer coefficients based upon the first channel estimate and the second channel estimate;
equalizing the composite information signal to remove the second information signal; and
extracting data of the first information signal from the equalized composite information signal.

7. A method for operating a Radio Frequency (RF) receiver to process a composite information signal having a first information signal and a second information signal, the method comprising:

for a first information signal group finger array that is operable to receive a plurality of individual distinct signal paths of a first information signal cluster that is received within a duration of a corresponding delay spread and for a second information signal group finger array that is operable to receive a plurality of individual distinct signal paths of a second information signal cluster that is received within a duration of a corresponding delay spread:
  at a first time, receiving a timing reference signal corresponding to the first information signal and a timing reference signal corresponding to the second information signal and locking a delay locked loop based upon both timing reference signals;
  at the first time, establishing a delay locked loop sampling position of the first information signal group finger array and the second information signal group finger array based upon the timing reference signals; and
  at second and subsequent times, based upon early and late signal correlation values with the first information signal and the second information signal, adjusting the delay locked loop sampling position of the first information signal group finger array and the second information signal group finger array.

8. The method of claim 7, wherein:
the first information signal includes first data intended for the RF receiver;
the second information signal includes second data intended for the RF receiver;
the first information signal and the second information signal are transmit diversity signals; and
the sampling position offset between the first information signal and second information signal is non-zero.

9. The method of claim 7, wherein:
the first information signal includes first data intended for the RF receiver;
the second information signal includes second data intended for the RF receiver;
the first information signal and the second information signal are receive diversity signals; and
the sampling position offset between the first information signal and second information signal is zero.

10. The method of claim 7, further comprising:
determining a first information signal pseudo noise (PN) correlation position for PN correlation with the first information signal by the first group finger array; and
determining a second information signal PN correlation position for use in PN correlation with the second information signal by the second group finger array.

11. The method of claim 7, wherein in establishing a delay locked loop sampling position of the first information signal group finger array and the second information signal group finger array based upon the timing reference signals, a selected finger pair, one of the first information signal group finger array and the other of the second information signal group finger array, is aligned with a strongest path pair, one of the first information signal and the other of the second information signal.

12. The method of claim 7, further comprising:
the first information signal group finger array producing a first channel estimate for the first information signal;
the second information signal group finger array producing a second channel estimate for the second information signal; and
a first channel estimate output time of the first channel estimate output by the first information signal group finger array is the same as a second channel estimate output time of the second channel estimate output by the second information signal group finger array.

13. The method of claim 12, further comprising processing the composite information signal by:
determining equalizer coefficients based upon the first channel estimate and the second channel estimate;
equalizing a first copy of the composite information signal to remove the second information signal;
extracting data of the first information signal from the equalized first copy of the composite information signal;
equalizing a second copy of the composite information signal to remove the first information signal; and
extracting data of the second information signal from the equalized second copy of the composite information signal.

14. The method of claim 13, further comprising Space Time Transmit Diversity (STTD) combining the data of the first information signal with the data of the second information signal.

15. The method of claim 12, further comprising processing the composite information signal by:
determining equalizer coefficients based upon the first channel estimate;
equalizing a first copy of the composite information signal;
extracting data of the first information signal from the equalized first copy of the composite information signal;
determining equalizer coefficients based upon the second channel estimate;
equalizing a second copy of the composite information signal; and
extracting data of the second information signal from the equalized second copy of the composite information signal.

16. The method of claim 15, further comprising Receive Diversity combining the data of the first information signal with the data of the second information signal.

17. A method for operating a Radio Frequency (RF) receiver to process a composite information signal having first, second, third, fourth, fifth, and sixth information signals, the method comprising:
for a first information signal group finger array that is operable to receive a plurality of individual distinct signal paths of a first information signal cluster that is received within a duration of a corresponding delay spread and for a second information signal group finger array that is operable to receive a plurality of individual distinct signal paths of a second information signal cluster that is received within a duration of a corresponding delay spread:
at a first time, receiving a timing reference signal corresponding to the first information signal and a timing reference signal corresponding to the second information signal and locking a delay locked loop based upon both timing reference signals;
at the first time, establishing a delay locked loop sampling position of the first information signal group finger array and the second information signal group finger array based upon the timing reference signals; and
at second and subsequent times, based upon early and late signal correlation values with the first information signal and the second information signal, adjusting the delay locked loop sampling position of the first information signal group finger array and the second information signal group finger array; and
for third, fourth, fifth and sixth information signal group finger arrays that are operable to respectively receive a plurality of individual distinct signal paths of signal clusters of the third, fourth, fifth and sixth information signals, that are received within respective durations of corresponding delay spreads:
at the first time, determining sampling position offsets for the third, the fourth, the fifth and the sixth information signals with respect to the delay locked loop sampling position;
at the first time and subsequent times, aligning the third, fourth, fifth and sixth information signal group finger arrays respectively based upon respective delay locked loop sampling position offsets.

18. The method of claim 17, wherein:
the first information signal includes first data intended for the RF receiver;
the second information signal includes second data intended for the RF receiver;
the first information signal and the second information signal are receive diversity signals; and
the sampling position offset between the first information signal and the second information signal is zero.

19. The method of claim 17, wherein:
the third and the fourth information signals are interfering signals;
the third and the fourth information signals are receive diversity signals; and
the sampling position offset between the first information signal and the third information signal is non-zero; and
the sampling position offset between the third information signal and the fourth information signal is zero.

20. The method of claim 17, wherein:
the fifth and the sixth information signals are interfering signals;
the fifth and the sixth information signals are receive diversity signals; and
the sampling position offset between the first information signal and the fifth information signal is non-zero;
the sampling position offset between the fifth information signal and the sixth information signal is zero.

21. The method of claim 17, further comprising:
determining a first information signal pseudo noise (PN) correlation position for PN correlation with the first information signal by the first group finger array and the second information signal by the second group finger array; and
determining a third information signal PN correlation position for use in PN correlation with the third information signal by the third group finger array and the fourth information signal by the fourth group finger array, with respect to the sampling position of the first information signal group finger array and the frame offset between the third information signal and the first information signal; and determining a fifth information signal PN correlation position for use in PN correlation with the fifth information signal by the fifth group finger array and the sixth information signal by the sixth group finger array, with respect to the sampling position of the first information signal group finger array and the frame offset between the fifth information signal and the first information signal.

22. The method of claim 17, wherein in establishing a delay locked loop sampling position of the first information signal group finger array and the second information signal group finger array based upon the timing reference signals, a selected finger pair, one of the first information signal group finger array and the other of the second information signal group finger array is aligned with a strongest path pair, one of the first information signal and the other of the second information signal.

23. The method of claim 17, further comprising:
the first, the second, the third, the fourth, the fifth and the sixth information signal group finger arrays producing respectively a first, a second, a third, a fourth, a fifth, and a sixth channel estimate for the respective first, second, third, fourth, fifth, and sixth information signal; and
a first channel estimate output time of the first channel estimate output by the first information signal group finger array is the same as a second, a third, a fourth, a fifth, and a sixth channel estimate output time of the respective second, third, fourth, fifth, and sixth channel estimate output by the respective second, third, fourth, fifth, and sixth information signal group finger array.

24. The method of claim 23, further comprising processing the composite information signal by:
determining equalizer coefficients based upon the first channel estimate, the third channel estimate, and the fifth channel estimates;
equalizing a first copy of the composite information signal to remove the third and the fifth information signals;
extracting data of the first information signal from the equalized first copy of the composite information signal; and
determining equalizer coefficients based upon the second channel estimate, the fourth channel estimate, and the sixth channel estimates;
equalizing a second copy of the composite information signal to remove the fourth and the sixth information signals;
extracting data of the second information signal from the equalized second copy of the composite information signal.

25. The method of claim 24, further comprising Receive Diversity combining the data of the first information signal with the data of the second information signal.

26. A method for operating a Radio Frequency (RF) receiver to process a composite information signal having a first information signal, a second information signal, a third information signal, and a fourth information signal, the method comprising:
for first, second, third, and fourth information signal group finger array that are operable to receive respective pluralities of individual distinct signal paths of first, second, third and fourth information signal clusters that are received within respective durations of corresponding delay spreads:
at a first time, receiving a timing reference signal corresponding to the first information signal, a timing reference signal corresponding to the second information signal, a timing reference signal corresponding to the third information signal, and a timing reference signal corresponding to the fourth information signal and locking a delay locked loop based upon all four timing reference signals;
at the first time, establishing a single delay locked loop sampling position of the first, the second, the third and the fourth information signal group finger arrays based upon the timing reference signals; and
at second and subsequent times, based upon early and late signal correlation values with the first, the second, the third and the fourth information signals, adjusting the delay locked loop sampling position of the first, the second, the third, and the fourth information signal group finger arrays.

27. The method of claim 26, wherein:
the first, second, the third and the fourth information signals include respective first, second, third and fourth data intended for the RF receiver;
the first information signal and the second information signals are receive diversity signals;
the third information signal and the fourth information signals are receive diversity signals;
the first information signal and the third information signals are transmit diversity signals;
the second information signal and the fourth information signals are transmit diversity signals; and
the sampling position offset between any two information signals is zero.

28. The method of claim 26, further comprising:
determining a first information signal pseudo noise (PN) correlation position for PN correlation with the first information signal by the first group finger array and the second information signal by the second group finger array; and
determining a third information signal pseudo noise (PN) correlation position for PN correlation with the third information signal by the third group finger array and the fourth information signal by the fourth group finger array.

29. The method of claim 26, wherein in establishing a delay locked loop sampling position of the four information signal group finger arrays based upon the timing reference signals, a selected finger combination of four fingers, one from each of the first, the second, the third and the fourth information signal group finger arrays is aligned with a strongest path combination, one path each of the first, the second, the third, and the fourth information signals.

30. The method of claim 26, further comprising:
the first, the second, the third, and the fourth information signal group finger array producing respectively a first, a second, a third, and a fourth channel estimate for the respective first, second, third, and fourth information signal; and
a first channel estimate output time of the first channel estimate output by the first information signal group finger array is the same as a second, a third, and a fourth channel estimate output time of the respective second, third, and fourth channel estimate output by the respective second, third, and fourth information signal group finger array.

31. The method of claim 30, further comprising processing the composite information signal by:

determining equalizer coefficients based upon the first channel estimate and the third channel estimate;

equalizing a first copy of the composite information signal to remove the third information signal;

extracting data of the first information signal from the equalized first copy of the composite information signal;

equalizing a second copy of the composite information signal to remove the first information signal;

extracting data of the third information signal from the equalized second copy of the composite information signal;

determining equalizer coefficients based upon the second channel estimate and the fourth channel estimate;

equalizing a third copy of the composite information signal to remove the fourth information signal;

extracting data of the second information signal from the equalized third copy of the composite information signal;

equalizing a fourth copy of the composite information signal to remove the second information signal; and extracting data of the fourth information signal from the equalized fourth copy of the composite information signal.

32. The method of claim 31, further comprising:

receive Diversity combining the data of the first information signal with the data of the second information signal to get the receive combined first information signal; and receive Diversity combining the data of the third information signal with the data of the fourth information signal to get the receive combined third information signal 33. The method of claim 32, further comprising Transmit Diversity (STTD) combining the data of the received combined first information signal with the data of the receive combined second information signal.

34. A system for processing a radio frequency (RF) composite information signal having a first information signal and a second information signal, the system comprising:

a searcher that detects a maximum signal energy level path of the first information signal and produces a timing reference signal based thereupon;

a delay locked loop operable to receive the timing reference signal and to lock based upon the timing reference signal;

a first information signal group finger array that is operable to receive a plurality of individual distinct signal paths of a first information signal cluster that is received within a duration of a corresponding delay spread and:

at the first time, lock the sampling position of the first information signal group finger array to the delay locked loop; and at second and subsequent times, based upon early and late signal correlation values with the first information signal, adjust the delay locked loop to thereby adjust the sampling position of the first information signal group finger array; and a second information signal group finger array that is operable to receive a plurality of individual distinct signal paths of a second information signal cluster that is received within a duration of a corresponding delay spread and:

at the first time, determine a sampling position offset of the second information signal with respect to the first information signal;

at the first time and subsequent times, lock sampling of the second information signal group finger array to the delay locked loop with the sampling position offset.

35. The system of claim 34, wherein when the first information signal group finger array and the second information signal group finger array provide receive path diversity operations for a non-transmit diversity signal, the sampling position offset is zero.

36. The system of claim 34, wherein when the first information signal group finger array and the second information signal group finger array provide receive path diversity operations for a transmit diversity signal, the sampling position offset is non-zero.

37. The system of claim 34, further wherein:

the first information signal group finger array produces a first channel estimate for the first information signal;

the second information signal group finger array produces a second channel estimate for the second information signal; and a first channel output time of the first channel output by the first information signal group finger array differs from a second channel output time of the second channel output by the second information signal group finger array.

38. The system of claim 37, further comprising:

equalizer coefficient determination circuitry operable to process the composite information signal to determine equalizer coefficients based upon the first channel estimate and the second channel estimate;

equalizer circuitry operable to equalize the composite information signal to remove the second information signal; and channel processing circuitry operable to extract data of the first information signal from the equalized composite information signal.

39. The system of claim 37, further comprising Space Time Transmit Diversity (STTD) circuitry operable to combine the data of the first information signal with the data of the second information signal.

* * * * *